(12) United States Patent
Stolowitz

(10) Patent No.: US 8,074,149 B2
(45) Date of Patent: Dec. 6, 2011

(54) DISK CONTROLLER METHODS AND APPARATUS WITH IMPROVED STRIPING, REDUNDANCY OPERATIONS AND INTERFACES

(75) Inventor: Michael C. Stolowitz, Danville, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/649,229

(22) Filed: Dec. 29, 2009

(65) Prior Publication Data

US 2010/0257401 A1    Oct. 7, 2010

Related U.S. Application Data

(60) Division of application No. 11/080,376, filed on Mar. 14, 2005, which is a continuation-in-part of application No. 10/822,115, filed on Apr. 8, 2004, and a continuation-in-part of application No. 10/829,918, filed on Apr. 21, 2004.

(60) Provisional application No. 60/553,594, filed on Mar. 12, 2004.

(51) Int. Cl.
G11C 29/00    (2006.01)

(52) U.S. Cl. ...................................................... 714/770

(58) Field of Classification Search .................. 714/770
See application file for complete search history.

(56) References Cited

U.S. PATENT DOCUMENTS

| 6,018,778 A | 1/2000 | Stolowitz |
| 6,098,128 A * | 8/2000 | Velez-McCaskey et al. ... 710/65 |
| 6,237,052 B1 | 5/2001 | Stolowitz |
| 7,743,275 B1 * | 6/2010 | Tormasov et al. ........... 714/6.12 |
| 2003/0066010 A1 * | 4/2003 | Acton ........................... 714/758 |

OTHER PUBLICATIONS

Notice of Allowance from U.S. Appl. No. 12/649,228 dated Jul. 22, 2011.

* cited by examiner

*Primary Examiner* — Scott Baderman
*Assistant Examiner* — Enam Ahmed
(74) *Attorney, Agent, or Firm* — Zilka-Kotab, PC

(57) ABSTRACT

A RAID disk drive controller (FIG. 33) implements disk storage operations, including striping and redundancy operations with multiple disk drives connected via respective SATA ports (520). Configurable data path switch logic (460) provides dynamic configuration of two or more attached drives into one or more arrays. Data transfers are synchronized locally by leveraging the SATA port transport layer FIFO (530). Synchronous transfers allow on-the-fly redundancy (XOR) operations (FIG. 36) for improved performance and reduced hardware complexity. XOR accumulator hardware (FIG. 42-FIG. 43) reduces buffer requirements for multiple DMA channels otherwise required for synchronization, and various narrow and wide striping modes are supported.

36 Claims, 48 Drawing Sheets

Data Paths

Single Drive

DRIVE
Capacity: 100 GB
Sustained: 50 MB

MTBF: 10

Dual Drive - Capacity

A    B

DRIVE
Capacity: 200 GB
Sustained: 50 MB

MTBF: 20

Dual Drive - Reliability

A    A'

DRIVE
Capacity: 100 GB
Sustained: 50 MB

MTBF: 1

Dual Drive – Capacity & Performance

A0   A1
B0   B1

DRIVE
Capacity: 200 GB
Sustained: 100 MB

MTBF: 20

Striping – Two Data Drives

Striping – Two Data
Plus Redundant Drives

Striping – Three Data Plus Redundant Drives

On-The-Fly XOR -- Read Direction

Functional View

Data Paths

Array Switch Data Paths —
Disk Read Direction

Array Switch Data
Paths — Disk Write
Direction

RAID Data Mapping

JBOD – RAID0

| Drive 0 | Drive 1 |
|---|---|
| 0 | 1 |
| 2 | 3 |
| 4 | 5 |
| 6 | 7 |
| 8 | 9 |

| Drive 0 | Drive 1 | Drive 2 |
|---|---|---|
| 0 | 1 | 2 |
| 3 | 4 | 5 |
| 6 | 7 | 8 |
| 9 | 10 | 11 |
| 12 | 13 | 14 |

| Drive 0 | Drive 1 | Drive 2 | Drive 3 |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |

FIG. 15A

RAID1

| Drive 0 | Drive P |
|---|---|
| 0 | 0 |
| 1 | 1 |
| 2 | 2 |
| 3 | 3 |
| 4 | 4 |

| Drive 0 | Drive 1 | Drive 2 |
|---|---|---|
| - | - | - |
| - | - | - |
| - | - | - |
| - | - | - |
| - | - | - |

| Drive 0 | Drive 1 | Drive 2 | Drive 3 |
|---|---|---|---|
| - | - | - | - |
| - | - | - | - |
| - | - | - | - |
| - | - | - | - |
| - | - | - | - |

| Drive 0 | | |
|---|---|---|
| Drive 0 | Drive 1 | |
| 0,1[0] | 0,1[1] | |
| 2,3[0] | 2,3[1] | |
| 4,5[0] | 4,5[1] | |
| 6,7[0] | 6,7[1] | |
| 8,9[0] | 8,9[1] | |

| RAIDXL | | | |
|---|---|---|---|
| Drive 0 | Drive 1 | Drive 2 | |
| 0,1,2[0] | 0,1,2[1] | 0,1,2[2] | |
| 3,4,5[0] | 3,4,5[1] | 3,4,5[2] | |
| 6,7,8[0] | 6,7,8[1] | 6,7,8[2] | |
| 9,10,11[0] | 9,10,11[1] | 9,10,11[2] | |
| 12,13,14[0] | 12,13,14[1] | 12,13,14[2] | |

| RAIDXL | | | |
|---|---|---|---|
| Drive 0 | Drive 1 | Drive 2 | Drive 3 |
| 0,1,2,3[0] | 0,1,2,3[1] | 0,1,2,3[2] | 0,1,2,3[3] |
| 4,5,6,7[0] | 4,5,6,7[1] | 4,5,6,7[2] | 4,5,6,7[3] |
| 8,9,10,11[0] | 8,9,10,11[1] | 8,9,10,11[2] | 8,9,10,11[3] |
| 12,13,14,15[0] | 12,13,14,15[1] | 12,13,14,15[2] | 12,13,14,15[3] |
| 16,17,18,19[0] | 16,17,18,19[1] | 16,17,18,19[2] | 16,17,18,19[3] |

FIG. 16B

| Drive 0 | Drive P |
|---|---|
| See RAID1 | |

| RAIDXL | | |
|---|---|---|
| Drive 0 | Drive 1 | Drive P |
| 0,1[0] | 0,1[1] | 0,1[+] |
| 2,3[0] | 2,3[1] | 2,3[+] |
| 4,5[0] | 4,5[1] | 4,5[+] |
| 6,7[0] | 6,7[1] | 6,7[+] |
| 8,9[0] | 8,9[1] | 8,9[+] |

| RAIDXL | | | |
|---|---|---|---|
| Drive 0 | Drive 1 | Drive 2 | Drive P |
| 0,1,2[0] | 0,1,2[1] | 0,1,2[2] | 0,1,2[+] |
| 3,4,5[0] | 3,4,5[1] | 3,4,5[2] | 3,4,5[+] |
| 6,7,8[0] | 6,7,8[1] | 6,7,8[2] | 6,7,8[+] |
| 9,10,11[0] | 9,10,11[1] | 9,10,11[2] | 9,10,11[+] |
| 12,13,14[0] | 12,13,14[1] | 12,13,14[2] | 12,13,14[+] |

| RAID1 | | |
|---|---|---|
| Drive 0 | Drive 0 | Drive P |
| - | - | - |
| - | - | - |
| See RAID1 | | |
| - | - | - |
| - | - | - |

| RAID5 | | | |
|---|---|---|---|
| Drive 0 | Drive 1 | Drive P | |
| 0 | 1 | 0,1[+] | |
| 2 | 3 | 2,3[+] | |
| 4 | 5 | 4,5[+] | |
| 6 | 7 | 6,7[+] | |
| 8 | 9 | 8,9[+] | |

| Drive 0 | Drive 1 | Drive 2 | Drive P |
|---|---|---|---|
| 0 | 1 | 2 | 0,1,2[+] |
| 3 | 4 | 5 | 3,4,5[+] |
| 6 | 7 | 8 | 6,7,8[+] |
| 9 | 10 | 11 | 9,10,11[+] |
| 12 | 13 | 14 | 12,13,14[+] |

RAIDXL – 2 Drive – No Parity

Channel 0

| 3 | 2 | 1 | 0 | n | Fast Read | Primitive |
|---|---|---|---|---|-----------|-----------|
|   |   | L1 | L0 | 2 |           | RAIDXL    |
|   |   |    |    |   |           |           |

SATA 0
SATA 1

FIG. 19A

RAIDXL – 3 Drive – No Parity

Channel 0

| 3 | 2 | 1 | 0 | n | Fast Read | Primitive |
|---|---|---|---|---|-----------|-----------|
|   | L2 | L1 | L0 | 3 |          | RAIDXL    |
|   |    |    |    |   |          |           |

SATA 0
SATA 1
SATA 2

FIG. 19B

RAIDXL – 4 Drive – No Parity

Channel 0

| 3 | 2 | 1 | 0 | n | Fast Read | Primitive |
|---|---|---|---|---|-----------|-----------|
| L3 | L2 | L1 | L0 | 4 | n3 | RAIDXL |
|   |   |   |   |   |    |        |

SATA 0
SATA 1
SATA 2
SATA 3

FIG. 19C

RAIDXL – 3 Drive – Parity

Channel 0

| 3 | 2 | 1 | 0 | n | Fast Read | Primitive |
|---|---|---|---|---|-----------|-----------|
|   | PAR | L1 | L0 | 2 | On | RAIDXL |
|   |     |    |    |   |    |        |

SATA 0
SATA 1
SATA 2

FIG. 19D

RAIDXL – 4 Drive – Parity

Channel 0

| 3 | 2 | 1 | 0 | n | Fast Read | Primitive |
|---|---|---|---|---|-----------|-----------|
| PAR | L2 | L1 | L0 | 3 | On | RAIDXL |
|     |    |    |    |   |    |        |

SATA 0
SATA 1
SATA 2
SATA 3

FIG. 19E

RAID3XL - 3 Drive - Parity - Drive Failed

Channel 0

| 3 | 2 | 1 | 0 | n | Fast Read | Primitive |
|---|---|---|---|---|-----------|-----------|
|   | PA2 | L1 | FL0 | 2 | 0/1 | RAIDXL |
|   |   |   |   |   |   |   |
|   |   |   |   |   |   |   |
|   |   |   |   |   |   |   |

SATA 0
SATA 1
SATA 2

FIG. 20A

RAID3XL - 4 Drive - Parity - Drive Failed

Channel 0

| 3 | 2 | 1 | 0 | n | Fast Read | Primitive |
|---|---|---|---|---|-----------|-----------|
| PA4 | L3 | FL1 | L0 | 3 | 0/1 | RAIDXL |
|   |   |   |   |   |   |   |
|   |   |   |   |   |   |   |
|   |   |   |   |   |   |   |

SATA 0
SATA 1
SATA 2
SATA 3

FIG. 20B

RAID5 - 3 Drive - Full Stripe Read With Failed Drive

Channel 0
Channel 1

| 3 | 2 | 1 | 0 | n | Fast Read | Primitive |
|---|---|---|---|---|-----------|-----------|
| PAR | | FL1 | L0 | 2 | 0 | RAID5-STR |

SATA 0
SATA 1
SATA 3

FIG. 21A

RAID5 - 3 Drive - Read Failed Drive

Channel 1

| 3 | 2 | 1 | 0 | n | Fast Read | Primitive |
|---|---|---|---|---|-----------|-----------|
| PAR | | FL1 | L0 | 3/1? | 0 | RAID5-FR |

SATA 0
SATA 1
SATA 3

FIG. 21B

RAID6 - 4 Drive - Full Stripe Read With Failed Drive

Channel 0
Channel 1
Channel 2

| 3 | 2 | 1 | 0 | n | Fast Read | Primitive |
|---|---|---|---|---|-----------|-----------|
| PAR | FL2 | L1 | L0 | 3 | 0 | RAID5-STR |

SATA 0
SATA 1
SATA 2
SATA 3

FIG. 21C

RAID5 - 4 Drive - Read Failed Drive

Channel 2

| 3 | 2 | 1 | 0 | n | Fast Read | Primitive |
|---|---|---|---|---|-----------|-----------|
| PAR | FL2 | L1 | L0 | 3/1? | 0 | RAID5-FR |

SATA 0
SATA 1
SATA 2
SATA 3

FIG. 21D

RAID5 - 3 Drive - Full Stripe Write

| | 3 | 2 | 1 | 0 | L | R | Fast Read | Primitive |
|---|---|---|---|---|---|---|---|---|
| Channel 0 | | PAR | L1 | L0 | 0 | 2 | na | RAID5-FSW |
| Channel 1 | | | | | | | | |

SATA 0
SATA 1
SATA 2

FIG. 22A

RAID5 - 4 Drive - Full Stripe Write

| | 3 | 2 | 1 | 0 | L | R | Fast Read | Primitive |
|---|---|---|---|---|---|---|---|---|
| Channel 0 | PAR | L0 | L1 | L0 | 0 | 3 | na | RAID5-FSW |
| Channel 1 | | | | | | | | |
| Channel 2 | | | | | | | | |

SATA 0
SATA 1
SATA 2
SATA 3

FIG. 22B

RAID5 - 3 Drive - Partial Stripe Update - Read Phase

| | 3 | 2 | 1 | 0 | L | R | Fast Read | Primitive |
|---|---|---|---|---|---|---|---|---|
| Channel 0 | PAR | | | L0 | 1 | 3 | 0 | RAID5-PSU |
| Channel 3 | | | | | | | | |

SATA 0
SATA 3

FIG. 22C

RAID5 - 4 Drive - Partial Stripe Update - Write Phase

| | 3 | 2 | 1 | 0 | L | R | Fast Read | Primitive |
|---|---|---|---|---|---|---|---|---|
| Channel 0 | PAR | | | L0 | 1 | 3 | 0 | RAID5-PSU |
| Channel 3 | | | | | | | | |

SATA 0
SATA 3

FIG. 22D

Mapping Register

| r | PP_L4 | PP_L3 | PP_L2 | PP_L1 | PP_L0 |
|---|-------|-------|-------|-------|-------|

↙ 24

Mapping Register Description

| BITS | FIELD | CONTENTS |
|------|-------|----------|
| 2:0 | Logical Port 0 | # of connected physical port |
| 5:3 | Logical Port 1 | # of connected physical port |
| 8:6 | Logical Port 2 | # of connected physical port |
| 11:9 | Logical Port 3 | # of connected physical port |
| 14:12 | Logical Port 4 | # of connected physical port |
| 15 | Reserved | 0 |

*Figure 26*

JBOD – Just a bunch of drives

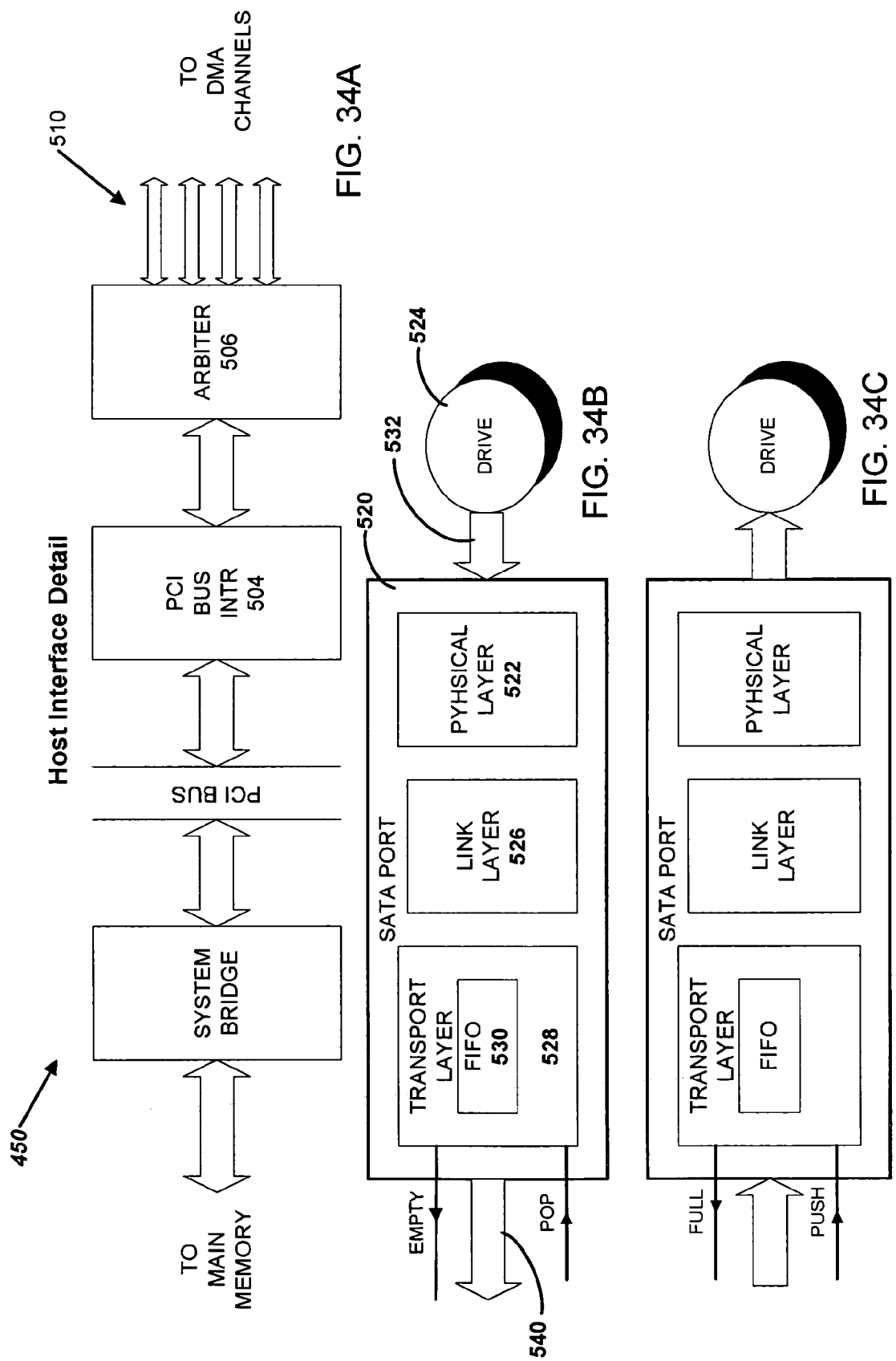

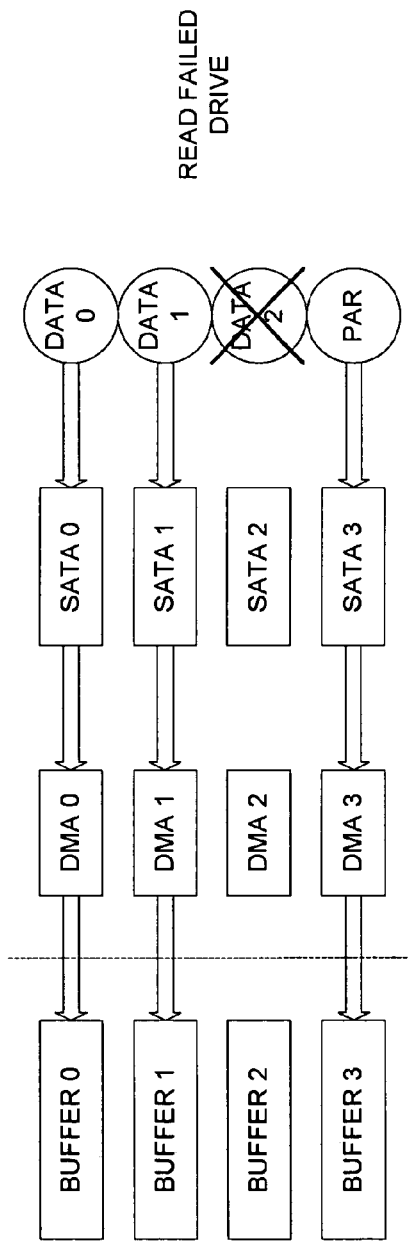
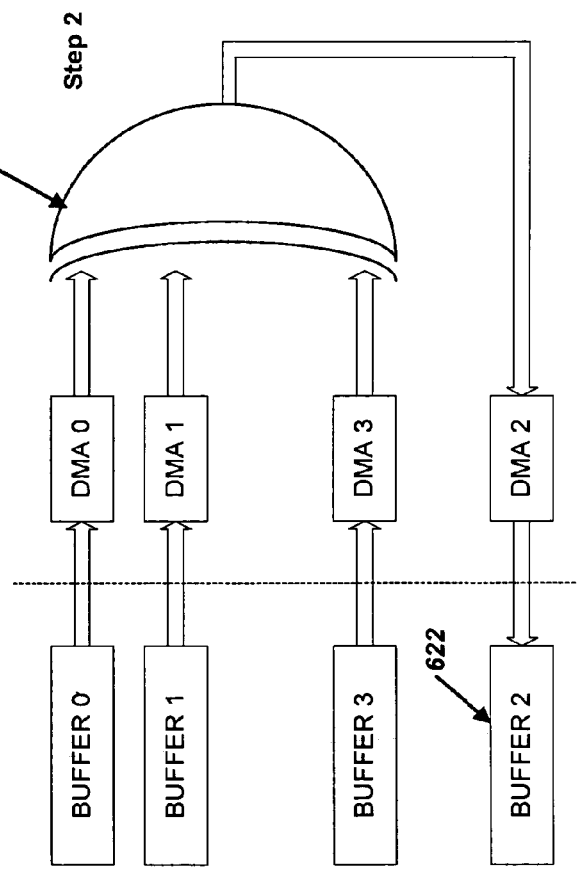
FIG. 35A
PRIOR ART
FIG. 35B
PRIOR ART

DISK CONTROLLER METHODS AND APPARATUS WITH IMPROVED STRIPING, REDUNDANCY OPERATIONS AND INTERFACES

RELATED APPLICATION(S)

This application is a divisional of U.S. application Ser. No. 11/080,376 filed Mar. 14, 2005, which, in turn, is a CIP of U.S. application Ser. No. 10/822,115 filed Apr. 8, 2004 and also a CIP of U.S. application Ser. No. 10/829,918 filed Apr. 21, 2004, all of which are incorporated herein in their entirety by this reference. U.S. application Ser. No. 11/080,376 also claims priority from U.S. Provisional Application No. 60/553,594 filed Mar. 12, 2004, which is also incorporated herein in its entirety by this reference.

TECHNICAL FIELD

This invention is in the field of digital data storage systems and, more specifically, pertains to improvements in RAID disk array controllers.

BACKGROUND OF THE INVENTION

The hard disk remains the primary mass storage device for small to mid-sized computers. As an electromechanical device, the hard disk performance is limited by the physical characteristics of the drive consisting primarily of seek times and rotational delays. Once the mechanical portion of a read or write access has been performed, the data transfer rate is limited by characteristics of the media, the head, and the R/W electronics. This data transfer rate is in the range of 50 to 100 MBPS (megabytes per second) for currently available products.

The Disk Array

A system might use multiple disk drives, i.e. an array of drives, if the required capacity, performance or reliability exceeds that available from a single drive. Capacity enhancement is the most common motivation. Two drives of a given size can store twice as much data as either single drive; compare FIG. 1A to FIG. 1B. Reliability enhancement is less obvious. Two drives of given type will have twice the failure rate of a single drive. On the other hand, a system may be arranged so that the second drive always has an exact copy of the data on the first drive. (This is often called "mirroring".) If either drive should fail, the data is not lost as there is still a copy; see FIG. 1C (where data A' is a copy of data A). If a failed drive is immediately replaced and the copy rebuilt, the probability of data loss drops down to the probability of two drive failures within the time required to replace a failed drive and to rebuild the copy. This is much lower than the probability of any single drive failing.

Performance is the third reason that a system might require the use of a drive array. There are two main cases. First, a high speed streaming application may require a higher sustained bandwidth than a single drive can deliver. A system with N drives can potentially provide N times the sustained bandwidth of a single drive. And second, the access time for a given drive, determined primarily by seek and rotational delays, limits the number of IO operations that can be performed per second ("IOPS"). An N-drive array can potentially support N times the IOPS performance of a single drive, in the best case. An example is illustrated in FIG. 1D.

Data Architectures

The simple addition of a second drive to a system will immediately double the capacity, but there may not be a performance improvement. Should the bulk of the accesses be to one of the drives or the other, the performance will be limited by performance of the more popular drive. Striping is a known technique which distributes data over the available drives so that retrieving the data will require the participation of all of the available drives, thereby allowing the system to attain performance approaching the aggregate performance of the drives.

The smallest addressable unit of storage on a typical disk drive is the sector. A sector of data is typically an exponential multiple of two bytes in length. In this application, a sector size of 512 bytes will be used for purposes of illustration but not limitation. To stripe data, an order or sequence is assigned to the drives and a stripe width is selected. A pair of drives may be identified as 0 and 1. The stripe width might be 4K bytes which is eight sectors of 512 bytes each. With these selections, the first 4K block of user data ("User 0" in the drawing) is stored in the first 4K block of drive 0. The second 4K block of user data ("User 1") is in the first 4K bock of drive 1. The third 4K block of user data is stored in the second 4K block of drive 0 and the third 4K block is stored in the second 4K block of drive 1. This arrangement is illustrated in FIG. 2. This process is repeated, alternating the storage of 4K blocks between the two drives, until the ends of the drives are reached. If the system has a large number of small accesses of one or two sectors, the two drives may be accessed concurrently to attain twice the random access performance of a single drive. If the system is accessing relatively large data blocks, say of 100K, the two drives may once again be operated concurrently to attain nearly twice the sustained performance of a single drive. Consequences of the stripe width selection will be discussed below.

Redundancy

As described above, a drive may be added to keep a continuously updated backup copy of a primary drive. For this simple approach, any disk write operation is simply duplicated on the backup drive. The backup drive is an exact copy of the primary drive. This technique is often known as "mirroring" or RAID1. Data may be read from either drive until one of the drives fails at which point the remaining drive is selected for reads. The increased reliability results in a 100% increase in the cost of storage, i.e. one mirror drive is required for each primary drive.

There are techniques for protecting data with an incremental cost of less than 100%. Consider the two-drive array previously described with the 4K data stripe. An additional drive, the same size as the original two, may be added to the array. This drive is referred to as the "redundant" drive. See FIG. 3. In this arrangement, each 4K block of the redundant drive receives the XOR of the corresponding 4K blocks of the other two drives. For any single drive failure, the contents of any 4K block of the failed drive can be reconstructed by computing the XOR of the corresponding 4K blocks of the remaining data drive and the redundant drive. In general, for an array with data striped across N drives, the XOR of all of the data blocks in the stripe is stored on the redundant drive. Once again, any block in the stripe can be reconstructed by XORing the remaining blocks of the stripe (including the redundant drive block). The added cost of the redundancy is reduced to 1/N where N is the number of data drives. FIG. 4 illustrates an array with three data plus a redundant drive. For each stripe, the redundant drive contains the XOR of the corresponding blocks in the three data drives. In general, there is no physical difference between "data drives" and "redundant drives". We use those labels herein as a convenient reference to a drive's designated function in the stripe.

These drive functional assignments are typically rotated between stripes because the parity drive tends to become the bottleneck for applications with a high percentage of writes and this rotation tends to balance the load.

For read accesses, assuming no drive failure, the performance of the redundant array is the same as the striped array performance without redundancy. The reconstruction of a data block of a failed drive, however, requires additional disk activity to access each of the remaining drives in the array and additional processing of the data for the XOR computation. Also, the updating of any block will invalidate the redundant block for that stripe, requiring an update of the redundant block as well.

As noted above, a system with two drives can provide either redundancy by using one drive to mirror the other, or it can double the capacity and provide up to a 2× performance improvement. The issuing of extra disk write commands required to maintain a copy or the extra operations required to distribute or collect data striped between two drives can easily be handled by the driver software using a disk controller that does not provide any specialized array functions. For systems with a redundant array of three or more drives, however, the XOR computations and the additional disk activity can significantly benefit from specialized hardware with or without local intelligence. In today's market, the two-drive arrays typically are handled in software. Larger arrays utilize specialized disk controller hardware which may be located on the motherboard, in a plug-in card, or an external box.

Redundancy Hardware

There are industry standards which describe in detail the mechanical, electrical, and logical interfaces of disk drives. A drive may be attached to a system by providing an interface commonly called a controller or an adapter meeting the requirements of the interface standard. For any system in which performance is an issue, Direct Memory Access or DMA is used by the controller to transfer disk data between the drive and system memory.

As a context for examining acceleration hardware, consider the array consisting of three data drives plus a redundant drive; see FIG. 4. Before a drive has failed, accessing a block of data requires only that the target drive be read and the data transferred by DMA to memory. There is one disk access and 4K bytes of data are transferred into the memory. If this drive should fail, accessing the same data block will require reading the balance of the stripe, i.e. the corresponding blocks of the same stripe from all of the other drives.

Each of the remaining drives is read with the data transferring by DMA to memory. Even though the three drives may have identical average access characteristics, the read operations will actually complete at different times for various reasons, including the fact that the initial states of the head position and rotational position are independent. Referring now to FIG. 35A, it shows this asynchronous data transfer from Data 0, Data 1 and PAR (parity or redundant drive) drives via respective DMA channels to corresponding buffer memory. The Data 2 drive has failed. Once the three blocks are stored in a buffer, the XOR operation can be performed to reconstruct the missing data. Referring now to FIG. 35B, to XOR the three streams, one element is read from each of the streams, the three elements are XORed in logic 620, and the resulting element is stored in a new block of the memory 622. Note that an element may be of any convenient size for the memory and DMA hardware involved. This process required three disk accesses: 12K of data was transferred into the memory from the disks (using 4k blocks for illustration); 12K of data was read back out of the memory for XOR computation; and 4K bytes of data were written back into the memory 622 for a total of 28K of data transfers into or out of the memory.

From the foregoing example, we observe the following:

1. While the accessing of a 4K data block required only 4K of data transfer, the post-failure access required 28K bytes total of buffer access, a seven-fold increase in system bus and memory bandwidth loading.

2. The XOR computation could not begin until data blocks had been received from all three drives. Thus the entire XOR process adds to the total latency of the read operation, creating an incentive to make the buffer memory and XOR engine as fast as might be practical. Note that while the XOR process might have been started on the first two streams, extra bandwidth would be required to store the intermediate results and to fetch them once again to be XORed with the final data block.

3. The post-failure essentially tripled the overhead for drive management.

Synchronous Redundant Data Transfers

Typically disk drives are internally buffered in order to decouple the data transfer rate of the RAN head from the transfer rate of the drive interface. This internal buffer, and its ability to accommodate various interface speeds, can be exploited to enhance redundancy operations while significantly reducing the hardware requirements. Consider the ATA/ATAPI interface in its original parallel Programmed Input Output or PIO mode of operation. In this mode, a single sixteen-bit word of data was read from or written to the drive's internal buffer using a read or write strobe (DIOR or DIOW) provided by the controller/adapter. In the discussion of redundancy hardware above, recall that reconstructing a block of data that was on a failed drive required reading the remaining three drives, transferring their data into a local buffer, and then reading the three streams from the buffers in order to compute the XOR function. This was because the drives, while all operating concurrently, were not synchronized to each other, so each transferred data at different times. (We use "internal buffer" to refer to a disk drive's internal buffer, as distinguished from buffer memory in a controller, adapter or host.)

An alternative technique is known as Synchronous Redundant Data Transfers or SRDT. With Synchronous Redundant Data transfers:

1. The read commands are issued to all three (or N) drives. Read data is not immediately transferred when less than three (or N) drives have data available in their internal buffers.

2. However, when the read data from all three drives is available in their respective internal buffers, the XOR process can begin. An XOR engine fetches a first element from each drive; computes the XOR of the three elements; and outputs the first element of the result to the buffer within the controller/adapter. This redundancy operation is "on the fly" as it occurs as data is moved from the drive to the buffer, as distinguished from first storing data in the buffer, and then having to read it out to do the redundancy operations as described above.

For the ATA/ATAPI drive in PIO mode, the element size is a single sixteen bit word, the width of the interface. The element fetching is accomplished by asserting the DIOR strobe to the three drives simultaneously. The use of the common DIOR strobe makes the data transfer "synchronous". In the scheme described above under redundancy hardware, the XOR process could not start until the data from the last drive had been transferred to the memory.

In the Synchronous (SRDT) scheme, the process begins as soon as the data from the last drive is available in that drive's internal buffer. Assuming that the read strobes are generated at the maximum rate supported by the drives, the advantages of the Synchronous Data Transfer and the On-The-Fly redundancy computation are as follows:

1. From the time when the last-to-finish drive has the read data ready in its buffer, the XOR is computed and the result is transferred with the same latency as the transferring of data from a single drive prior to the failure. The additional latency of fetching the three blocks from the buffer, computing the XOR, and storing the result to the buffer are all eliminated.

2. The total amount of data transferred to the buffer is the 4K block that was originally transferred. The total buffer bandwidth required in this example is that bandwidth required to support a single drive.

3. The data from the three drives is reduced to a single stream. Only a single DMA context (address and count) is required for the operation rather than one DMA context per drive as was required in the original example. This efficient operation, however, is dependent on using a storage element size equal to the width of the drive interface ("narrow striping"), and it is limited to synchronous transfers invoked by applying a common DIOR strobe to all of the drives in the array.

In view of the above background discussion, several problems remain. With the PATA technology, a controller could synchronously access multiple drives allowing it to perform redundancy computations on-the-fly for improved RAID performance with markedly reduced hardware complexity. The technologies which have evolved, first UDMA and then SATA, are source synchronous which would not allow a controller to synchronously transfer read data.

Second, the prior art used synchronous data transfers with on-the-fly redundancy with stripe widths of a few bytes or words, merging the drive data into a single stream which could be transferred to or from a buffer with a single DMA channel. Techniques are needed to extend the use of synchronous data transfers and on-the-fly redundancy to arrays with stripe widths of a sector or more.

In addition, current non-synchronous techniques for implementing wide striped controllers transfer disk data to memory before any XOR computations can be performed. This is wasteful of buffer bandwidth relative to techniques that might perform redundancy operations without first transferring all of the data to memory and having to read it back again for computations.

SUMMARY OF THE INVENTION

A RAID disk drive controller implements disk storage operations, including striping and redundancy operations with multiple disk drives connected via respective source synchronous ports, e.g. SATA ports. Configurable data path switch logic provides dynamic configuration of two or more attached drives into one or more arrays. Data transfers are synchronized locally by leveraging the SATA port transport layer FIFO. Synchronous transfers allow on-the-fly redundancy (XOR) operations for improved performance and reduced hardware complexity. XOR accumulator hardware (FIG. 42-FIG. 43) reduces buffer requirements for multiple DMA channels otherwise required for synchronization, and various narrow and wide striping modes are supported. Improvements in partial stripe update performance are provided.

Additional aspects and advantages of this invention will be apparent from the following detailed description of preferred embodiments, which proceeds with reference to the accompanying drawings.

BRIEF DESCRIPTION OF THE DRAWINGS

FIG. 15A illustrates data striping over two, three, and four drives. is a table illustrating data mapping over one or more disk drives in a JBOD-RAID0 mapping.

FIG. 15B illustrates the data mapping for RAID1 or Mirroring.

FIG. 16A illustrates the RAIDXL data mapping over two, three, or four drives for non-redundant arrays.

FIG. 16B illustrates RAIDXL data mapping over two data drives plus a parity drive or three data drives plus a parity drive.

FIG. 17 illustrates a possible RAID5 data mapping for two data drives plus a parity drive or three data drives plus a parity drive.

Figures 18A, 18B, 18C:
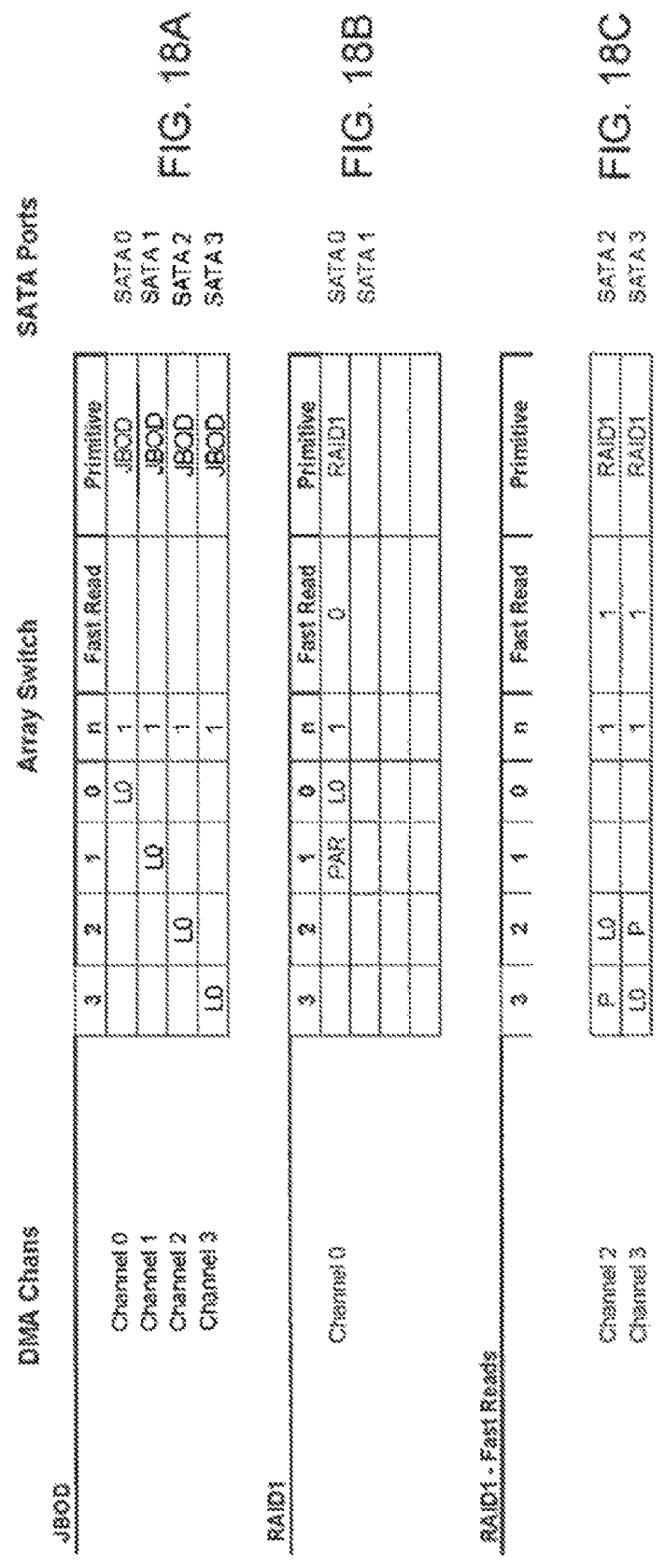

FIGS. 18-22 illustrate various array switch configurations and operations.

FIG. 26 is one example of a Mapping Register structure; the Mapping Register controls the configuration of the data paths between the logical and physical data ports in one embodiment of the array controller.

FIG. 34A shows detail of the host interfaces of FIG. 33.

FIG. 34B shows a SATA port interface in the disk read direction.

FIG. 34C shows a SATA port interface in the disk write direction.

FIGS. 35A-35B illustrate a prior art read operation where a drive has failed.

DETAILED DESCRIPTION OF PREFERRED EMBODIMENTS

Figure 1A:
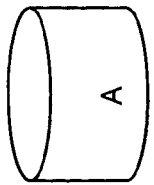
FIGS. 1A-1D illustrate various disk drive configurations.
Figure 1B:
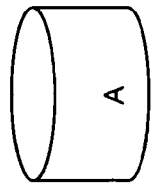
Figure 1C:
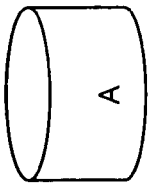
Figure 1D:
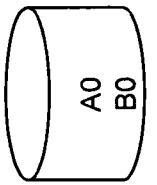

I. RAID Controllers and the UDMA Disk Drive Interface.

It is useful to create synchronous data transfers in a disk controller where the actual data transfers to and from the disk drives are asynchronous. That is, for some interfaces and protocols, the disk transfer operations are paced not by the disk controller, but by the individual drive electronics, and each drive completes its part of a given operation, for example a read or write of striped data, at a different time. The availability of synchronous data transfers enables "on the fly" generation of redundancy information (in the disk write direction) and "on the fly" regeneration of missing data in the read direction (in the event of a disk failure).

This can be done by placing an elastic buffer, i.e. a FIFO, into the data path of each of the drives and the controller. This strategy is illustrated with the case of a UDMA interface, although it can be used in any application where a data strobe originates at the data storage device rather than the controller. Consider first the Disk Read operation. For each of the drives and its FIFO, an interface implementing the UMDA protocol accepts data from the drive and pushes it into the FIFO on the drive's read strobe. Should any of the FIFOs approach full, the interface will "pause" the data transfer using the mechanism provided in the UDMA protocol. For this purpose, the FIFO shall provide an "almost full" signal that is asserted with enough space remaining in the FIFO to accept the maximum number of words that a drive may send once "pause" has been asserted. Data is removed from the FIFOs synchronously using most of the steps of the method described in U.S. Pat. No. 6,018,778.

Specifically, after issuing read commands to all of the drives, we wait until there is data available for transfer in all of the FIFOs, i.e. that they are all indicating a "not empty" condition. The data is then taken with a common read strobe and transferred to a buffer memory within the controller using a single address counter. Should any of the FIFOs become "empty", the process will stall until they all indicate "not empty" once again.

Consider now the disk write direction. Once again, a FIFO is introduced in the data path between the controller and each of the drives. Data is read from a buffer within the controller using a single address counter. Segments of the data words read from the buffer are pushed into each of the FIFOs using a common strobe, i.e. the data is striped over the drives of the array. Should any of the FIFOs become "full" the process is stalled. On the drive side of the FIFO, interfaces implementing the UDMA protocol will pop data from the FIFOs and transfer it to the drives. While these transfers might start simultaneously, they will not be synchronous as each of the interfaces will respond independently to "pause" and "stop" requests from its attached drive.

This adaptation of disk drive interfaces or protocols that are asynchronous, in the sense that the drive generates its data strobe, to enable synchronous redundant data transfers through the use of FIFOs or similar memory provides a significant advantage over the standard techniques for handling concurrent data transfer requests from an array of drives. Embodiments are described below in greater detail.

Figure 6:
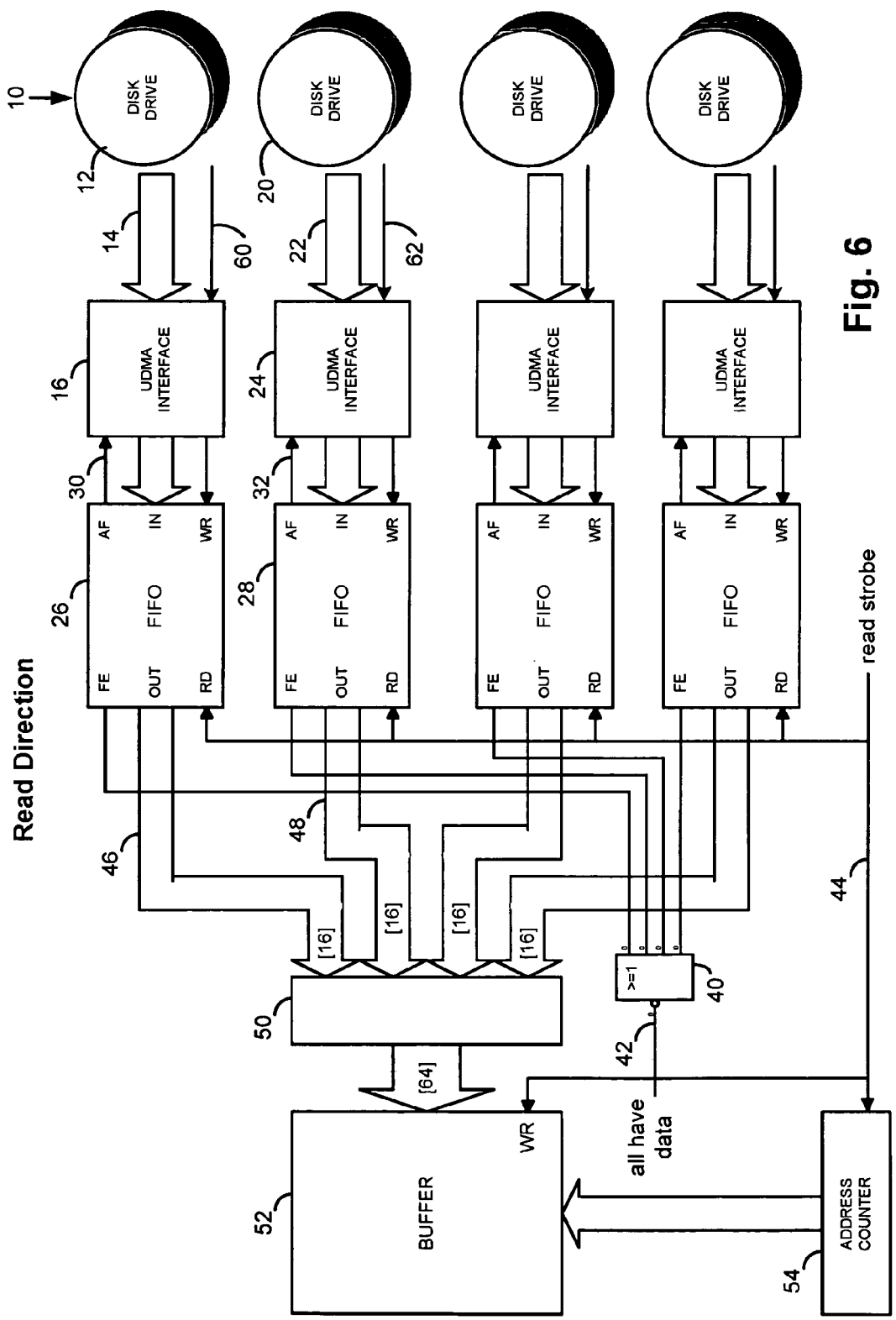
FIG. 6 is a simplified schematic diagram of a disk array system showing read data paths for synchronizing UDMA disk drive data.

FIG. 6 illustrates an array 10 of disk drives. The UDMA protocol is used by way of illustration and not limitation. Drive 12 has a data path 14 to provide read data to an interface 16 that implements the standard UDMA protocol. Similarly, a second drive 20 had a data path 22 coupled to a corresponding UDMA interface 24, and so on. The number of drives may vary; four are shown for illustration. Each physical drive is attached to a UDMA interface. Each drive is coupled via its UDMA interface to a data input port of a memory such as a FIFO, although other types of memories can be used. For example, disk drive 12 is coupled via UDMA interface 16 to a first FIFO 26, while disk drive 20 is coupled via its UDMA interface 24 to a second FIFO 28 and so on.

In each case, the UDMA interface accepts data from the drive and pushes it into the FIFO on the drive's read strobe. See signal 60 from drive 12 to FIFO 26 write WR input; signal 62 from drive 20 to FIFO 28 write WR input, and so on.

As noted above, this strategy is contrary to the PIO mode where the read strobe is provided to the drive by the controller. Should any of the FIFOs approach a full condition, the UDMA interface will "pause" by the method described in the ATA/ATAPI specification from NCITS. For this purpose, the FIFO or other memory system provides an "almost full" ("AF") signal 30, 32 that is asserted while enough space still remains available in the FIFO to accept the maximum number of words that a drive may send once "pause" has been asserted.

Data is removed from the FIFOs synchronously using a method similar to that described in U.S. Pat. No. 6,018,778. Specifically, after issuing read commands to all of the drives, we wait until there is data available for transfer in all of the FIFOs, i.e. that they are all indicating a "not empty" condition. This is illustrated in FIG. 6 by signals FE from each FIFO, input to a logic block 40 to generate the "all [FIFOs] have data" signal 42. After an indication that all FIFOS have data; i.e. all of the FIFOs have data from their corresponding drives, the read data is transferred.

The read data is transferred as follows. Each FIFO has a data output path, for example 46, 48—sixteen bits wide in the presently preferred embodiment. All of the drive data paths are merged, as indicated at box 50, in parallel fashion. In other words, a "broadside" data path is provided from the FIFOs to a buffer 52 that has a width equal to N times m bits, where N is the number of attached drives and m is the width of the data path from each drive (although they need not necessarily all have the same width) In the illustrated configuration, four drives are in use, each having a 16-bit data path, for a total of 64 bits into buffer 52 at one time.

The transfer of data from the FIFOs is driven by a common read strobe 44 broadcast to all of the FIFOs. The transfer into buffer 52 thus is made synchronously, using a single address counter 54 as shown, even though each of the drives is providing a portion of the read data asynchronously. Should any of the FIFOs become "empty", the process will stall until they all indicate "not empty" once again.

Figure 7:
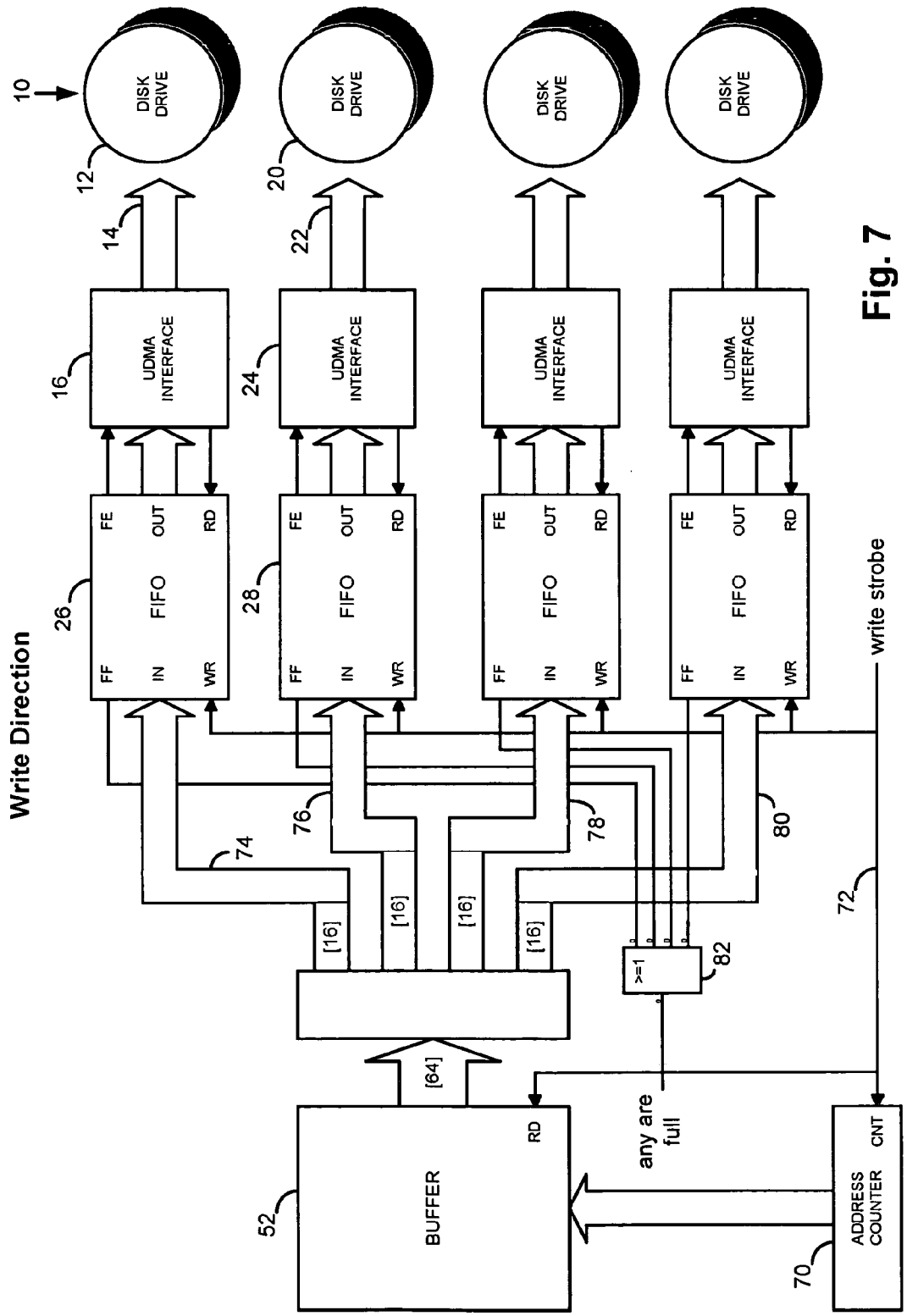
FIG. 7 is a simplified schematic diagram of a disk array system showing write data paths for writing to UDMA drives.

Referring now to FIG. 7, we describe the disk write operation. Once again, a FIFO is introduced in the data path between the controller and each of the drives. Data is read from the buffer 52 within the controller using a single address counter 70. In a presently preferred embodiment, since the drive to buffer data transfers are half-duplex, the FIFOs and address counters may be shared. Each FIFO has multiplexers (not shown) for exchanging its input and output ports depending on the data transfer direction.

Segments of the data words read from the buffer are pushed into each of the FIFOs using a common strobe 72, coupled to the write control input WR of each FIFO as illustrated. See data paths 74, 76, 78, 80. In this way, the write data is "striped" over the drives of the array. Should any of the FIFOs become "full" the process is stalled. This is implemented by the logic represented by block 82 generating the "any are full" signal.

On the drive side of the FIFOs, interfaces 16, 24 etc. implementing the UDMA protocol will pop data from the FIFOs and transfer it to the drives. While these transfers might start simultaneously, they will not be synchronous as each of the interfaces will respond independently to "pause" and "stop" requests from its drive.

This adaptation of UDMA to enable synchronous redundant data transfers through the use of FIFOs provides a significant advantage over the standard techniques for handling concurrent data transfer requests from an array of drives. The standard approach requires a DMA Channel per drive, i.e. more than one address counter. These DMA Channels contend for access to the buffer producing multiple short burst transfers and lowering the bandwidth achievable from the various DRAM technologies. We have determined that the buffer bandwidth due to the combination Disk Data Transfers, Host Data Transfers, and accesses for Redundant Data Computations becomes a bottleneck for most of the RAID controller designs. As noted above, the present invention requires only a single DMA channel for the entire array.

Data stored in a disk array may be protected from loss due to the failure of any single drive by providing redundant information. In a redundant array, stored data includes user data as well as redundant data sufficient to enable reconstruction of all of the user data in the event of a failure of any single drive of the array.

U.S. Pat. No. 6,237,052 B1 teaches that redundant data computations may be performed "On-The-Fly" during a synchronous data transfer. The combination of the three concepts: Synchronous Data Transfers, "On-The-Fly" redundancy, and the UDMA adapter using a FIFO per drive provides a high performance redundant disk array data path using a minimum of hardware.

Figure 8:
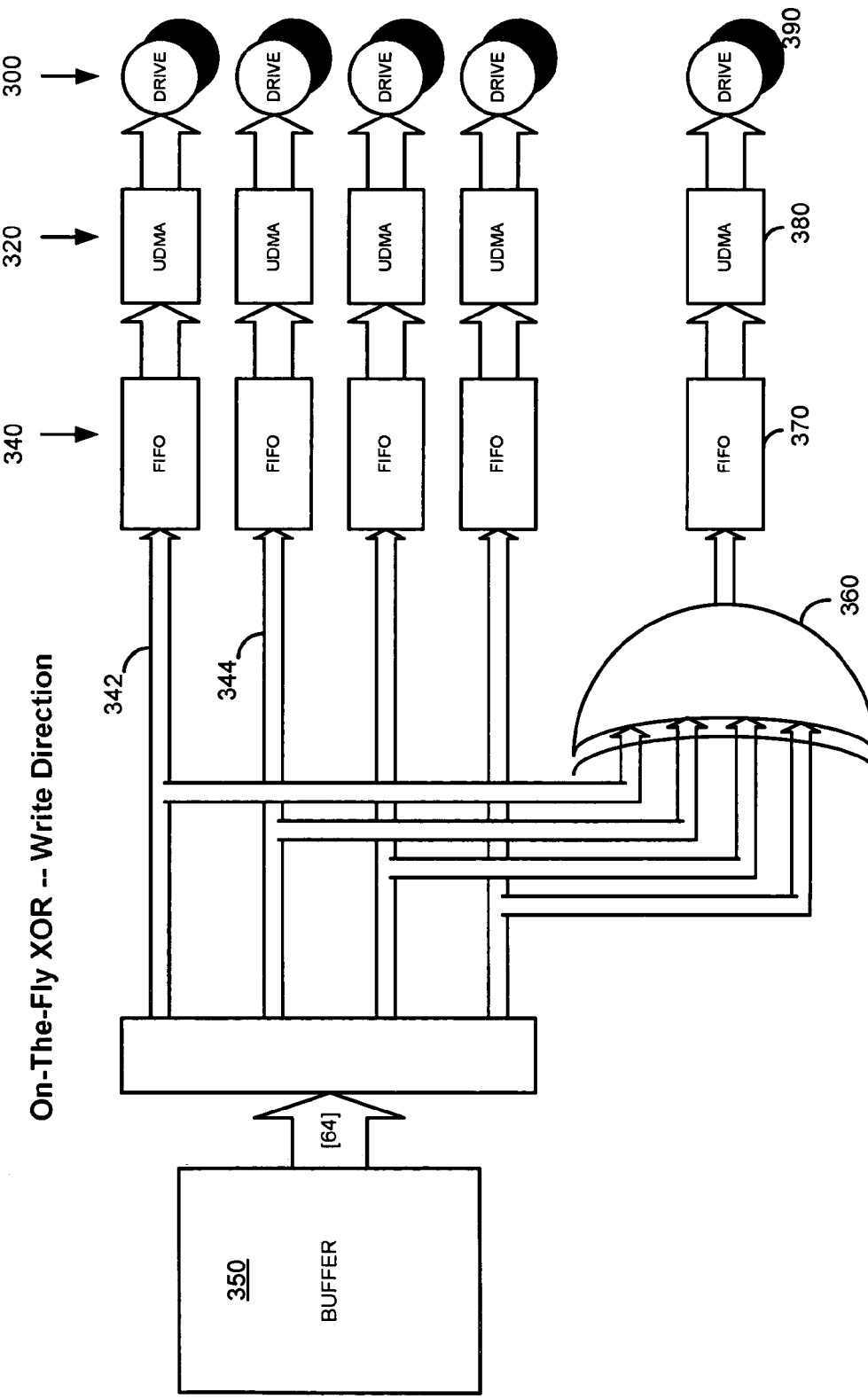
FIG. 8 is a simplified schematic diagram of a disk array write data path with "on the fly" redundant data storage.

While various arithmetic and logical operations might be used to generate a redundant data pattern, the XOR shall used in the current explanation. Referring now to FIG. 8, data flow in the write direction is shown. The drawing illustrates a series of drives 300, each connected to a corresponding one of a series of UDMA interfaces 320. Each drive has a corresponding FIFO 340 in the data path as before.

In the Disk Write direction, data words are read from the buffer 350. Segments of these data words, e.g. see data paths 342, 344, are written to each of the drives. At this point, a logical XOR operation can be performed between the corresponding bits of the segments "on the fly". XOR logic 360 is arranged to compute the boolean XOR of the corresponding bits of each segment, producing a sequence of redundant segments that are stored preliminarily in a FIFO 370, before transfer via UDMA interface 380 to a redundant or parity drive 390. Thus the XOR data is stored synchronously with the data segments. In other words, "On-The-Fly" generation of a redundant data pattern "snoops" the disk write process without adding any delays to it.

Figure 9:
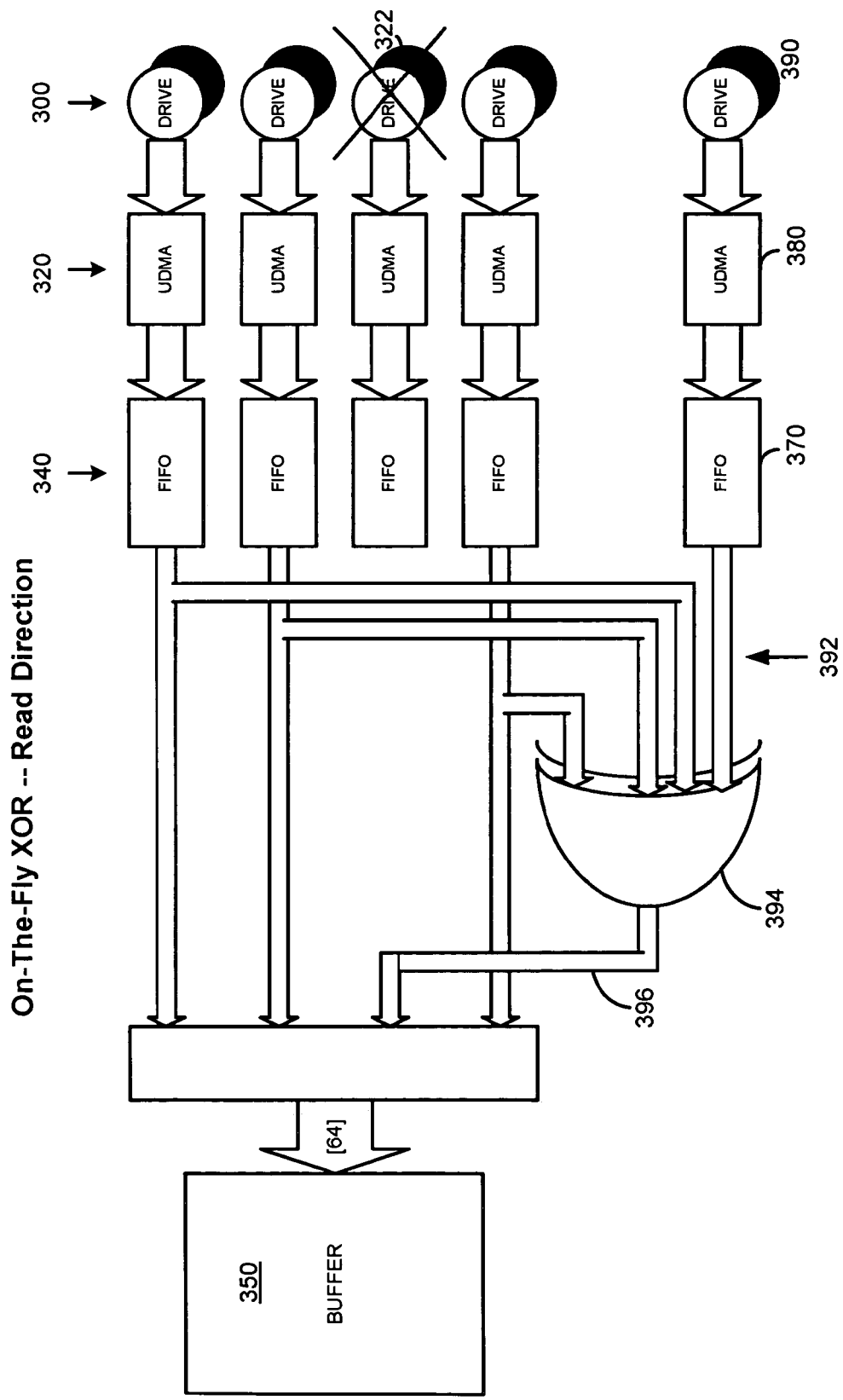
FIG. 9 is a simplified schematic diagram of a disk array read data path with "on the fly" regeneration of data with one drive failed.

Turning now to FIG. 9 in the drawing, a similar diagram illustrates data flow in the read direction. The array of drives 300, corresponding interfaces 320 and FIFO memories 340 are shown as before. In the Disk Read direction, the XOR is computed across the data segments read from each of the data drives and the redundant drive. Thus, the data segments are input via paths 392 to XOR logic 394 to produce XOR output at 396. If one of the data drives has failed (drive 322 in FIG. 9), the result of the XOR computation at 394 will be the original sequence of segments that were stored on the now failed drive 322. This sequence of segments is substituted for the now absent sequence from the failed drive and stored along with the other data in the buffer 350. This substitution can be effected by appropriate adjustments to the data path. This data reconstruction does not delay the data transfer to the buffer, as more fully explained in my previous patents.

Figure 10:
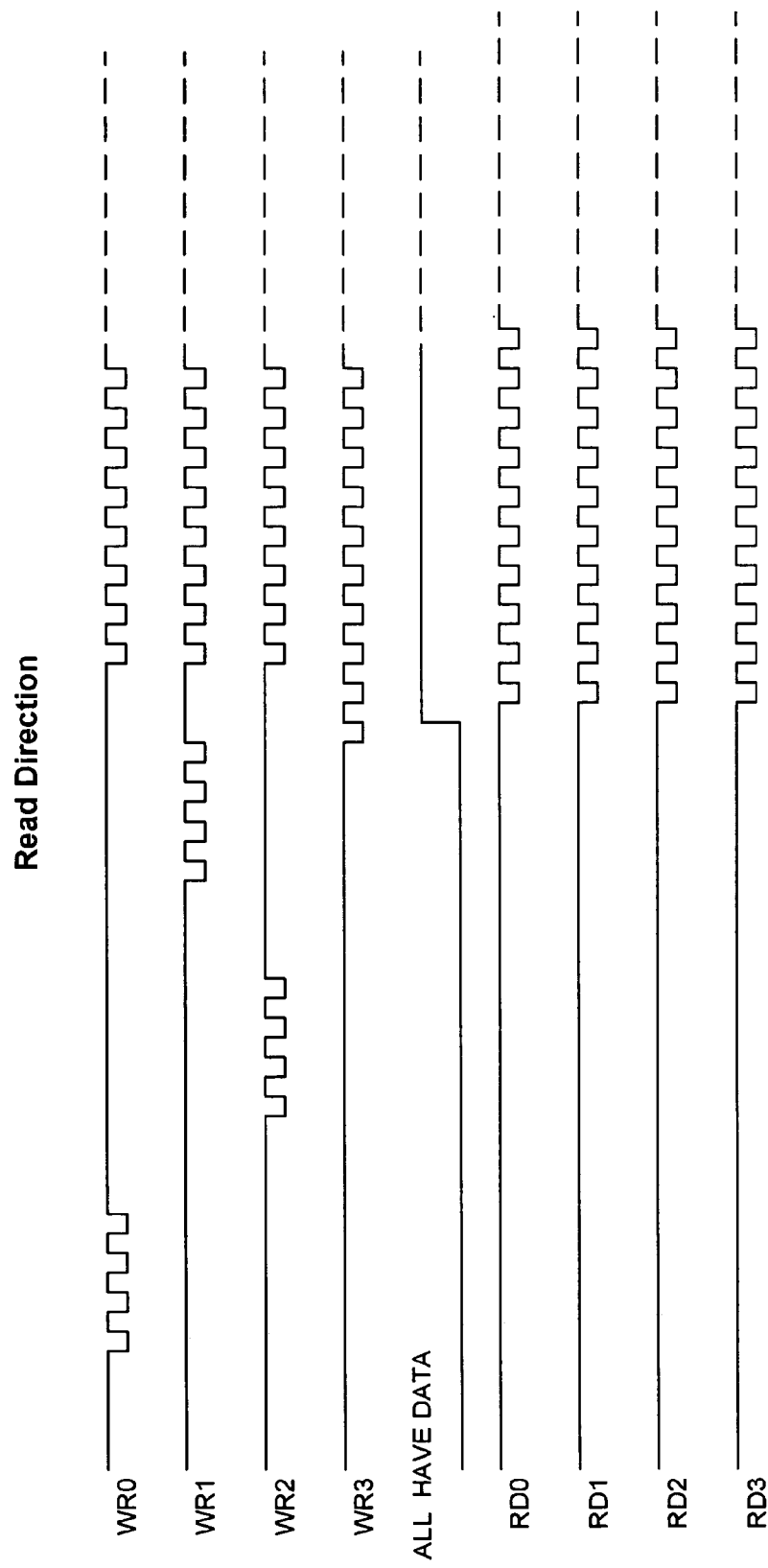
FIG. 10 is a timing diagram illustrating a disk array READ operation.

FIG. 10 is a timing diagram illustrating FIFO related signals in the disk read direction in accordance with the invention. As indicated, each drive is likely to have a different read access time. Once a drive has the target data in its local buffer, it asserts DMARQ (a DMA request). Next, upon receiving DMACK, it begins its data transfer into the FIFO. In the figure, Drive 0 happens to finish first and transfers data until it fills the FIFO. It is followed by Drives 2, 1, and 3 in that order. In this case, Drive 3 happened to be last. Once it begins to write the FIFO, all four FIFOs will be not empty allowing data to be removed synchronously from all four FIFOs with a common strobe, shown here as independent RD0-RD3 to emphasize that they are in fact synchronous.

In the prior art, the protection of data through the storage of redundant information has been a major part of the problem that they were trying to solve. For a Disk Read, many of the controllers have to wait until the data has been collected in the buffer. At this point, the data would be read from the buffer, the XOR computed, and the result put back. Given that there are still both host and disk accesses of the buffer, the access for the purpose of computing an XOR is a third access adding 50% to the bandwidth requirements of the buffer. The read/modify/write operations required by a local processor to perform this task were too slow, so specialized DMA hardware engines have been designed for this process. The time required to compute the XOR is reduced, but a third pass over the data in the buffer is still required.

In many of the implementations, new data is written to the disk immediately. The writes to the parity drive must be postponed until the XOR computation has been completed. These write backs accumulate and the parity drive becomes a bottleneck for write operations. Many designs try to solve this problem by distributing the parity over all of the drives of the array in RAID 5. Another approach used in the prior art is an attempt to compute the redundancy as data is transferred from the host or to the drives. Since these transfers occur at different times, the "accumulator" for the intermediate results is a full sector or more of data. This avoids the need for additional buffer accesses, but at the cost of greatly increased complexity.

As noted above, the current invention does not require 50% more buffer bandwidth for XOR computation accesses, or buffer space to store redundant data, or specialized DMA engines to perform read/modify/write operations against the buffer contents, or specialized buffers to store intermediate results from XOR computations. In one embodiment, a disk array controller is implemented on a computer motherboard. It can also be implemented as a Host Bus Adapter (HBA), for example, to interface with a PCI host bus.

II. Applications of a Data Path Switch

My previous Synchronous Redundant Data Transfer patent teaches a simple striping in which we simply interleave data from two or four data drives. The "Array Switch" (also referred to herein as a "Data Path Switch") described below incorporates new features and methods that allow us to stripe over three data drives as well. This is important when you only have four drives (total). Other uses and advantages are described below.

In the following description of the physical drive ports, mapping registers, and data paths through the Array Switch, it should be noted that other implementations or embodiments may have other numbers of physical ports e.g. 8, 12, 16 etc. Such variations are well within the scope of the present invention.

The disclosed Array Switch includes features that facilitate support for RAID5. RAID5 is an optimization for small random accesses whereas RAIDXL is an optimization of large sequential accesses. RAID5 performance is usually measure in IOPS (IO Operations Per Second) as opposed to MBPS (Megabytes per second). These features use the XOR hardware that already exists for the "On the fly XOR" with a new single sector buffer, accumulator, and appropriate sequencing to achieve the RAID5 functionality. The principle RAID5 functions supported are FULL STRIPE READ WITH FAILED DRIVE, READ FROM FAILED DRIVE, FULL STRIPE WRITE, and PARTIAL STRIPE UPDATE.

The Array Switch implements data paths. The configuration of the Array Switch defines arrays consisting of one or more drives. An array of individual drives is known as a JBOD, Just a Bunch of Drives. Multiple drives are involved for RAID0, RAID1, RAIDXL and RAID5. In a given instant, the Array Switch might be performing any of these functions. It is capable of supporting all of them concurrently.

The following Definitions are used in this section and the associated drawings:

Array: A subset of the drives attached to a controller. Arrays may consist of one to four drives.

Logical Drive: The data drives of an array are numbered starting with zero. The logical drives are L0, L1, L2, and L3.

Parity Drive: An array may have a single redundant or parity drive. The parity drive shall be PAR.

SATA Port: A SATA port provides an interface to a disk drive meeting the requirements of the Serial ATA specifications. The SATA ports are SATA 0, SATA 1, SATA 2, and SATA 3.

Physical Drive: A disk drive shall take its identification from the SATA port to which it is attached. The Physical drives shall be Drive 0, Drive 1, Drive 2, and Drive 3.

Sector. The sector is the smallest addressable block of disk data. For our purposes, a sector shall be 512 bytes.

LBA: The sectors of a disk drive are identified by a Logical Block Address or LBA. LBAs are assigned from zero up to the maximum number required to address the capacity of the drive.

Striping: In arrays with more than one data drive, the data is distributed over the data drives of the array. A stripe width is selected. The capacity of each of the logical drives is viewed as a series of blocks of the stripe width. The capacity of the array is mapped to the first of these blocks on each of the logical drives of the array in logical drive sequence, then to the second blocks, etc. For RAID0 or RAID5, the stripe width shall be a "power of two" number of sectors. For RAIDXL, the stripe width shall be one DWORD.

RAID1: In this mode, there is a single logical drive and a PAR drive that holds a mirror image of the contents of the logical drive. In this mode, the pair of drives looks like a single drive to the host system.

RAIDXL: This mapping uses DWORD interleave, with or without a parity drive. In this mode, the drives of the array including the parity drive appear to the host system as a single drive.

Data Mapping Diagram—Notes. In drawing FIGS. 15A-17:

Drive numbers shown are the "logical" drives of an array.

All numeric values are sequence numbers of blocks of stripe width.

The [+] indicates the XOR of the blocks listed.

The notation (n), (n+1), (n+2) . . . indicates that the logical drives data includes portions of these blocks.

The notation [n] indicates that the logical drive has the nth relative segment of the DWORD interleave.

In the data mapping diagrams, The first column labels that axis. Going across, we show striping for two, three, and four drive arrays. Striping is simply a distribution of data across the available drives. Let's pick a stripe size, i.e. 16K bytes of user data. For the two drive array, the first 16K of user data will go on drive 0. The next 16K of user data will go on drive 1. The third 16K of user data, called block 2, goes on drive 0, and fourth 16K of user data, called block 3, goes on drive 1.

This process repeats until the drives have been filled. The process is similar for three and four data drives.

FIG. 15B shows the data mapping for RAID1. Regardless of the stripe size, the second drive is an exact copy of the first. (I worry about using the term "Mirror Image". FIG. 16A shows the Mapping for RAIDXL without the redundant drive. FIG. 6B shows the data mapping for RAIDXL with redundancy. In RAIDXL, the user data is striped DWORD wide which is 32 bits. (Note that a mode may be provided for 16 bit striping to provide a migration path for data stored on the current controller). In the three drive array, the first two sectors of user data are stored on the first two sectors of the pair of drives. Drive 0 has the even words of user data sectors 0 and 1 as indicated by the notation 0,1 [0 ]. Drive 1 has the odd words of user data sectors 0 and 1 as indicated by the notation 0,1[1 ]. The parity drive has the XOR of the first two sectors of user data as noted by 0,1[+]. With this notation, 8,9,10,11[3 ] means every fourth word of user data sectors 8,11.

Figure 11:
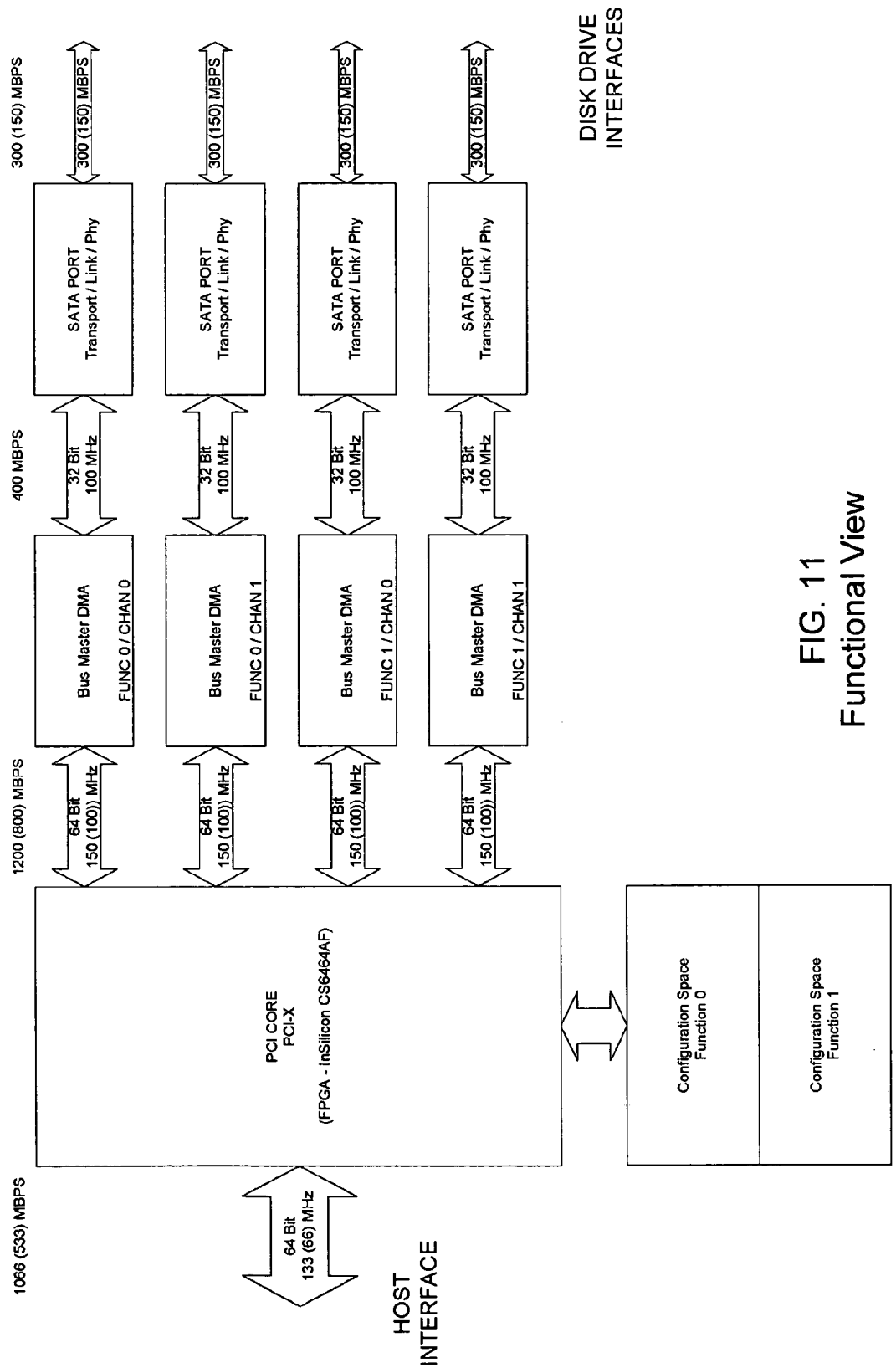
FIG. 11 is a functional view of a disk array controller showing the logical data path and DMA channel for each physical port.
Figure 12:
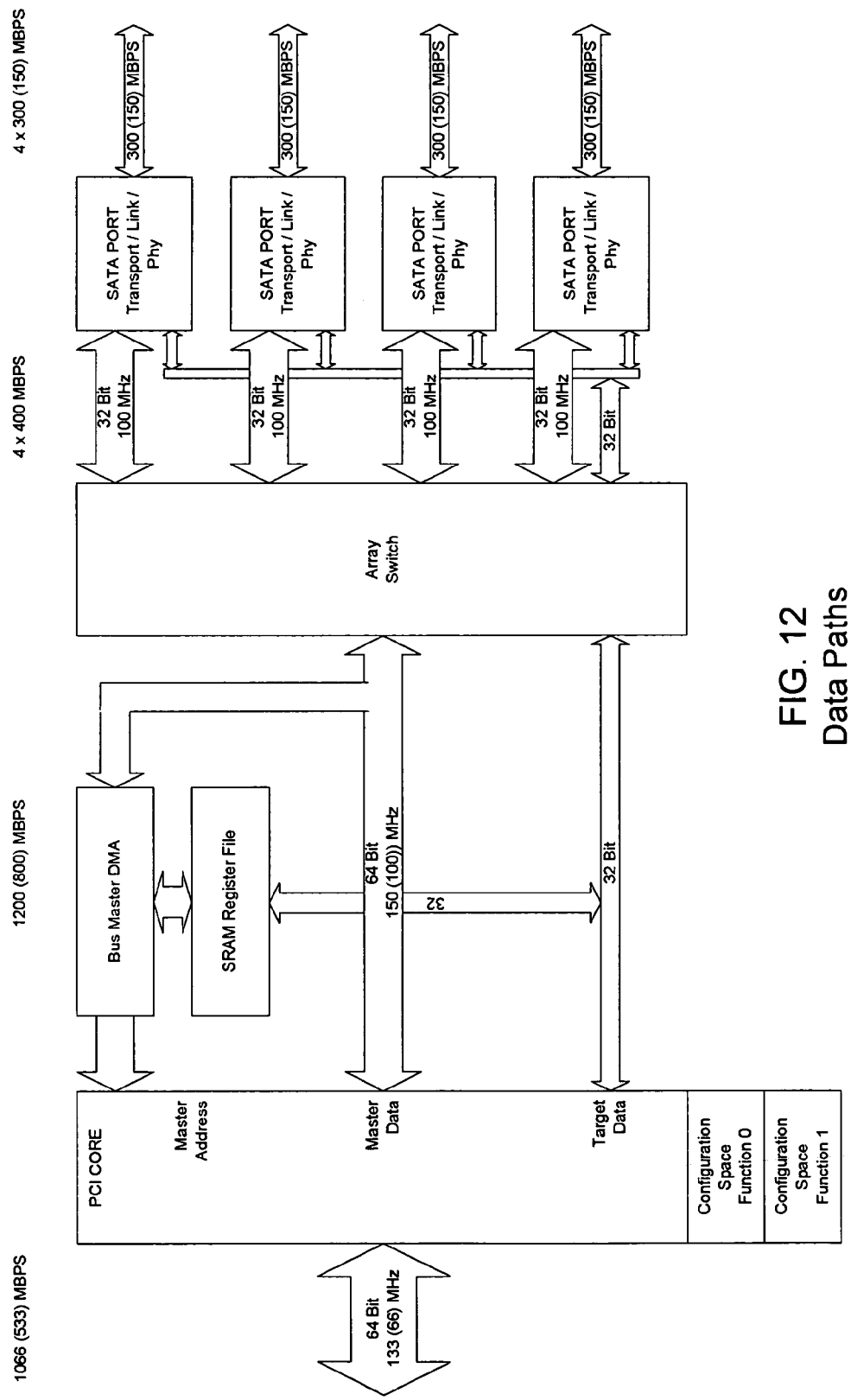
FIG. 12 shows the actual implementation with a single physical DMA channel and the data paths for all of the physical ports being provided by the Array Switch. The DMA contexts for each of the physical ports are stored in a RAM.
Figure 13:
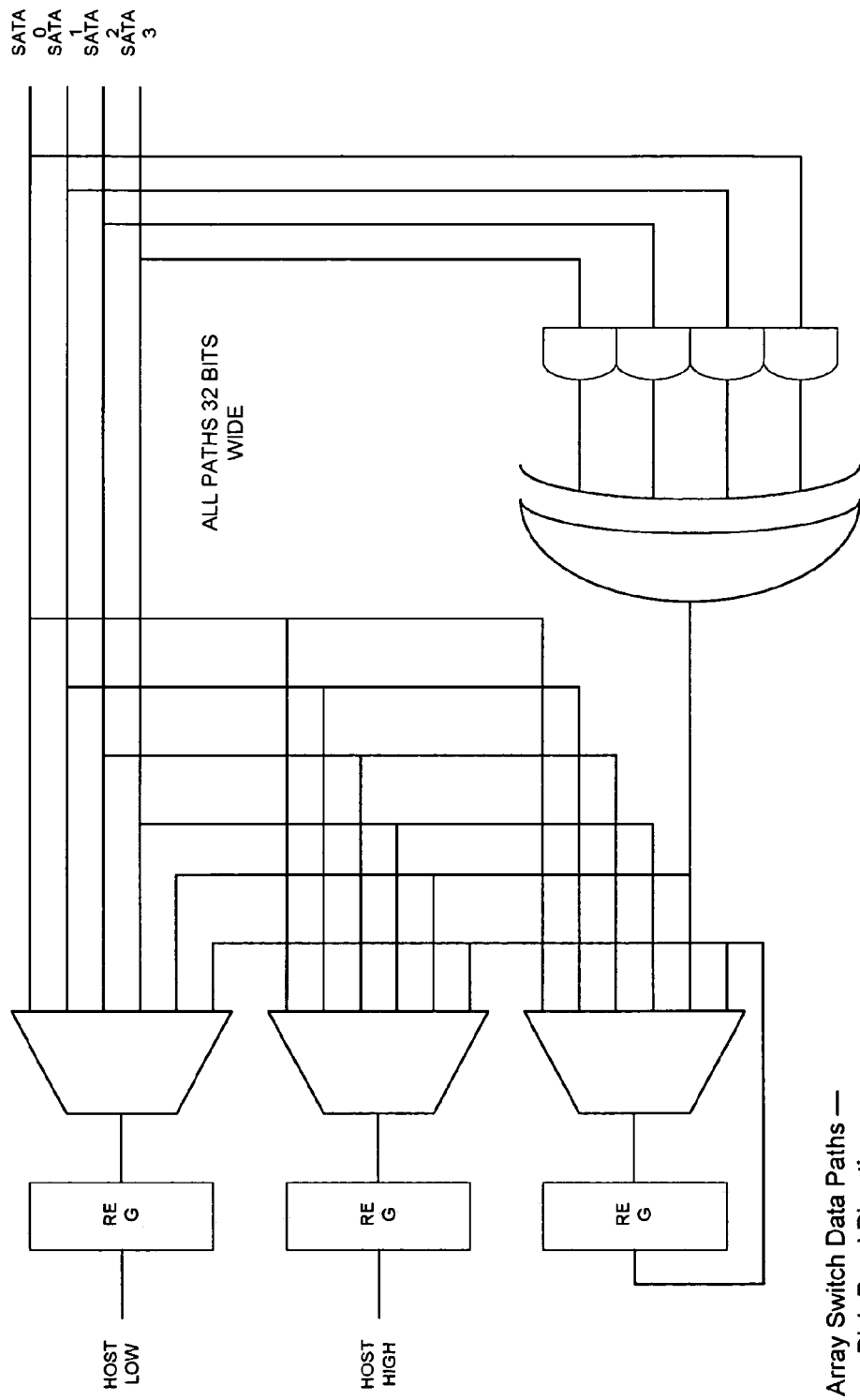
FIG. 13 illustrates the Array Switch data path setup for a Disk Read.
Figure 14:
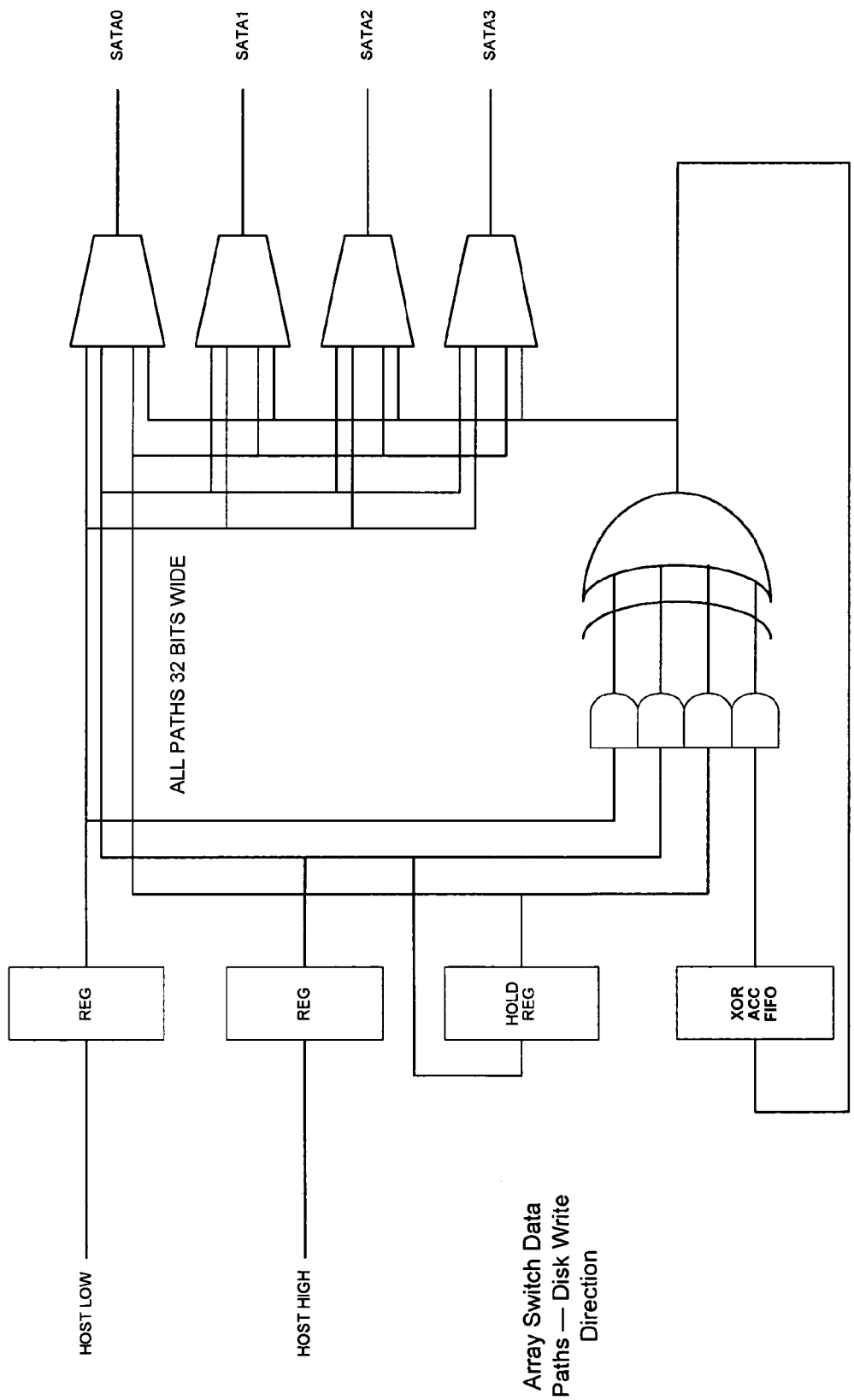
FIG. 14 illustrates the Array Switch data path setup for a Disk Write.

Array Switch:

The Array Switch has four sets of registers, one for each SATA port. These registers are used to define individual drives or arrays. Each register set has Mapping, Burst Length, Fast Read, and Command registers. See FIG. 18 and various configurations detailed below. In a preferred embodiment, the host software driver configures the Array Switch by loading the mapping registers. Thereafter, the system illustrated in FIGS. 11 and 12, by way of illustration and not limitation, executes disk access operations in accordance with the current configurations and provides improved RAID functions as described below.

The Mapping field has one byte for each physical port. This field is used to indicate if the corresponding physical port/drive is used by the array defined by the particular register set. If the drive is used, it will indicate if it is the parity drive or a data drive. In the case of a data drive, it will indicate the logical drive number and whether or not the drive has failed.

The burst length is essentially the number of logical data drives. It is the burst length in sectors that are to be transferred contiguously.

The Fast Read flag indicates that, in a redundant array in which no drive has failed, whether or not the parity data is to be read and checked on a read. If not, the read will be faster due to the reduced rotational latency, i.e. "fast reads."

The Command register is loaded with one of the Array Switch primitives which are defined below.

JBOD: (Just a Bunch of Drives) See FIG. 18A.

This is the default contents of the Array Switch following a power on reset. Each SATA port/physical drive is an independent single drive array using the corresponding DMA channel in the Host interface for data transfers. The software driver will send commands to the SATA port. When requested by the SATA port, the Array Switch will transfer single sector packets between the SATA and a buffer on the PCI Bus using the DMA channel.

RAID1: See FIG. 18B

This configuration always involves two drives, a data drive and a parity drive. The map shows that logical drive 0 is attached to physical port 0 and that the parity drive is attached to physical port 1. The parity drive maintains an exact copy of the data drive. In RAID1, the two drive array appears to the Host as a single drive. On a Disk Write, the Array Switch logic cause the write command to be broadcast to the two drives and the same data is written to both of them. For a "Fast Read" the command is sent only to the data drive and only the data drive is accessed. For a "Slow Read" the command is broadcast to the two drives. Both drives are accessed and the contents of the PAR drive are checked against the contents of the data drive. The gray bar on the second line indicates that the port 1 registers are not available as this port is already used by the array defined in port 0.

RAID1—Fast Reads: See FIG. 18C

This configuration is similar to the previous one. Two drives are involved and their contents are always the same. In the third register set, the array'is defined with L0 on port 2 while in the fourth register set, L0 is on port 3. As noted above, a "fast read" only accesses the data drive. By defining the array twice with L0 on two different drives, different portions of the data set on the drives may be accessed concurrently. For writes, the software driver must insure that only one of the drives is accessed and that there are no concurrent reads attempted as both drives will be involved with the write.

RAIDXL (Common Information): See FIG. 19

In a RAIDXL, the data is striped DWORD wide across the data drives of the array. The first DWORD is stored on the first logical drive; the next DWORD is stored on the next logical drive, etc. until each logical drive has received one DWORD. The DWORD computed by the bitwise XOR of the DWORDS on the data drives is stored on the parity drive (if present). This distribution is repeated throughout the disk. A given sector of user data will be distributed across each of the data drives of the array. In order to access a given sector, all of the drives of the array must be accessed.

The minimum addressable data block of the drives that make up the array is also one sector, so any physical disk access will involved at least one sector from each data drive making the minimum transfer length equal to the N sectors where N is the number of data drives. Since all of the segments of a given stripe are stored at the same relative locations on each of the data drives, the read or write commands required to access these segments are identical. This allows common commands to be broadcast to all of the drives for any access making the array appear to the Host as a single drive. On a given access, it is possible that one or more of the drives will have an error. Any drive error must be resolved through accesses to specific drive exhibiting the error.

If the parity drive is present, there is the option on a read access of reading the parity drive as well as the data drives. The XOR of the data is recomputed and compared with the data from the parity drive. An error is indicated if they do not match. The computation does not increase the access time, but accessing an additional drive does increase the average rotational latency for the access. The option of checking the parity data may be declined by asserting "fast reads." The parity drive is always accessed on writes in either case.

The benefit of the parity drive is that it allows the array to continue to operate even though one of the drives has failed. The failure of the parity drive is a trivial case. The array simply becomes a RAIDXL without parity. If one of the data drives fails, the array switch is reprogrammed to indicate the position of the failed drive. The indicated drive will no longer receive any of the broadcast commands or participate in any of the data transfers. The parity drive will be accessed on reads and writes regardless of the state of "fast read." On a read, the XOR of all of the remaining data drives and the parity drive will be computed. The result of this computation is equivalent to the data that was or would have been stored on the failed drive. This data is inserted in place of the data that would have been read from the failed drive. On a write, the parity drive receives the result of the computation based on all of the write data in the usual fashion even though the data for the failed drive is discarded.

The software driver receives access requests from the operating system. These requests are extended at each end by a sector or two as required to get to a stripe boundary. A command for the drives is built by dividing the resulting LBA address and sector count by the number of data drives. Note that the extended commands will divide evenly. If there are three data drives, a given drive's LBA and count will be only ⅓ of the users LBA and count because each drive stores only ⅓ of the data. The Array Switch will merge the data streams from the array into a single stream for transfer to or from the user's buffer.

The software driver must deal with the fact that it has extended the users request. The DMA is going to transfer the total requested count. For a read, the driver shall create a scatter list that directs any sectors appended to the front or back end of the requested data to a discard buffer. The requested data is transferred directly. For a write, appended sectors at either end will require a read/modify/write operation for that end. For a read/modify/write operation, the driver would first read the target stripe that includes added sectors into a buffer. It would then build a gather that picks up the extension sectors from these stripe buffers as required and the user's data directly.

Figure 4:
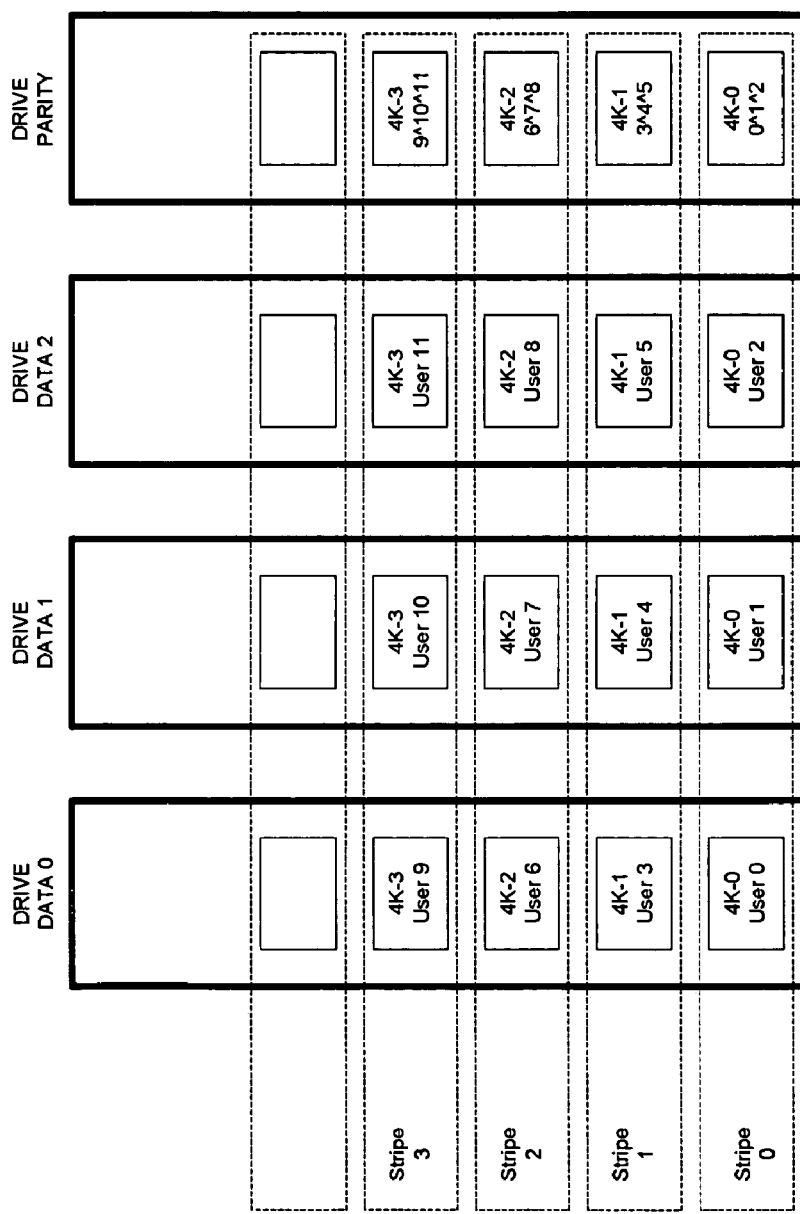
FIG. 4 illustrates striping over three data drives plus a redundant drive.

XOR operations can be implemented "on the fly" using the XOR accumulator FIFO hardware illustrated in FIG. 4 as more fully explained in the issued patents listed above.

RAIDXL—2 Drive—No Parity: See FIG. 19A

The Map shows that logical drive 0 is on physical port 0 and that logical drive 1 is on physical port 1. The minimum transfer length is one sector per data drive for a total of 2. Commands written to physical port 0 are broadcast to both of them. Data transfer requests from either port are ignored until both ports are ready to transfer data. Data is transferred using a single DMA channel corresponding to the Array Switch register set. The gray bar indicates that physical port 1 is used by the current array.

RAIDXL—3 Drives—No Parity: See FIG. 19B

The Map shows that logical drive 0 is on physical port 0, logical drive 1 is on physical port 1, and logical drive 2 is on physical port 2. The minimum transfer length is one sector per data drive for a total of 3. Commands written physical port 0 are broadcast to all of them. Data transfer requests from either port are ignored until all three ports are ready to transfer data. Data is transferred using a single DMA channel corresponding to the Array Switch register set. The gray bar indicates that physical ports 1 and 2 are used by the current array. The referenced Synchronous Redundant Data Transfer patent teaches simple striping where the number of data drives is a power of two and the data from the drives is simply interleaved to reconstitute the use data. In the current invention, new hardware is introduced which extends the concept to arrays in which the number of data drives may be other than a power of two. In order to demonstrate the concept, consider an array with three data drives. The data path to the physical drive port is DWORD wide and the data path to the Host System interface is QWORD wide. The minimum access is one sector per drive in which three sectors of user data are distributed over single sectors on each of the three data drives. The hardware will read data synchronously from each of the physical drive data port twice yielding a total of six DWORDS. Of the three DWORDS obtained from the first read, two DWORDS are sent to the Host System and one is held in a register. Following the second read, the hardware will be holding a total of four DWORDS which are sent to the host in two cycles, the first with the DWORD from the register and the first of the DWORDS from the second read and the next with the balance of the DWORDS from the second read. This process is repeated for the balance of the sectors.

RAIDXL—4 Drives—No Parity: See FIG. 19C

The Map shows that logical drive 0 is on physical port 0, logical drive 1 is on physical port 1, logical drive 2 is on physical port 2, and logical port 3 is on physical port 3. The minimum transfer length is one sector per data drive for a total of 4. Commands written physical port 0 are broadcast to all of them. Data transfer requests from either port are ignored until all three ports are ready to transfer data. Data is transferred using a single DMA channel corresponding to the Array Switch register set. The gray bar indicates that physical ports 1, 2, and 3 are used by the current array.

RAIDXL—3 Drives—Parity: See FIG. 19D

The Map shows that logical drive 0 is on physical port 0, logical drive 1 is on physical port 1, and the parity drive is on physical port 2. The minimum transfer length is one sector per data drive for a total of 2. Commands written to physical port 0 are broadcast to both of them. For writes or "slow reads" commands written to physical port 0 are broadcast to all three ports. For "fast reads" commands are broadcast to only the data ports. Data transfer requests from any port are ignored until all of the accessed ports are ready to transfer data. Data is transferred using the corresponding DMA channel. The gray bar indicates that physical port 1 and physical port 2 are used by the current array.

RAIDXL—4 Drives—Parity: See FIG. 19E

The Map shows that logical drive 0 is on physical port 0, logical drive 1 is on physical port 1, logical drive 2 is on physical port 2, and the parity drive is on physical port 3. The minimum transfer length is one sector per data drive for a total of 3. Commands written to physical port 0 are broadcast to both of them. For writes or "slow reads" commands written to physical port 0 are broadcast to all three ports. For "fast reads" commands are broadcast to only the data ports. Data transfer requests from any port are ignored until all of the accessed ports are ready to transfer data. Data is transferred using the corresponding DMA channel. The gray bar indicates that physical port 1, physical port 2, and physical port 3 are used by the current array.

RAIDXL—3 Drives—Parity—Drive Failed: See FIG. 20A

In this example, the Map field corresponding to physical port 0 has been modified to show that the drive has failed. This drive had stored the data for logical drive 0 of the current array. With this Map configuration, physical port 0 will no longer be accessed for reads or writes and while the parity drive will be accessed for either. On a read, the data for the failed drive is reconstructed by computing the XOR of the data from all of the remaining drives of the array. On a write, the XOR of the data being written to all of the logical drives is computed and stored on the parity drive even though the data that was to be written to the failed drive is discarded.

RAIDXL—4 Drives—Parity—Drive Failed: See FIG. 20B

In this example, the Map field corresponding to physical port 1 has been modified to show that the drive has failed. This drive had stored the data for logical drive 1 of the current array. With this Map configuration, physical port 1 will no longer be accessed for reads or writes and while the parity drive will be accessed for either. On a read, the data for the failed drive is reconstructed by computing the XOR of the data from all of the remaining drives of the array. On a write, the XOR of the data being written to all of the logical drives is computed and stored on the parity drive even though the data that was to be written to the failed drive is discarded.

RAID0 (Common Information):

In RAID0, the stripe width is a "power of two" number of sectors. With a strip width of 32 sectors, for example, the first 32 sectors of user data are stored on logical Drive 0, the next 32 on logical Drive 1, etc until 32 sectors have been stored on each of the logical data drives. This process is repeated throughout the capacity of the disks. RAID0 functionality is implemented entirely within the software driver using SATA ports/disk drives in the JBOD mode. The present system does not provide any hardware support for RAID0. Upon receipt of an access request from the operating system, the software driver will break request into a sequence of accesses to the drives of the array. This includes locating segments of the user buffer, error handling, and reporting completion.

RAID5 (Common Information):

RAID5 differs from RAID0 in two ways. First, there is a parity drive. The bitwise XOR of the information stored in a given stripe of the data drives is computed and stored on the corresponding stripe of a parity drive. And second, the logical to physical assignments of the data and parity drives is rotated between stripes in such a way as to distribute the parity information over all of the drives of the array. Normal read accesses (that do not involved the parity drive) of a RAID5 array are the same as read accesses of a RAID0 array except for the fact that the software driver must allow for the rotation of logical to physical drives between stripes. RAID5 disk write operations or reads with a one drive failed do involve accesses of the parity drive and are more complex. The present system does include hardware functions to assist the software driver in these operations.

In RAIDXL, a contiguous stream of user data is interleaved between the data drives. For this reason, it is convenient for any access to use a single DMA channel transferring data between a single user buffer and the array. In RAID5, the segment of a stripe stored on a give data drive may be many Kilobytes of data. Accessing a stripe requires data transfers between data buffers and drives where the data buffers are located many Kilobytes apart. For this reason, a DMA channel is used for each data drive. The segments could be transferred sequentially sharing a single DMA channel, but this limits the performance and implies a huge amount of buffering in order to perform the XOR computations. Furthermore, we already have a DMA channel per drive for the JBOD facility. The registers of the Array Switch must be programmed for each RAID5 primitive. This is mostly due to the rotation of the logical to physical drives between stripes and also to borrow the SATA ports normally assigned for JBOD.

RAID5—3 Drives—Full Stripe Read With Drive Failed: See FIG. 21A

In this example, a stripe is accessed in which logical drive 0 is assigned to SATA 0 and the parity drive is assigned to SATA 3. Logical drive 1 was assigned to SATA 1, but this drive has failed. Since the data format was striped over two drives, the minimum transfer length is still 2 even though one of the data drives has failed. A DMA channel must be programmed for each of the logical drives including Channel 1 whose drive has failed. What must happen here is that the segment of the stripe stored on Drive 0 will be transferred to the buffer indicted by DMA Channel 0. The segment stored on Drive 0 must be XORed with the segment stored on the parity drive reconstructing the data that was or would have been stored on Drive 1. The result must be sent to the buffer indicated by DMA Channel 1.

While these accesses are independent for RAID0, they must be synchronized in order to accomplish the XOR computation. The Array Switch has a single sector buffer into which it can store the output of the XOR logic. The command is written to physical port 0 and will be broadcast to ports 1 and 3. The Array Switch will wait until all of the accessed drives are ready to transfer at least one sector. It then will transfer one sector from the SATA port of the first non-failed logical data drive to the host using that drives DMA channel. The XOR logic snoops the transfer capturing a copy of the sector in its XOR buffer. In sequence, it will transfer one sector each from the balance of the non-failed data drives, accumulating the XOR of each new sector with the current contents of the buffer. Then it will take one sector from the parity drive, XOR it with the contents of the buffer and sending the result to the host using the DMA channel of the failed drive.

At this point, we have taken one sector from each of the active ports and written one sector to each of the host buffers. This process is repeated until all data has been transferred. If the driver had to extend the user's request to create a full stripe request, the appended sectors may be discarded using the scatter mechanism as in the RAIDXL case.

RAID5—3 Drives—Read Failed Drive: See FIG. 21B

In this example, a segment of the stripe that was stored on the failed drive is accessed. Logical Drive 0 is assigned to SATA 0 and the parity drive is assigned to SATA 3 as in the previous example. Only the DMA channel for the failed drive is programmed since this will be the only data transferred. As in the previous example, all of the remaining drives of the array including parity drive are accessed.

Commands are broadcast to all of the accessed drives. The Array Switch waits until all of the accessed drives are requesting a data transfer. One sector of data is then transferred synchronous each of the accessed drives. The data from all of the accessed drives is transferred synchronously, the XOR of this data is computed "on the fly" and the result in stored in the Host buffer indicated by the DMA channel. This process is repeated until all of the data has been transferred.

RAID5—4 Drives—Full Stripe Read With Drive Failed: See FIG. 21C

In this example, a stripe is accessed in which logical drive 0 is assigned to SATA 0, logical drive 1 is assigned to SATA 1, and the parity drive is assigned to SATA 3. Logical drive 2 was assigned to SATA 2, but this drive has failed. Since the data format was striped over three drives, the minimum transfer length is still 3 even though one of the data drives has failed. A DMA channel must be programmed for each of the logical drives including Channel 2 whose drive has failed.

What must happen here is that the segment of the stripe stored on Drive 0 will be transferred to the buffer indicted by DMA Channel 0. The segment of the stripe stored on Drive 1 will be transferred to the buffer indicted by DMA Channel 1. The segments stored on logical drives 0 and 1 must be XORed with the segment stored on the parity drive reconstructing the data that was or would have been stored on Drive 2. The result must be sent to the buffer indicated by DMA Channel 2.

While these accesses are independent for RAID0, they must be synchronized in order to accomplish the XOR computation. The Array Switch has a single sector buffer into which it can store the output of the XOR logic. The command is written to physical port 0 and will be broadcast to ports 0, 1, and 3. The Array Switch will wait until all of the accessed drives are ready to transfer at least one sector. It then will transfer one sector from the SATA port of the first non-failed logical data drive to the host using that drives DMA channel. The XOR logic snoops the transfer capturing a copy of the sector in its XOR buffer. In sequence, it will transfer one sector each from the balance of the non-failed data drives, accumulating the XOR of each new sector with the current contents of the buffer. Then it will take one sector from the parity drive, XOR it with the contents of the buffer and sending the result to the host using the DMA channel of the failed drive.

At this point, we have taken one sector from each of the active ports and written one sector to each of the host buffers. This process is repeated until all data has been transferred. If the driver had to extend the user's request to create a full stripe request, the appended sectors may be discarded using the scatter mechanism as in the RAIDXL case.

RAID5—4 Drives—Read Failed Drive: See FIG. 21D

In this example, a segment of the stripe that was stored on the failed drive is accessed. Logical Drive 0 is assigned to SATA 0, Logical drive 1 is assigned to SATA 1, and the parity drive is assigned to SATA 3 as in the previous example. Only the DMA channel for the failed drive, channel 2 in this case, is programmed since this will be the only data transferred. As in the previous example, all of the remaining drives of the array including parity drive are accessed. Commands are broadcast to all of the accessed drives. The Array Switch waits until all of the accessed drives are requesting a data transfer. One sector of data is then transferred synchronous from each of the accessed drives. The data from all of the accessed drives is transferred synchronously, the XOR of this data is computed "on the fly" and the result in stored in the Host buffer indicated by the DMA channel. This process is repeated until all of the data has been transferred.

RAID5—3 Drives—Full Stripe Write: See FIG. 22A

Referring now to FIG. 22, In this example, logical drive 0 is assigned to SATA 0 and logical drive 1 is assigned to SATA 1. The parity drive is on SATA 2. Since the data format is striped over two drives, the minimum transfer length is 2. DMA Channels must be programmed for each of the data drives. The command is written to SATA 0 and will be broadcast to SATA 0, SATA 1, and SATA 2. The Array Switch will wait until all of the active SATA ports are ready to receive data. It will then transfer one sector to logical drive 0 on SATA 0 using the buffer indicated by DMA channel 0.

This transfer is snooped by the Array Switch and a copy of the sector is captured in the XOR buffer. One sector each is then transferred for each of the remaining data drives, in sequence. As each sector goes by, the XOR is accumulated with the current contents of the buffer. As the final sector is stored on its data drive, the result of the XOR computation is synchronously stored on the parity drive. At this point, one sector has been taken from each of the host buffers and one sector has been written to each of the data drives and the parity drive. The process is repeated until all of the data has been written. As with RAIDXL, a user level access may involve less than a full stripe. The user request may be extended to stripe boundaries. These extensions will require read/modify/write operations as previously described.

RAID5—4 Drives—Full Stripe Write: See FIG. 22B

Referring again to FIG. 22, In this example, logical drive 0 is assigned to SATA 0 and logical drive 1 is assigned to SATA 1, and logical drive 2 is assigned to SATA 2. The parity drive is on SATA 3. Since the data format is striped over two drives, the minimum transfer length is 3. DMA Channels must be programmed for each of the data drives. The command is written to SATA 0 and will be broadcast to SATA 0, SATA 1, SATA 2, and SATA 3. The Array Switch will wait until all of the active SATA ports are ready to receive data. It will then transfer one sector to logical drive 0 on SATA 0 using the buffer indicated by DMA channel 0. This transfer is snooped by the Array Switch and a copy of the sector is captured in the XOR buffer. One sector each is then transferred for each of the remaining data drives, in sequence. As each sector goes by, the XOR is accumulated with the current contents of the buffer. As the final sector is stored on its data drive, the result of the XOR computation is synchronously stored on the parity drive. At this point, one sector has been taken from each of the host buffers and one sector has been written to each of the data drives and the parity drive. The process is repeated until all of the data has been written. As with RAIDXL, a user level access may involve less than a full stripe. The user request may be extended to stripe boundaries. These extensions will require read/modify/write operations as previously described.

RAID5—Partial Strip Update: See FIG. 22C

Referring again to FIG. 22, In RAID5, a user might write a single sector. It is possible to update the parity drive without doing a read/modify/write of the entire stripe. Only the data on the target data drive and parity drive are going to change. This leaves the other drives available for concurrent read accesses or the other pair of drives available for a concurrent partial stripe update. Following the update, the parity drive must contain the XOR of the entire stripe including the new data, but it already has the XOR of the entire stripe with the current data. The traditional RAID5 approach to this problem is to read the data segment that is going to be replaced and to read the current parity data. The two are XORed giving the parity of the balance of the stripe with the target data segment removed from the result. The new data segment is then written to the array and it is XORed with the result of the previous computation yielding the XOR of the updated stripe including the updated data segment. This is written to the parity drive. The Array Switch hardware includes features designed to facilitate this process.

As described above, a partial stripe update involves only one data drive and a parity drive. In the example shown, the data drive is treated as a logical drive 0 attached to SATA 0 and the parity drive is assigned to SATA 3. With only one data drive, the minimum transfer length is one. The read command is written to SATA 0 and broadcast to SATA 0 and SATA 3. During the read phase, the Array switch waits until both SATA ports are ready to transfer data. The data is then transferred synchronously with the XOR being computed "on the fly" and the result is stored in the buffer indicated by the DMA channel for SATA 3. This result gives the software driver the parity data for the current track with the data segment that is going to be update already removed. This accomplishes the two read operations and the first XOR computation of the traditional RAID5 read modify write in a single action.

Referring now to FIG. 22D, during the write phase, the software driver programs the DMA channel 0 with the address of the buffer holding the new data and DMA channel 3 with the address of the buffer holding the contents of the parity computation just completed. The commands are written to logical port 0 and broadcast to SATA 0 and SATA 3. The Array Switch will wait until both drives are ready to receive data. It will then transfer one sector to the SATA port of the data drive using its DMA channel. The transfer is snooped and a copy of the sector is captured in the buffer. It will then transfer one sector using the DMA channel of the parity drive's SATA port. As the data is transferred, the Array Switch will compute the XOR of this data with the contents of the buffer, sending the result of the computation to the parity drive's SATA port. At this point, one sector has been read from each DMA channel's buffers and one sector has been written to each SATA port. This process is repeated until all of the data has been transferred.

The foregoing description shows mapping registers organized in logical port sequence. It appears now that a preferred solution may be to organize mapping registers in a physical port sequence. There would be a field in each register for each physical port. The entry in the field identifies the corresponding logical drive (or indicates that the physical port is not used in that array).

III. Mapping Registers and Data Path Switch logic

Mapping Register

Figure 23:
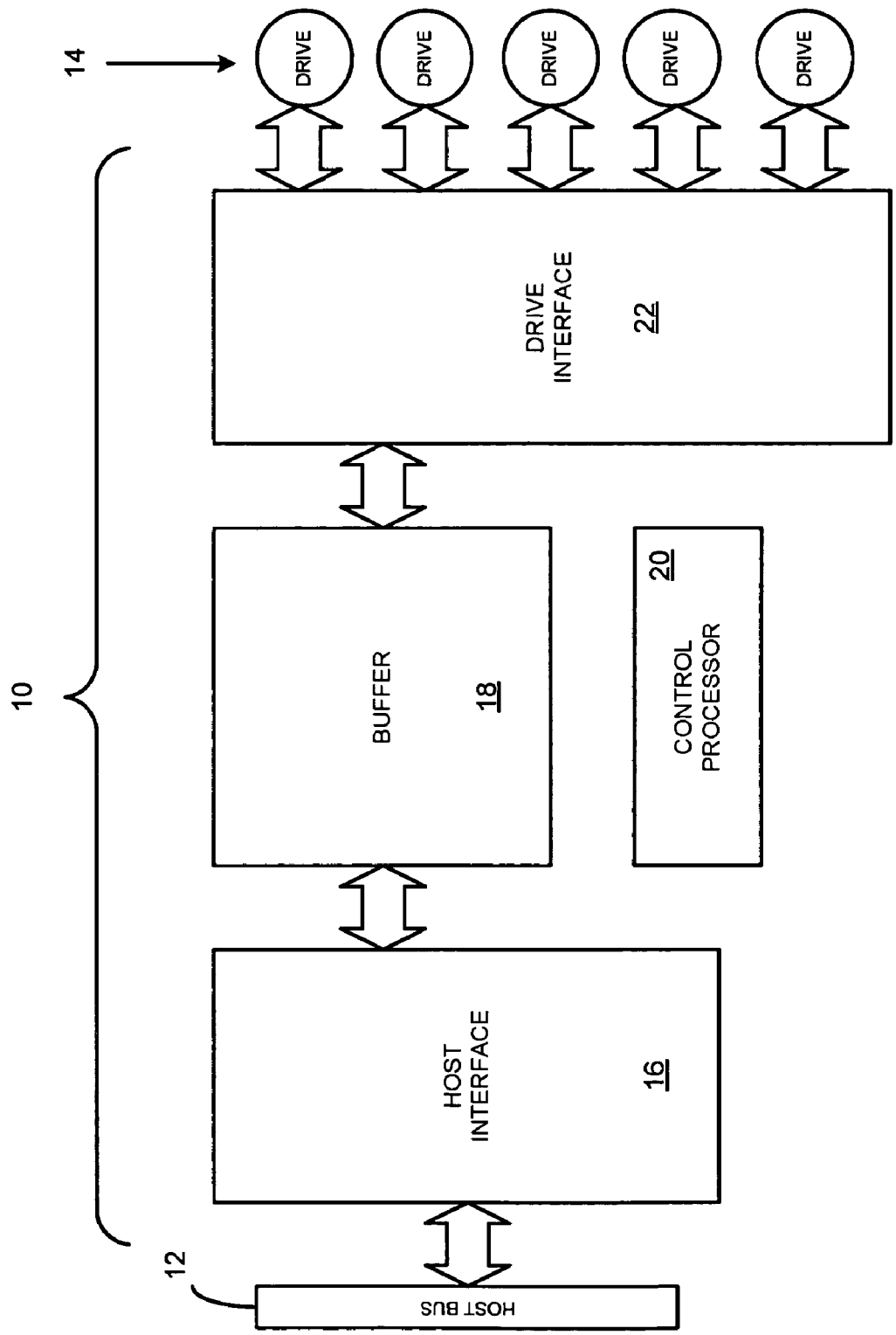
FIG. 23 is a simplified block diagram of a disk array controller providing a host interface for interaction with a host bus, and a drive interface for interaction with a plurality of attached disk drives.

The typical RAID controller for a small computer system includes an interface to a host system and an interface to a drive array. FIG. 23 is a simplified block diagram of a disk array controller 10 providing a host interface 16 for interaction with a host bus 12, and a drive interface 22 for interaction with a plurality of attached disk drives 14. The controller preferably includes a control processor 20 and a buffer memory 18 for temporary storage of data moving between the host bus and the drives.

Figure 24A:
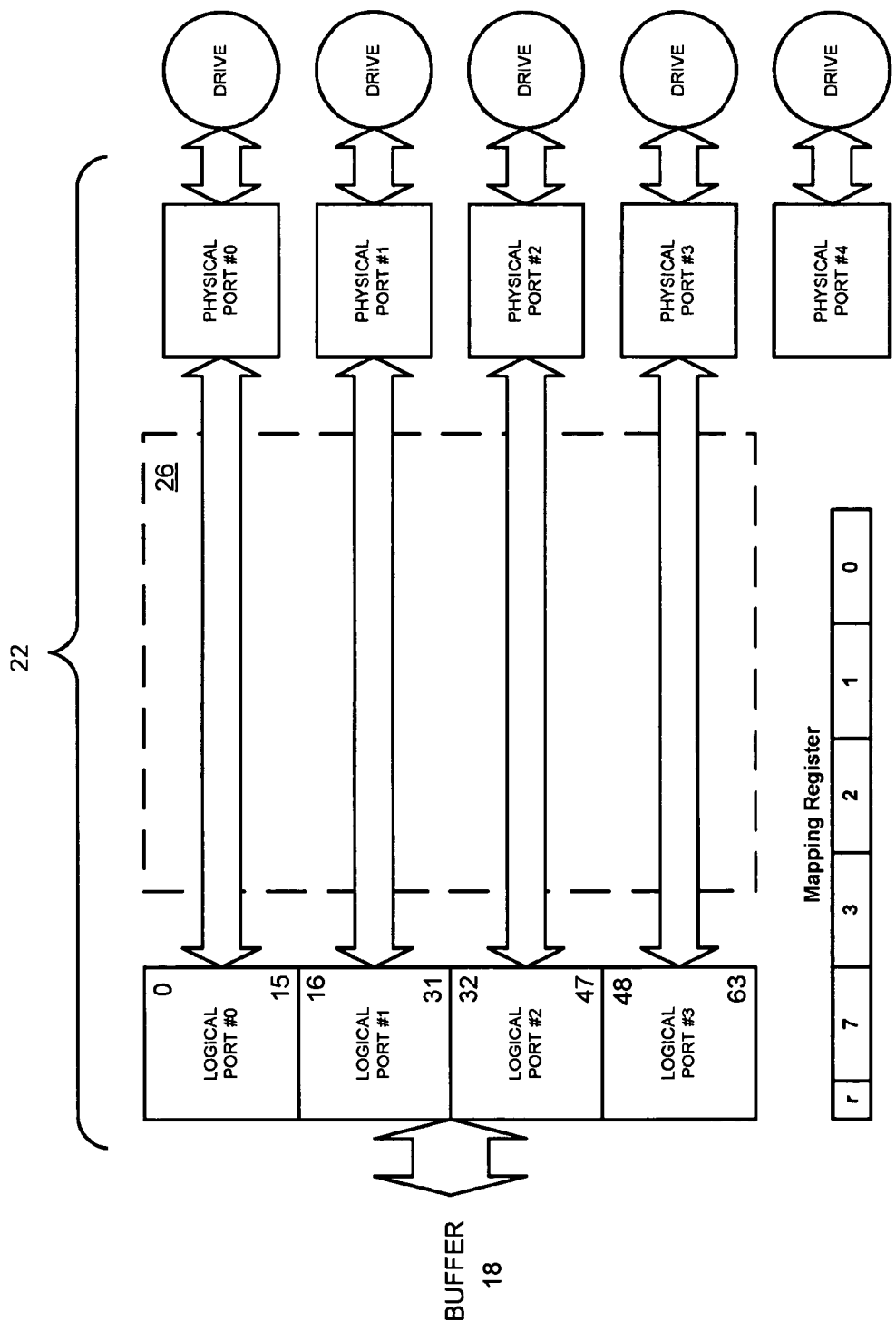
FIG. 24A is a conceptual diagram illustrating direct connections between logical data ports and physical data ports; and it shows corresponding Mapping Register contents.

A physical port is required for the attachment of a mass storage device such as a disk drive to a system. While some interfaces are capable of supporting concurrent data transfers to multiple devices, the physical ports tend to become a bottleneck. For this reason, a high performance RAID controller may have a physical port per mass storage device as shown in FIG. 24A. FIG. 24A also shows the corresponding contents of a Mapping Register 24, further described below with reference to FIG. 26.

One of the performance benefits of RAID comes from the striping of data across the drives of the array. For example, reading data from four drives at once yields a four times improvement over the transfer rate of a single drive. For the example shown in FIG. 24A, the sixteen bit data arriving from four drives is merged in logical drive order into sixty-four bit data that is sent to the buffer (18 in FIG. 23). User data was striped, ie. it was distributed a segment at a time (e.g. 16-bit word) across an array of drives in a predetermined sequence. We identify that sequence as starting with Logical Drive #0 and proceeding through Logical Drive #n-1, where n is the number of drives in the array. This stripe sequence is repeated so that the kth segment of the user data corresponds to logical drive (K mod n). In this way, we use the logical drive numbering to reflect the striping order. Accordingly, in the drawing, the stack of four "Logical Ports" simply indicates an ordered set of four segments of a stripe. Each "Logical Port" corresponds to a single segment of the stripe, and the whole stack corresponds to an ordered set of four segments.

The 100 MBPS transfer rate from each of the drives becomes a 400 MBPS transfer rate to the buffer. Dashed box 26 conceptually represents a data path switch described later in detail. The data path switch 26 provides dynamically configurable data paths between logical data ports and physical data ports.

Figure 24B:
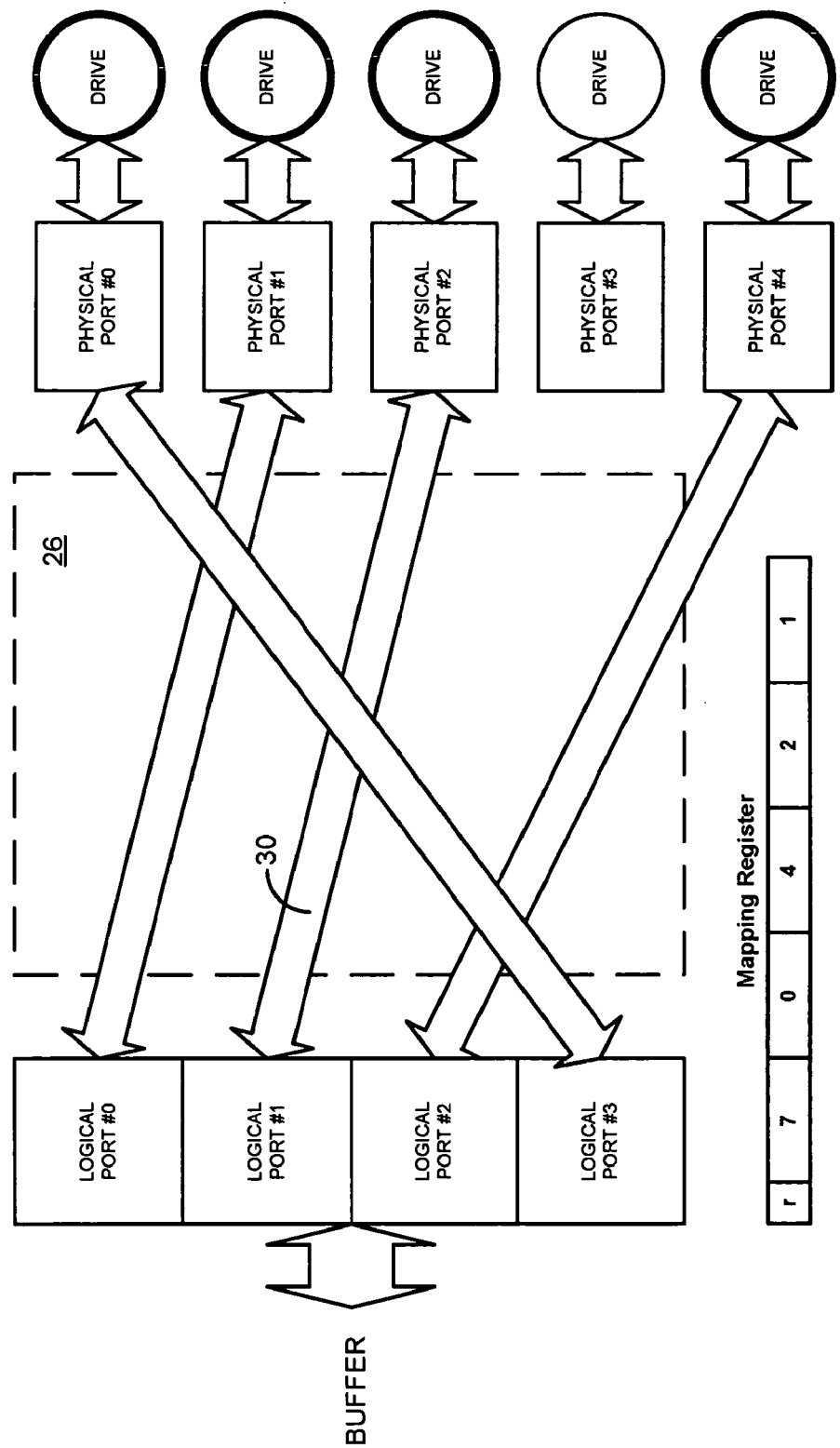
FIG. 24B is a conceptual diagram illustrating one example of assignments of four logical ports to the available five physical data ports; and it shows corresponding Mapping Register contents.

FIG. 24A, with its direct connection between logical data ports and physical data ports, is only a conceptual diagram. In real applications, the number of available physical data ports will be greater than the number of logical data ports. There may be ports that are reserved as "hot spares" or the physical ports may be grouped into different sub-arrays that are accessed independently. FIG. 24B is an example of one of the possible assignments of four logical data ports (Logical Port #0 to Logical Port #3) to the available five physical data ports, Physical Port #0 to Physical Port #4). For example, the large arrow 30 simply indicates the assignment of Logical Port #1 to Physical Port #2. FIG. 24B also shows the corresponding contents of a Mapping Register 24. Here, the second field from the right in the register corresponds to Logical Port #1, and it contains the value "2" indicating the Physical Port #2, as indicated by arrow 30. The data path switch 26 implements logical to physical port assignments as fully described later.

Figure 24C:
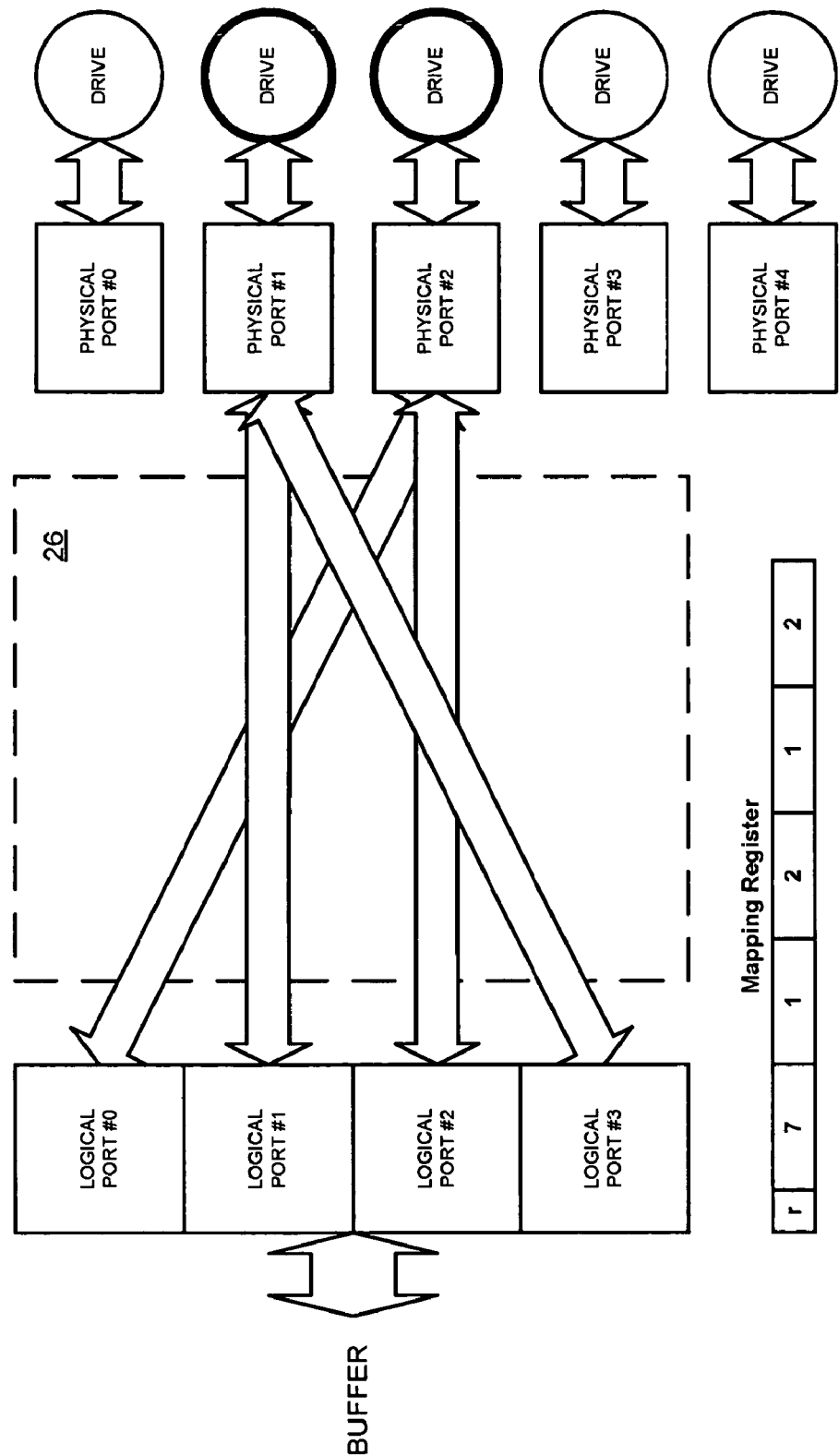
FIG. 24C is a conceptual diagram illustrating a two-drive array where each of the drives is assigned to one of the five available physical data ports; and it shows corresponding Mapping Register contents.

FIG. 24C shows an example of a two-drive array where each of the drives is assigned to one of the five available physical ports, namely Physical Port #1 and Physical Port #2.

In order to assemble a 64-bit word for the buffer, each of the 16-bit drives must be read twice. On the first read, the data for Logical Ports #0 and #1 are obtained from Physical Ports #2 and #1, respectively. On the second read, Logical Ports #2 and #3 obtain data from Physical Ports #2 and #1 respectively. These operations are orchestrated by the processor 20. Again, the Mapping Register shows the assignments to Physical Ports #1 and #2.

Figure 24D:
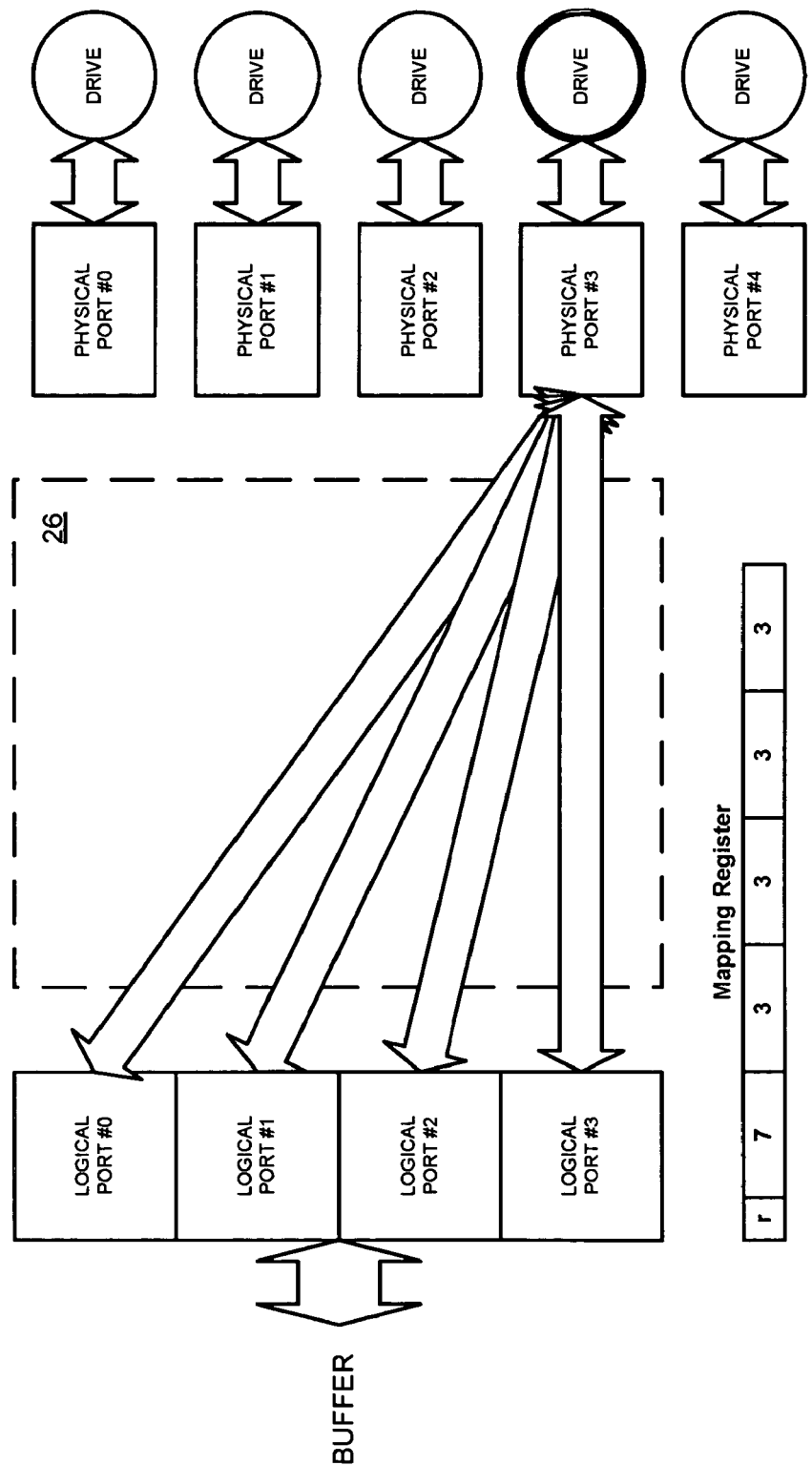
FIG. 24D is a conceptual diagram illustrating a single-drive system where logical ports 0-3 transfer data on successive cycles to physical port #3; and it shows corresponding Mapping Register contents.

FIG. 24D shows an example of an array with a single drive connected to physical port #3. For this configuration, the data for logical ports #0 through #3 is obtained by reading the same physical port four times.

Figure 25A:
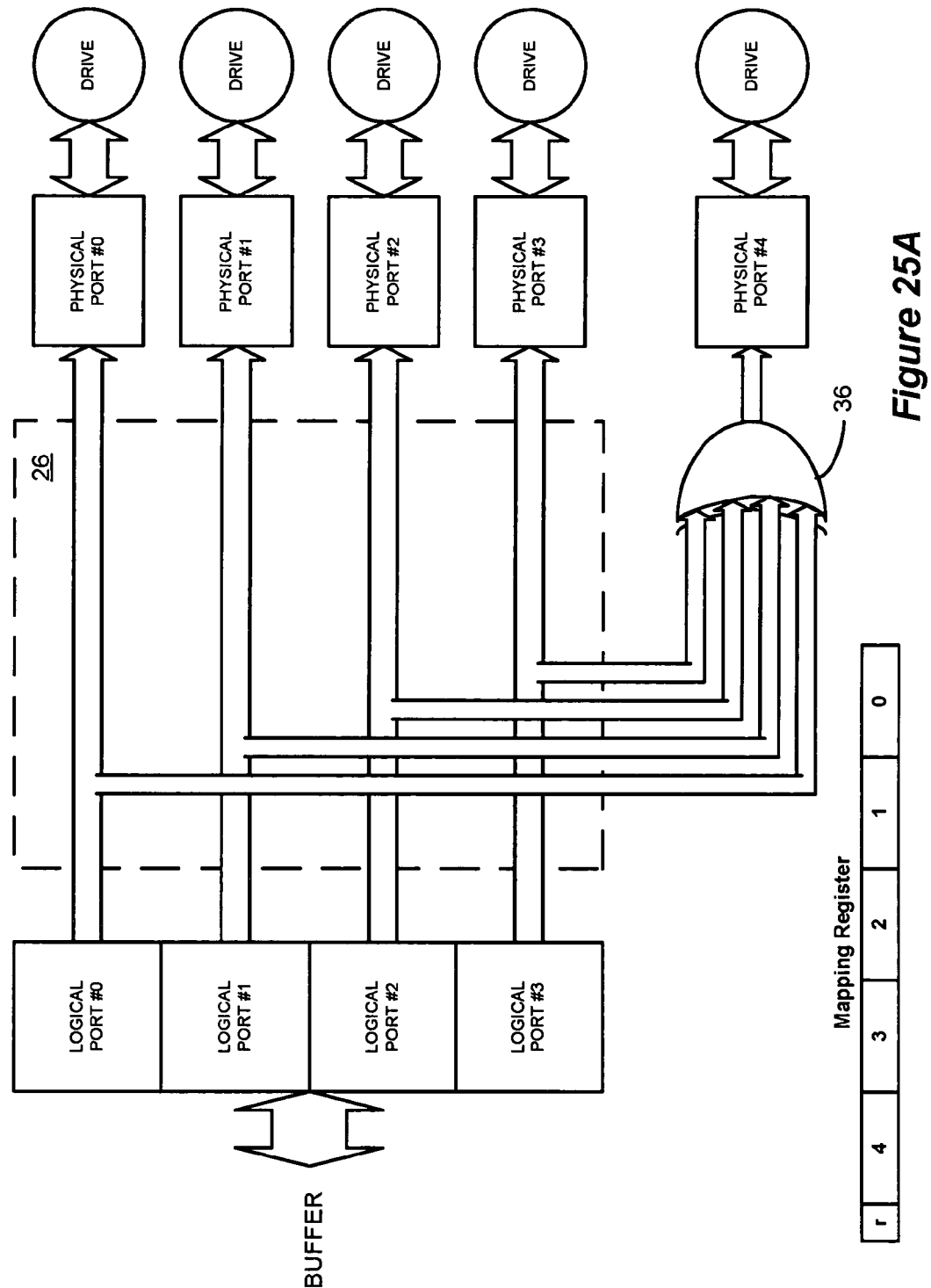
FIG. 25A illustrates XOR logic in the disk write direction in the drive configuration of FIG. 24A; and it shows corresponding Mapping Register contents.

One of the features of the Synchronous Redundant Data Transfers described in U.S. Pat. No. 6,018,778 is that it allows redundant data to be processed "On-The-Fly" as described in U.S. Pat. No. 6,237,052. FIG. 25A shows the four-drive array of FIG. 24A with the addition of logic 36 to compute a redundant data pattern that is stored on the drive attached to physical port #4. While various arithmetic and logical operations might be used to produce a redundant pattern, the logical XOR between the corresponding bits of the data from the logical data ports has the advantage over an arithmetic operation in that the XOR operation does not have to propagate a carry. Due to the use of the XOR, the fifth drive is often referred to as either the "redundant" drive or the "parity" drive.

Figure 25B:
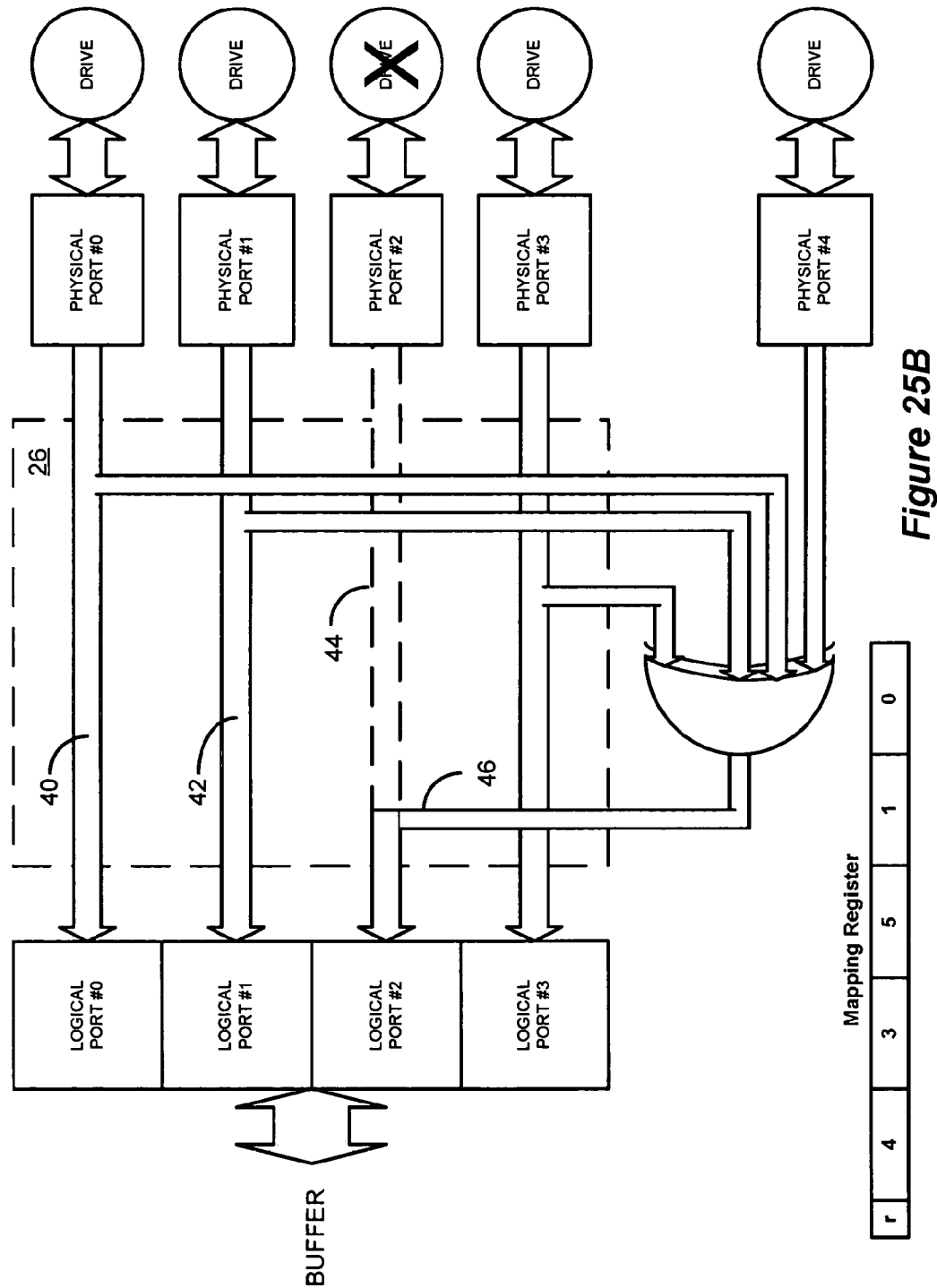
FIG. 25B illustrates the XOR logic in the Disk Read direction for the same data path as FIGS. 24A and 25A except that the drive attached to physical port 2 has now failed; and again the Mapping Register contents are shown.

The 16-bit wide Bus XOR shown in the figure is equivalent to sixteen XOR gates, each with four inputs. The use of the XOR function is also very symmetrical between the disk read and disk write operations as can be seen in FIG. 25B. FIG. 25B shows the same four-drive array as defined in FIG. 25B, with the data paths 40, 42 etc. shown for the disk read direction. In this case, the drive attached to physical port #2 has failed. Accordingly, the corresponding data path 44, which does not function, is shown in dashed lines. The XOR function is computed across the data from the remaining data drives (Physical Ports #0, #1 and #3) and from the redundant drive, Physical Port #4. This computation reconstructs the data that was stored on the failed drive and the result is directed to logical port #2 via data path 46 in place of the now unavailable data from the failed drive.

The preceding paragraphs demonstrate some examples of the various relationships that might exist between a set of logical ports and a set of physical device ports in a RAID Controller. In general, a high performance RAID controller is forced to deal with multiple arrays made up of various subgroups of the mass storage devices connected to its physical ports. One aspect of the present invention employs a novel mapping register and associated logic to enable software configuration of storage device arrays, and improve performance as further explained below.

In accordance with one embodiment of the invention, a Mapping Register 24, the structure of which is shown in FIG. 26, controls the configuration of the data paths between the logical and physical data ports. (The Mapping Register also provides other features and advantages discussed later.) In this embodiment, the Mapping Register consists of five fields, one for each of five logical data ports, L0-L4 in this example. Each logical data port's corresponding field in the register is loaded with the number of the physical data port to which it is connected. The data in the field for logical data port 0, is represented symbolically as PP_L0 indicating that it is the Physical Port associated with Logical Port 0. The values in the next four fields are identified as PP_L1, PP_L2, PP_L3, and PP_L4 respectively. The fifth logical data port is a pseudo port. The PP_L4 value is used to assign a physical data port for the Parity drive.

The Mapping Register fields can be of almost any size. An eight-bit field, for example, would support an array of up to 256 physical ports. In the illustrative embodiment, with only five physical ports, a three bit field is sufficient. The five fields pack nicely into a sixteen bit register with a bit to spare noted by an "r" in the Figures for "reserved". Any type of non-volatile memory can be used to store the mapping register information.

To demonstrate the use of the Mapping Register, we will briefly revisit each of the configurations described so far. In FIG. 24A, note that a Mapping Register 24 is shown. The value of PP_L0 is 0 indicating the logical data port #0 is connected to physical port #0. The next three values are 1, 2, and 3 indicating that the next three logical data ports are connected to the next three physical data ports. The value of PP_L4 is 7. This is not a legal physical port number in this example. The value "7" is used to indicate that there is no parity drive in this configuration. The specific value chosen is not critical, as long as it is not an actual physical port number.

Referring again to FIG. 24B, the values stored in the Mapping Register indicate that physical data ports 1, 2, 4, and 0 support the logical ports 0 through 3 respectively. Once again, the "7" indicates that a parity drive is not used.

FIG. 24C shows the Mapping Register configured for a two-drive array. Note that logical data ports #2 and #3 are associated with the same physical ports as logical ports #0 and #1. The first two logical ports transfer data on the first physical port cycle while the second two logical ports transfer data on the second physical port cycle.

Figure 2:
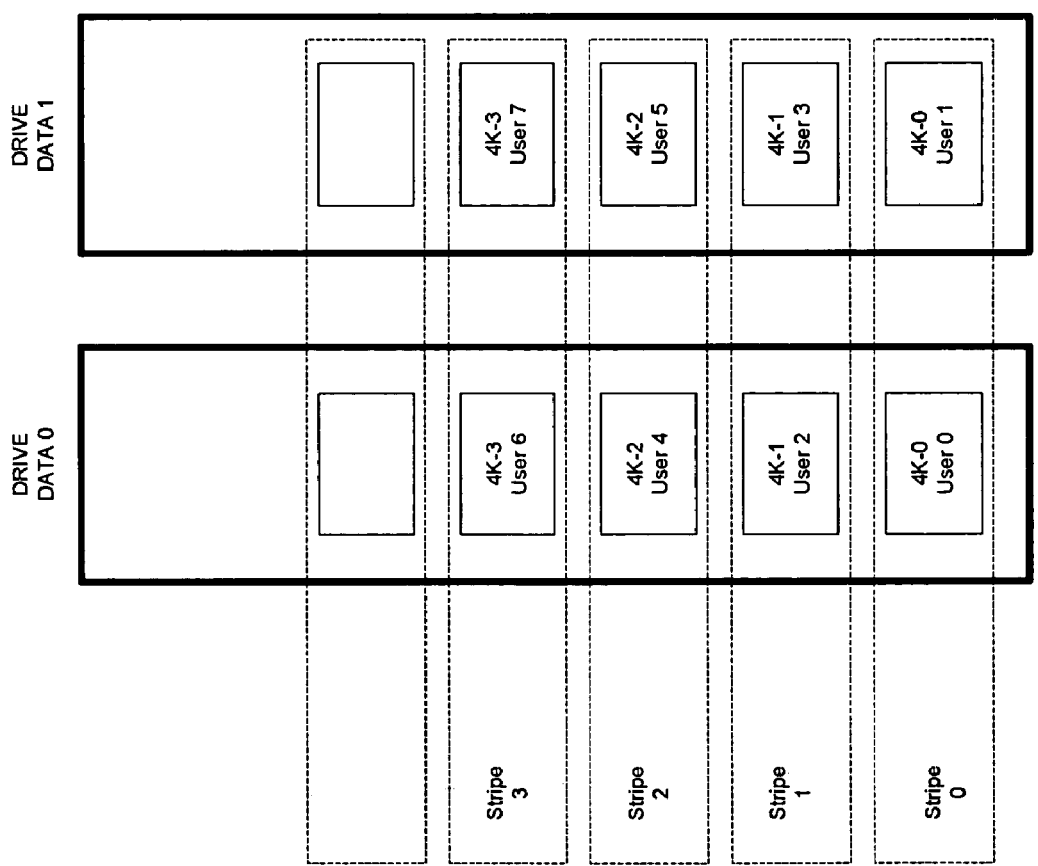
FIG. 2 illustrates striping data over two data drives.
Figure 3:
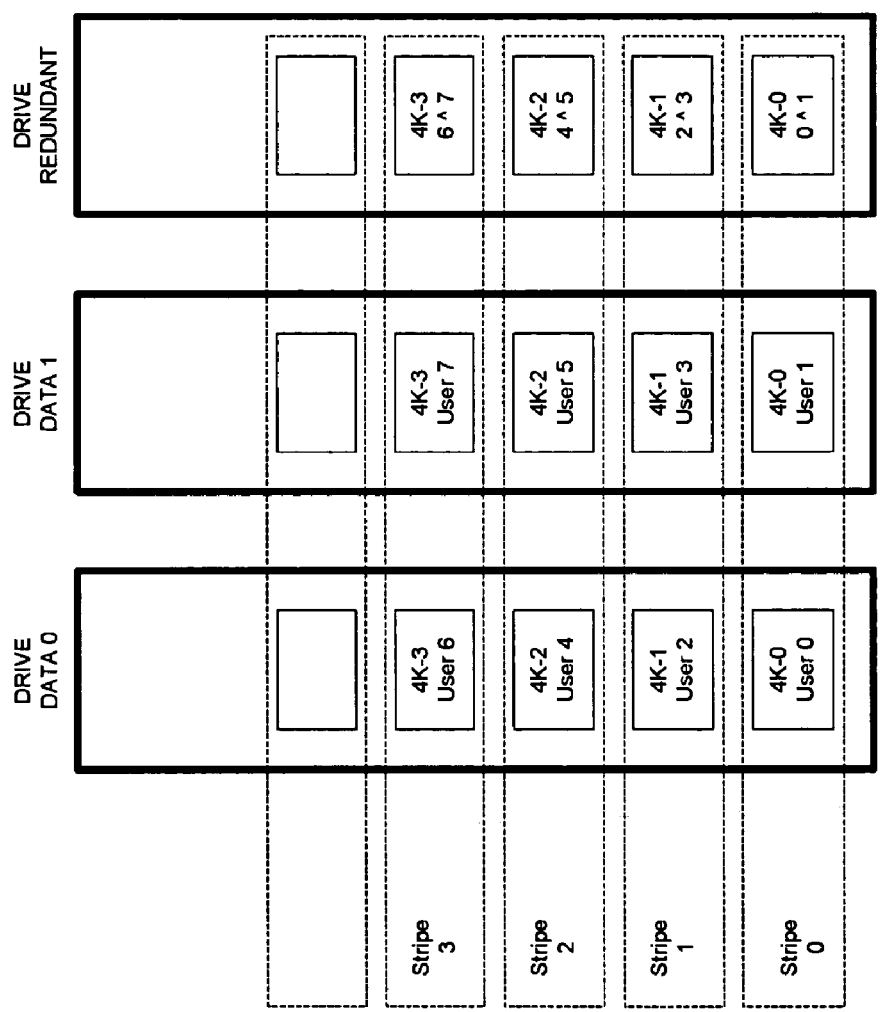
FIG. 3 illustrates striping over two data drives plus a redundant drive.

FIG. 24D shows the Mapping Register configured for the singe drive case. Logical ports #0 through #3 transfer data on successive cycles to physical port #3. All of the variations of FIG. 2 are different data path configurations shown independent of the redundant data logic.

FIG. 25A shows the XOR logic in the Disk Write direction for the same data drive configuration as FIG. 2A. The XOR is computed over the data from all four of the logical data ports. The result is stored on the drive attached to the physical port specified in logical port #4 field of the Mapping Register. In this example, PP_L4 has a value of "4" instead of "7" indicating that there is a parity drive and that it is attached to port #4.

FIG. 25B shows the XOR logic in the Disk Read direction for the same data path as FIGS. 24A and 25A, except that the drive attached to physical port #2 has now failed. The contents of the Logical Data Port 2 field, PP_L2, has been replaced with a "5". The legal physical port numbers are 0 through 4. The "5" is a reserved value used to indicate that a drive has failed. Any logical data port accessing the pseudo physical port number 5 will take its data from the output of the XOR.

Data Path Switch

In the preceding discussion, we have demonstrated that four values loaded into the fields of a Mapping Register may be used to represent all of the possible configurations between four logical data ports, and 1, 2, or 4 drive arrays attached to five physical ports, with or without a redundant drive; and for the arrays with redundant drives, with or without a failed drive. The following will describe how the contents of the Mapping Register is used to configure the hardware blocks and the data paths. The following discussion, in other words, presents the details of a presently preferred implementation of the data path switch 26, and how it is configured by the mapping register contents.

Figure 27A:
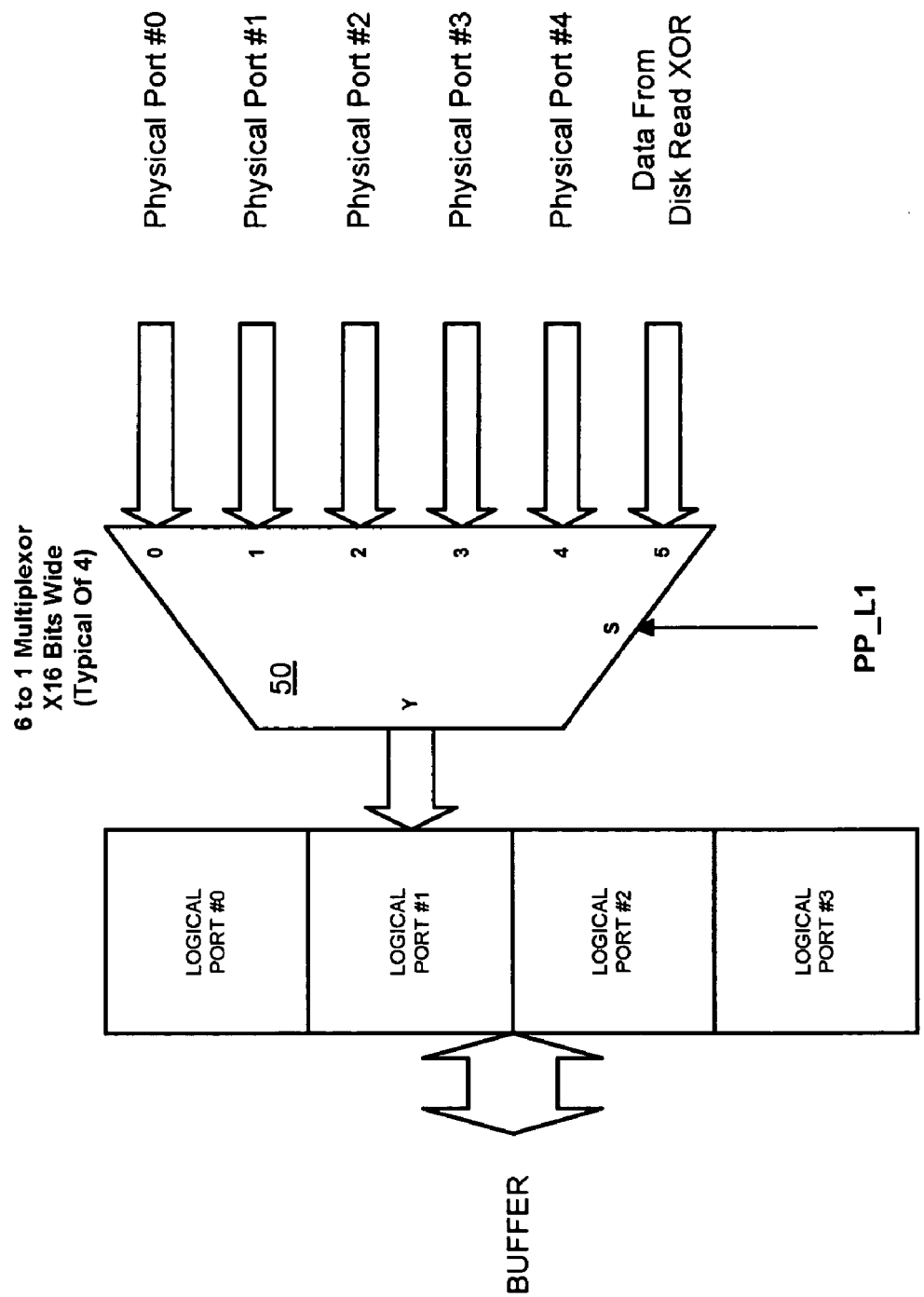
FIG. 27A is a conceptual diagram of multiplexer circuitry in the logical port #1 read data path.

Referring now to FIG. 27A, each of the four logical data ports must be able to receive data from any of the five physical data ports or, in the case of a failed drive, from the Disk Read XOR. With the six possible data sources, each of the physical data ports has a corresponding six-to-one multiplexor 50, sixteen bits wide. The multiplexor 50 for logical port 1 is shown in the FIG. 27A, but the others (for Logical Ports #0, #2 and #3) are identical. The selector or "S" input of the multiplexor is connected to Logical Port #1 field of the Mapping Register—"PP_L1". The PP_L1 values of 0 through 4 select data from physical ports #0 through #4 respectively while a the value "5" selects the output of the Disk Read XOR.

Figure 27B:
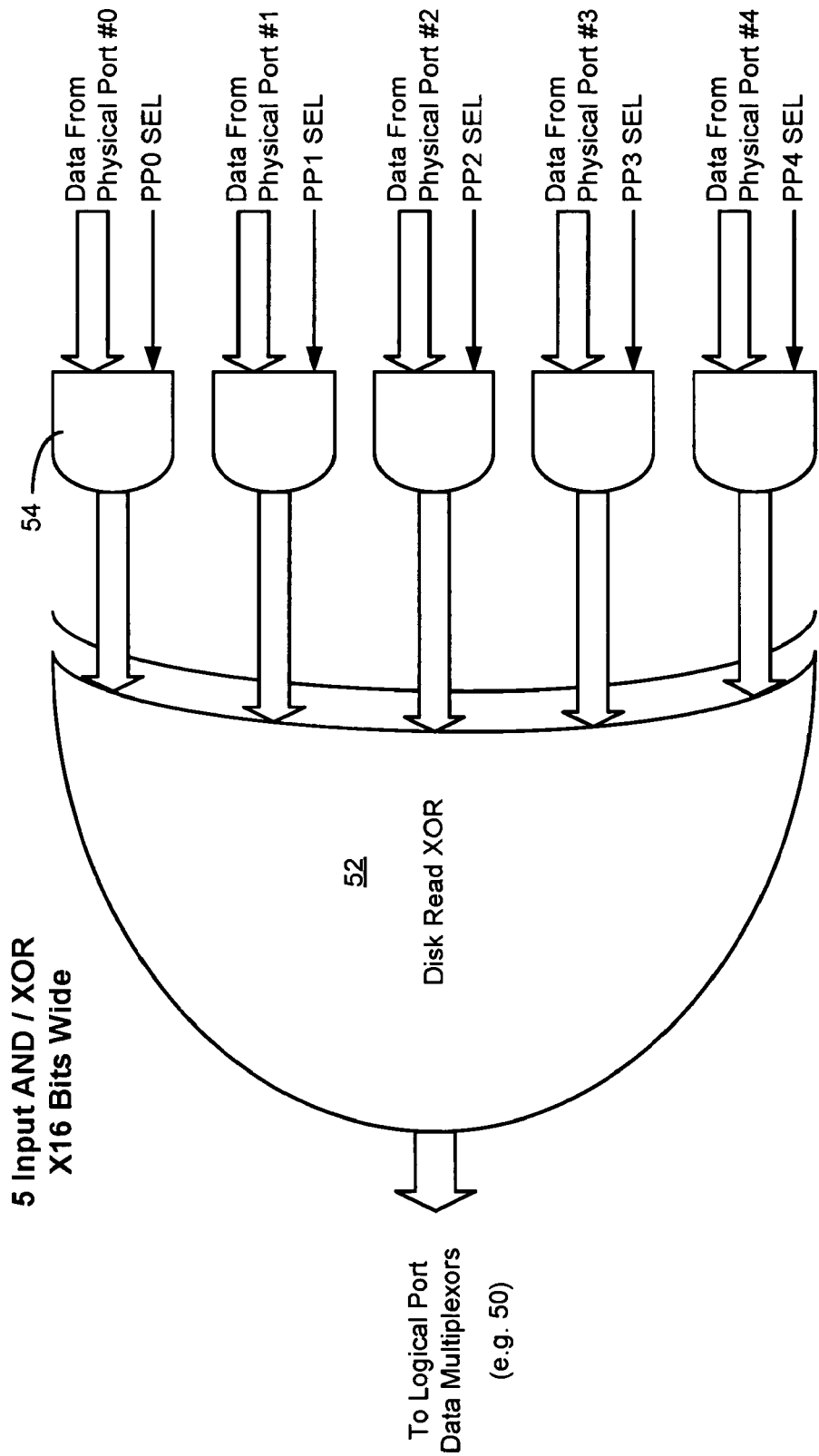
FIG. 27B illustrates disk read XOR logic in one embodiment of the array controller.

FIG. 27B shows the Disk Read XOR logic 52. The Disk Read XOR 52 is a five-input XOR circuit, sixteen bits wide in the preferred embodiment (corresponding to the attached disk drive data paths). (This is equivalent to sixteen XORs, each with five inputs.) Each of the five inputs is logically qualified or "gated" by a corresponding AND gate, also sixteen bits wide, for example AND gate 54. (This is equivalent to sixteen NAND gates, each with two inputs.) The five NAND gates are qualified by the corresponding five physical port select signals, PP0_SEL through PP4_SEL. The generation of these signals will be described below.

Figure 28:
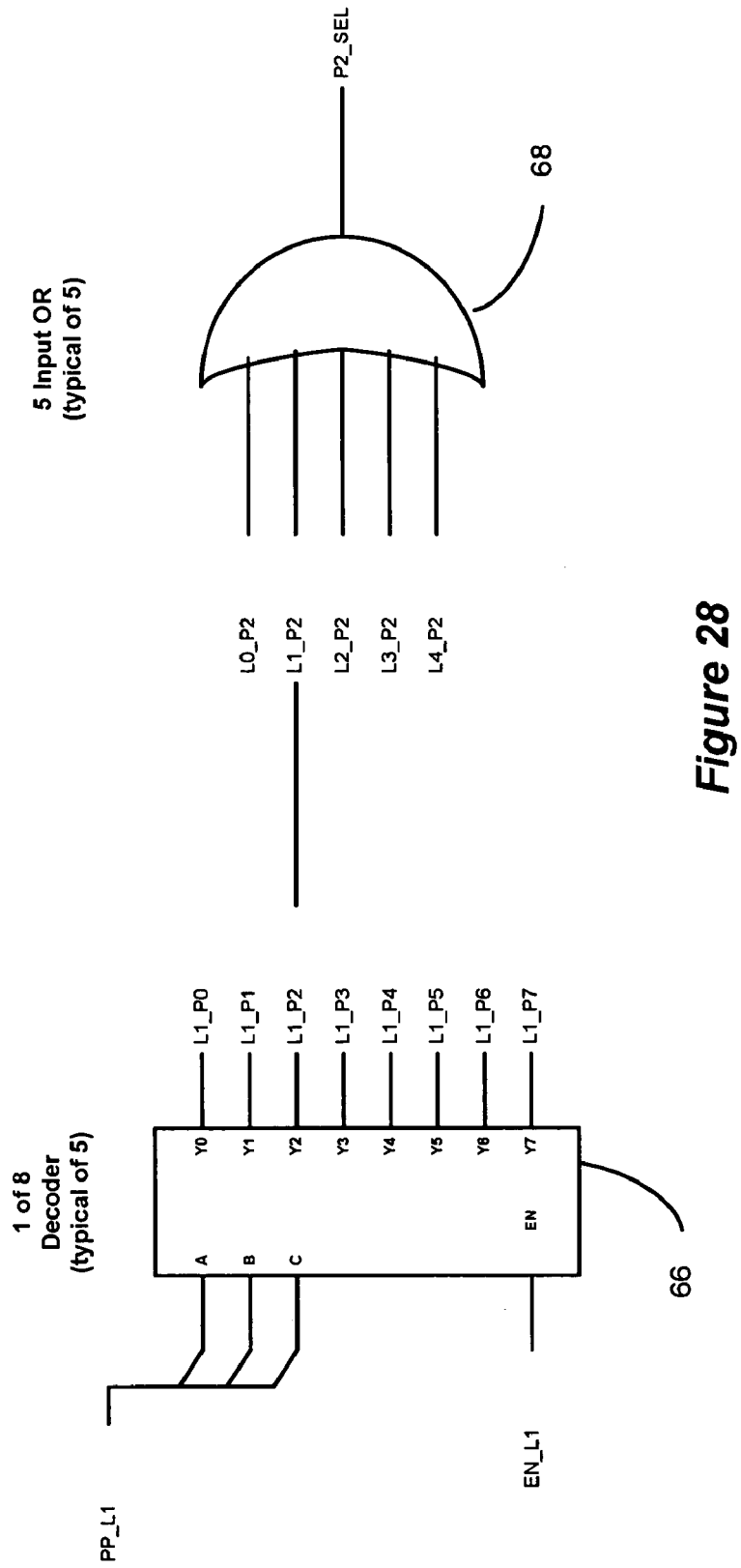
FIG. 28 illustrates decoder logic for the Logical Port #1 (PP_L1) field of the Mapping Register in one embodiment of the array controller.

The data path to each of the physical ports may come from any of the four logical data ports, or from the Disk Write XOR. Examples were shown with reference to FIGS. 24A-24D. While a field of the Mapping Register identifies the data source for each of the logical data ports, we do not have a field that provides the corresponding data for each of the physical ports. This information can be derived from the fields that we do have. Each of the three bit binary encoded fields of the Mapping register is decoded with a "one of eight" decoder. FIG. 28 shows such a decoder 66 for the Logical Port #1 field. The value PP_L1 is decoded into L1_P0, L1_P1, L1_P2 ... L1_P7 where the names indicate a path from a source to a destination. L1_P2, for example, indicates a path from Logical Port #1 to Physical Port #2.

Figure 29A:
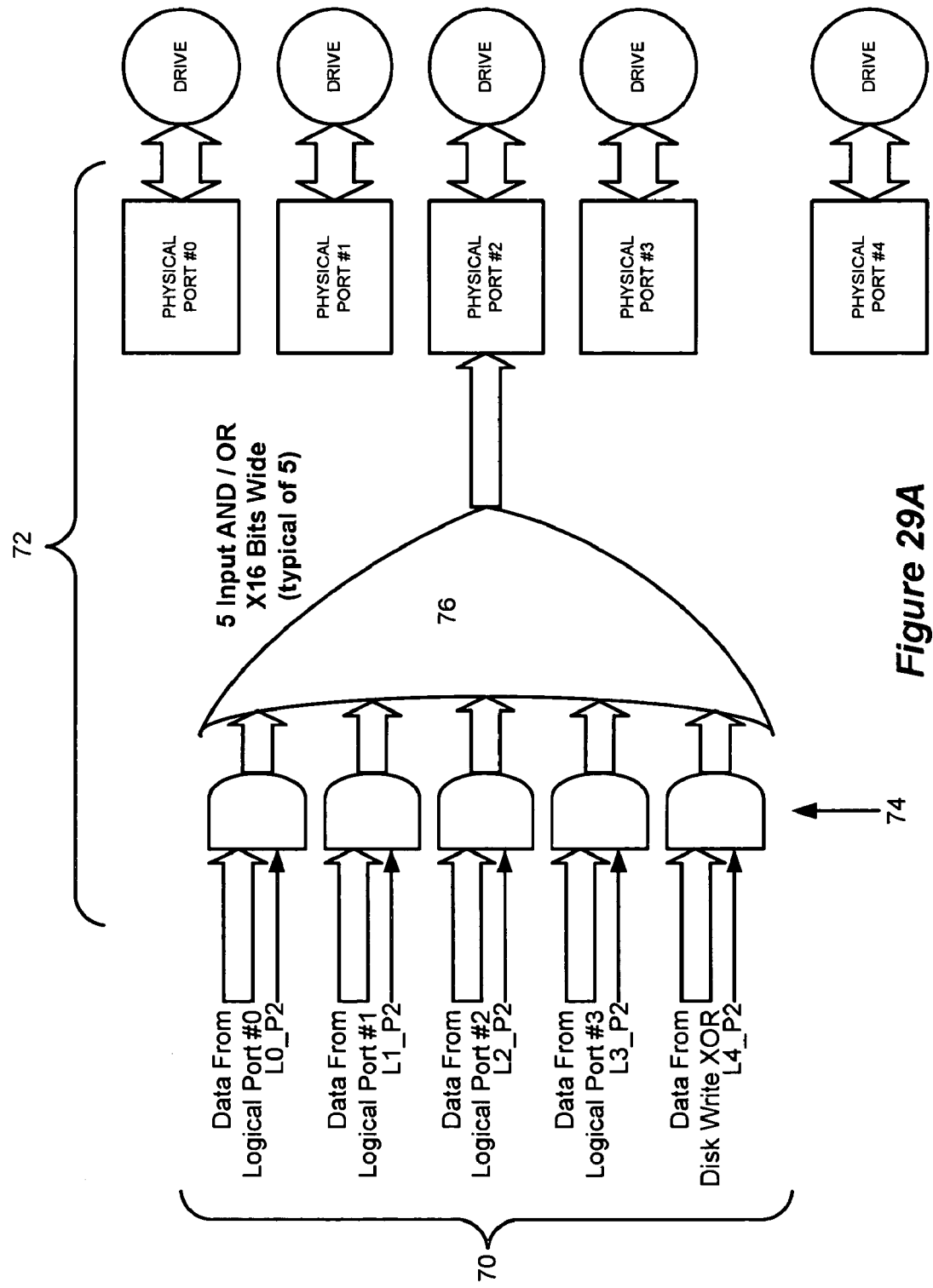
FIG. 29A logical port to physical port data path logic in one embodiment of the array controller (illustrated for physical port #2 only).
Figure 29B:
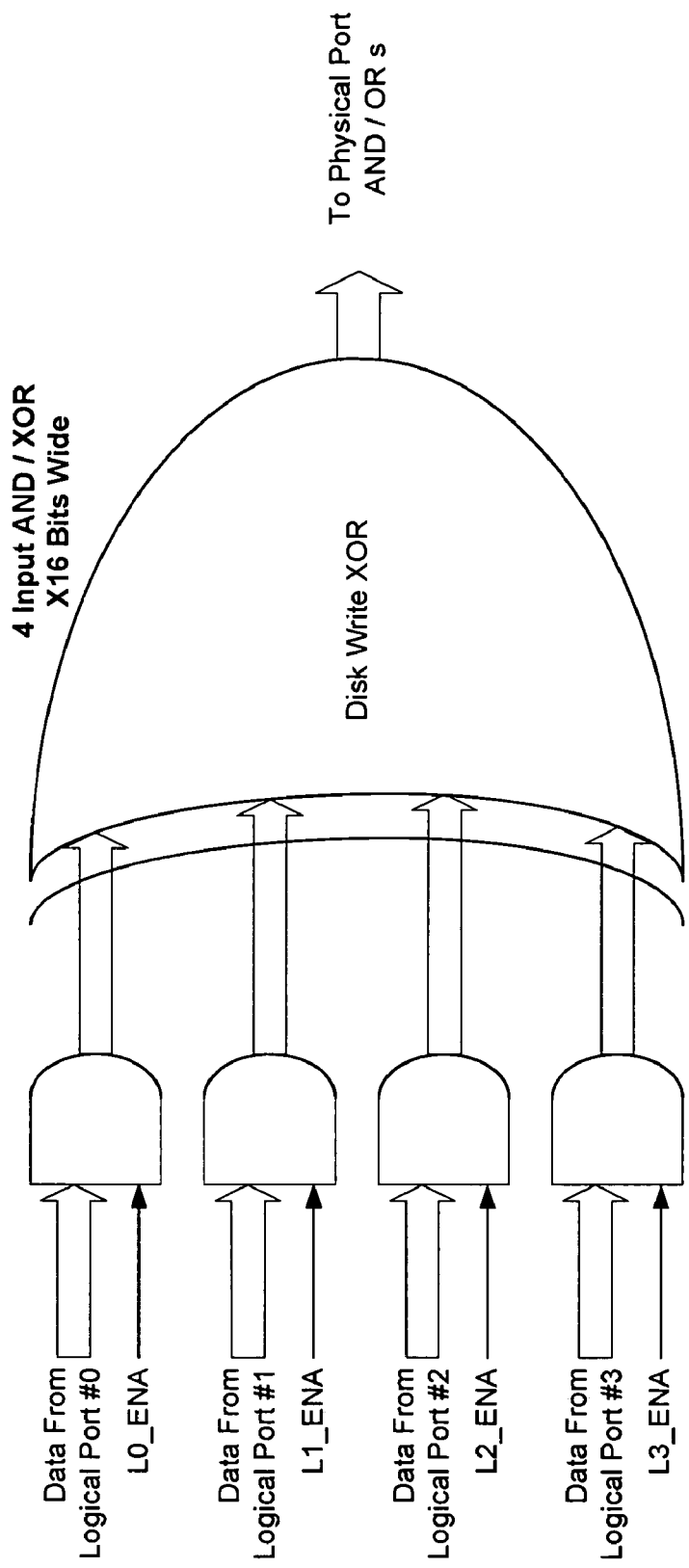
FIG. 29B illustrates disk write XOR logic in one embodiment of the array controller.

Referring now to FIG. 29A, sample circuitry is shown for multiplexing of the data paths 70 from the logical data ports to the physical data ports (#0-#4). The multiplexor 72 for physical port #2 is shown in the figure, but the multiplexors for the other four ports (not shown) are identical. Each of the multiplexors 72 consists of an AND/OR array with five AND gates 74, all sixteen bits wide, and a corresponding OR gate 76. (Each of the AND gates is equivalent of sixteen AND gates, each with two inputs. The OR gates is equivalent to sixteen OR gates, each with five inputs.) For the physical port #2 multiplexor, the AND gates from the logical data ports are qualified by the corresponding outputs of the five decoders, i.e. L0_P2, L1_P2, L2_P2, L3_P2, and L4_P2 as shown.

At this point, there are two open issues to resolve. In a two-drive array, a given physical port received data from two different logical ports, though on different cycles. Referring back to FIG. 28, each of the decoders 66 has an enable input "EN" that qualifies all of its outputs. For the two-drive configuration, only the decoders for logical data ports #0 and #1 are enabled on a first cycle, and only the decoders for logical data ports #2 and #3 are enabled on a second cycle. For this reason, only one of the AND gates in FIG. 29A will be qualified at a time. In other words, only the data from the assigned logical port (according to the mapping register) is input to the corresponding physical port.

In a single-drive array where a single physical port receives data from all four logical ports (See FIG. 24D), only one decoder 66 is enabled at a time so that only one AND gate 74 will be enabled at a time selecting a unique data source (Logical Port). The other open issue was the source for the "PPn_SEL" signals of FIG. 27B. FIG. 28 show the use of a five-input OR gate 68 that will assert the PPn_SEL signal for a physical port "n" if there is a data path between the subject physical port and any of the logical ports. This provides an indication that the physical port is active and may participate in the Disk Read XOR in FIG. 27B.

Global Read & Writes

In accordance with the ATA/ATAPI specifications, sending commands to the drives requires the use of Programmed IO or PIO mode that may be as slow as 600 nS per access for devices that support only PIO Mode 0 and no better than 120 nS per access for devices supporting Mode 4. A single command requires eight or more accesses. If all of the drives have to be commanded sequentially, this time is multiplied by the number of drives and adds considerable latency to the entire process. The commands could be issued concurrently by an independent controller per port, but this adds considerably to the complexity and cost.

When data is striped over an array of drives, portions of a given stripe will be located at the same relative position on each of the drives. This makes the address of the data, the Logical Buffer Address or LBA, the same for each of the drives. As a result, the commands to read a given stripe are identical for all of the drives of the array. And the commands to write a given stripe would be identical as well. This makes it possible for the local processor (e.g. 20 in FIG. 23) to "broadcast" common commands in no more time than would otherwise be required to send a command to a single drive.

Figure 30:
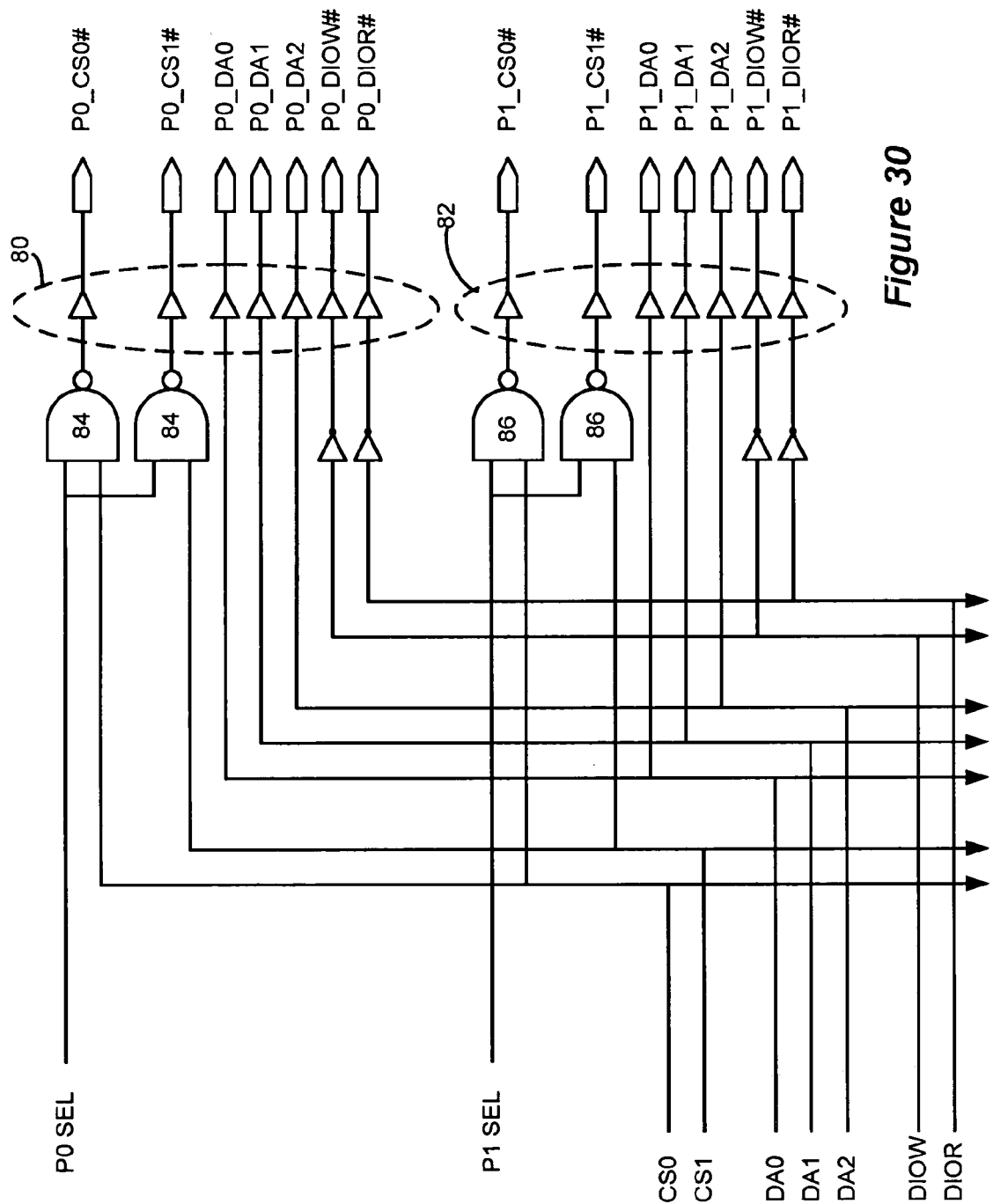
FIG. 30 illustrates disk address, strobe and chip select logic to enable global access commands to a currently selected array.

As noted earlier, a drive array may consist of a subset of the attached drives. (One of the advantages of the present invention is the ability to easily configure, or reconfigure, the organization of attached drives into defined arrays simply by storing appropriate configuration bytes into the mapping register.) In the case where an array consists of a subset of the attached drives, commands (such as read and write) may only be "broadcast" to the selected subset. Either the drives must be commanded one at a time, or some means must be provided to "mask" the physical data ports not participating in the current array. FIG. 30 shows one implementation to address this issue.

Referring to FIG. 30, the address, strobe, and chip select signals CS0, CS1, DA0, DA1, DA2, DIOW and DIOR are shown for the first two of the five physical ports (P0 and P1). Note that these address and strobe signals are common to all five ports. They are buffered individually so that a failure of a given drive cannot block the propagation of these signals to the other drives. See buffers 80,82. The output drivers for the two chip select signals CS0#, CS1# of a given port are qualified by the Pn_SEL signal for that port; see gates 84, 86. Any port not selected by the current contents of the Mapping Register will not have either of its chip selects asserted and therefore will ignore the read and write strobes.

It may seem that a "global read" does not make any sense as it implies that potentially conflicting data values are returned on a common bus. In the current embodiment, a "global read" causes a read strobe, FIG. 30 Pn_DIOR#, to be "broadcast" to all of the physical data ports. Those attached storage devices qualified by a chip select (Pn_CS0#, Pn_CS1#) will return data to the physical port where it is latched at the trailing edge of the Pn_DIOR# strobe. No attempt is made to return a data value to the local processor as a result of this read cycle.

The local processor will then read each of the ports one at a time using a different address which does not cause a repeat of the Pn_DIOR# strobe cycle and without changing any of the latched data. These cycles do allow the local processor to fetch the potentially unique values stored in each of the data latches. The Pn_DIOR# cycle which may require up to 600 nS is only executed once. The values latched in each of the ports may be fetched in 15 ns each for a significant time savings over repeating the Pn_DIOR# cycle five times.

The "global read" and "global write" apparatus allows the local processor to send commands to and receive control status from the currently selected array in the minimum possible amount of time. When a different sub-array is selected by loading a new value in the Mapping Register, the control interface updates automatically without other code changes.

Status Ordering

Figure 31:
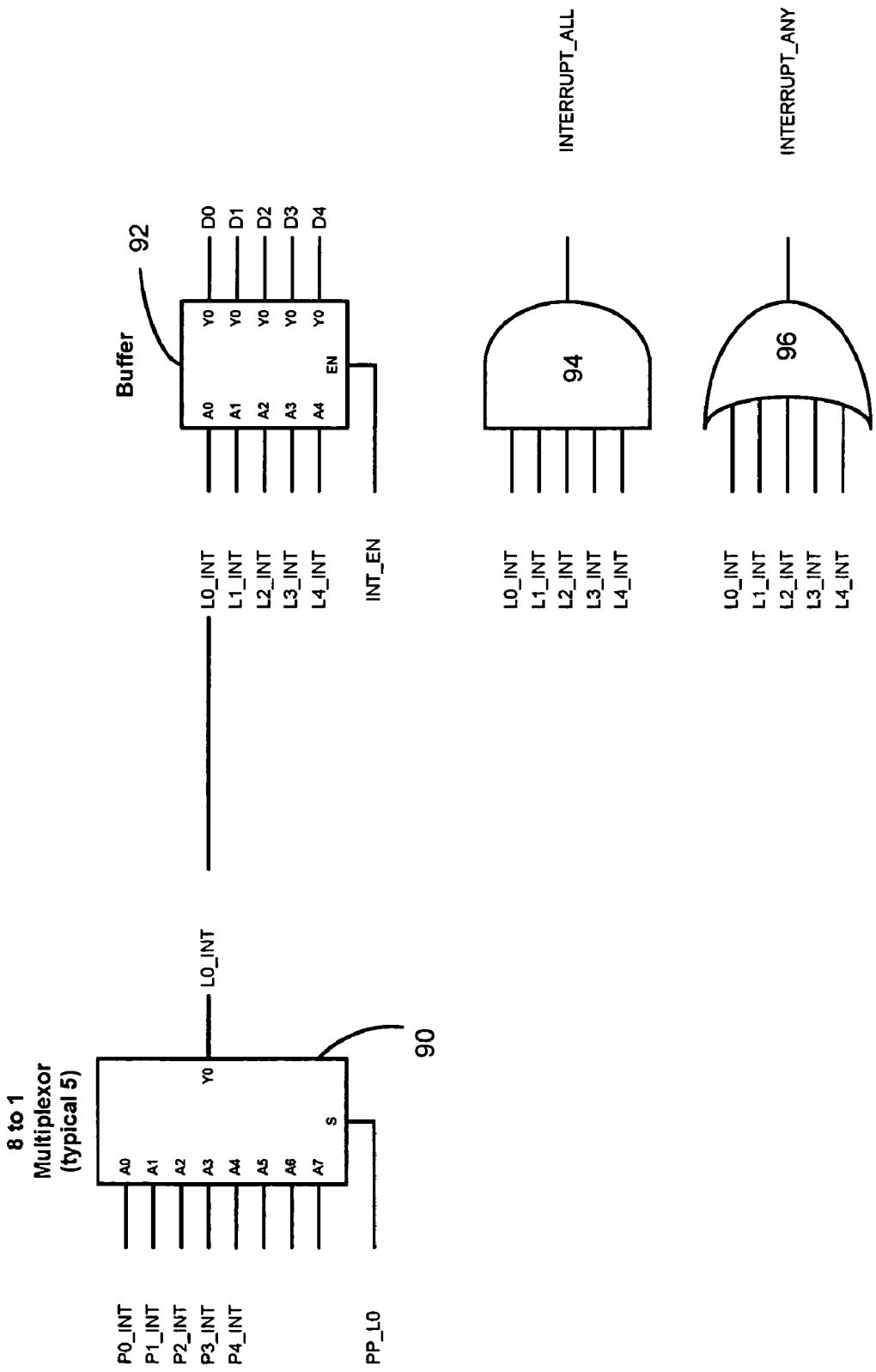
FIG. 31 illustrates interrupt signal logic for associating with logical drives.

The preceding discussion dealt with generating many of the physical port outputs and showed how they were steered by the Mapping Register. Each of these ports has a number of input signals as well. Once again, associating these signals with logical drives can minimize the software overhead. For example, each of the drives has an interrupt output used to signal the need for service from the controller. FIG. 31 shows the use of a multiplexor 90 controlled by PP_L0 value from the Mapping Register to select the interrupt of the physical port associated with logical data port zero. Each of the other logical data ports has an identical multiplexor (not shown) that uses the corresponding PP_Ln value to locate its interrupt. In FIG. 9, the buffer 92 takes the selected interrupts from each of the logical data port multiplexors (90 etc.). When the local processor (20 in FIG. 23) reads the interrupt status through this buffer, the interrupts appear in logical data port order starting with logical data port zero in the bit zero position. The same technique can be used to sort both internal and external signals from the physical data ports including drive cable ID signals and internal FIFO status signals. This feature enables the local firmware to use a common sequence of code for multiple arrays with different numbers of physical ports. Once the interrupt buffer 92 is loaded, the required status bits are always the least significant bits of the "sorted" register for any array selected. The number of bits may be masked down to the actual number of ports.

Interrupts ANY and ALL

The selected interrupts from the logical data ports can be logically ANDed 94 and ORed 96 as shown in FIG. 31 to provide signals "Interrupt ALL" and Interrupt ANY". When the local processor has issued a command, and before any data has been transferred, it might want to know about an interrupt from ANY of the drives as one or more drives may have rejected the command or had some other error. Once the drives have begun to transfer data, the local processor will want to know when ALL of the drives have asserted their interrupt signals as this indicates the completion of the command. Note that this type of implementation makes the software independent of the number of drives. (For a two-drive array, the interrupt signal from each device appears twice while in a single drive array, the same drive appears four times. The AND and ALL signals still function correctly.)

Logical Address Mapping

While the bulk of the run-time software takes advantage of global commands and status described above there is still the requirement to access individual devices for initialization and for handling errors within specific devices. For this purpose, each of the physical data ports appears at unique location within the local processor address space. When an access to any of these locations is decoded, the decoded output if remapped according to the contents of the Mapping Register. During initialization, the Mapping Register is loaded with an "identity" pattern, i.e. logical device 0 points to physical port 0, logical device 1 points to physical port 1, etc. This makes the physical ports appear in order starting with first physical port location in the processor's address space. In normal operation the Mapping Register will be loaded with a logical to physical drive map. If an interrupt is then received from logical port 2, the local processor may access the interrupting drive through the unique address space that accessed physical port 2 when the identity map is loaded. This makes the servicing of logical drives independent of the physical data port to which they are attached.

Figure 32:
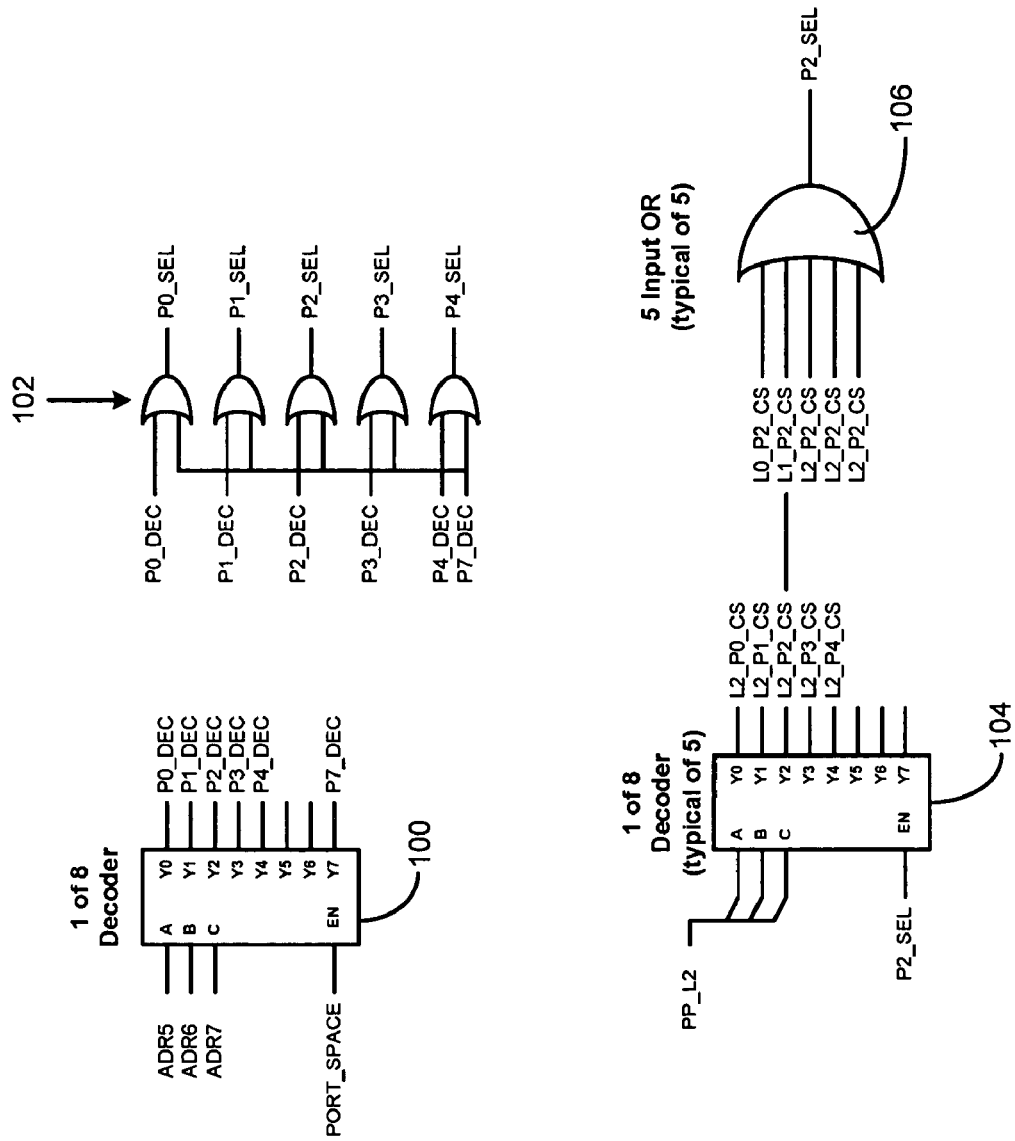
FIG. 32 illustrates a hardware implementation of logical addressing.

One hardware implementation of the logical addressing feature is shown in FIG. 32. When the processor accesses the address region for the device port space, the one of eight decoder 100 decodes processor address lines five through seven defining thirty-two byte spaces for each of the devices. The decoding of each space asserts the corresponding port N decode signal, Pn_DEC. The decoding of the virtual port number seven is the signal for a global access. The P7_DEC signal or ORed with each of the other decode signals 102 so that the resulting port select signals Pn_SEL (n=0-4) are asserted both for a specific access of that port and for a global access.

Each of the port select signals is then steered by the PP_Ln values from the Mapping Register. The one-of-eight decoder 104 takes the P2_SEL signals and routes it according to the PP_L2 value from the Mapping Register producing a set of signals of the form L2_P0_CS indicating a chip select from physical port zero from logical port two. The one-of-eight decoders for the other four logical ports are identical (not shown).

Each physical port has a five-input OR gate, for example 106. The OR gate 106 for physical port #2 is shown. It ORs together the five different sources for a chip select to physical port #2. Note that for a single-drive sub-array, the chip select will be asserted by all four logical devices and for a dual drive sub-array, the chip select is asserted by two of the logical devices.

In the foregoing description and in the drawings we illustrated several examples of one type of mapping register; it can be called a logical mapping register. As explained, it provides a field for each logical drive in a defined array, and in that field, a value indicates a corresponding physical port number. In an alternative embodiment, called a physical mapping, a register provides a field for each physical port or attached drive, and in each field, a value indicates a corresponding logical port number. This alternative mapping register is illustrated in the following example.

Assume an array is to be defined for striped data over four drives. Blocks of the stripe width are stored on each of the available drives in a specific sequence. This process is then repeated. For example, the first block of data (as well as the 5th, 9th, etc) is stored on the drive connected to physical port #1. The second block (as well as 6th, 10th, etc) is stored on the drive connected to physical port #2. The third block of data (as well as 7th, 11th, etc) is stored on the drive connected to physical port #4. The first block of data goes on logical drive 0, the second on logical drive 1, the third on logical drive two and the fourth on logical drive 3. The two alternative types of mapping registers for this case are as follows:

Logical Mapping:

| Logical Port # | 3 | 2 | 1 | 0 |
|---|---|---|---|---|
| Value (Physical Port) | 0 | 4 | 2 | 1 |

Physical Mapping:

| Physical Port # | 4 | 3 | 2 | 1 | 0 |
|---|---|---|---|---|---|
| Value (Logical Port #) | 2 | — | 1 | 0 | 3 |

IV. Further Improvements for Narrow and Wide Striping, Partial Stripe Updates and Other Synchronous Operations in a Disk Drive Controller A. Introduction—UDMA.

As the ATA/ATAPI interface described earlier continued to evolve, the PIO data transfer mode was replaced by the Ultra DMA or UDMA transfer mode. The PIO mode performance was limited by round trip delays of the interface and cable. The UDMA mode used the same electrical interface in a "source synchronous" mode in which the end of the link sourcing the data (port or disk drive) provides the strobe for its recovery. With source synchronous clocking, the performance is limited primarily by the skew introduced by a single transition of the cable and not by any round trip related delays. While this enhancement pushed the data transfer rate from 16 MBPS in PIO up to 100 MBPS or more, the synchronous data transfer scheme used for traditional ATA could no longer be used in the disk read direction as the drives were now sourcing the timing for this direction.

Above we described methods and apparatus for using FIFO memory to adapt the UMDA version of the ATA/ATAPI interface to be compatible with synchronous data transfers. The advantages of synchronous data transfers are also discussed above.

B. SATA FIFO

As the ATA/ATAPI interface continued to evolve, the parallel interface was replaced by a point-to-point serial interface link creating the Serial ATA or SATA interface. In the serial interface, all control and data transfers are packetized into Frame Information Structures or "FIS"es. Each FIS has an appropriate header indicating the FIS type, a payload, and a CRC field for checking the integrity of the received FIS, the details of which are all defined in the interface specification.

Figure 33:
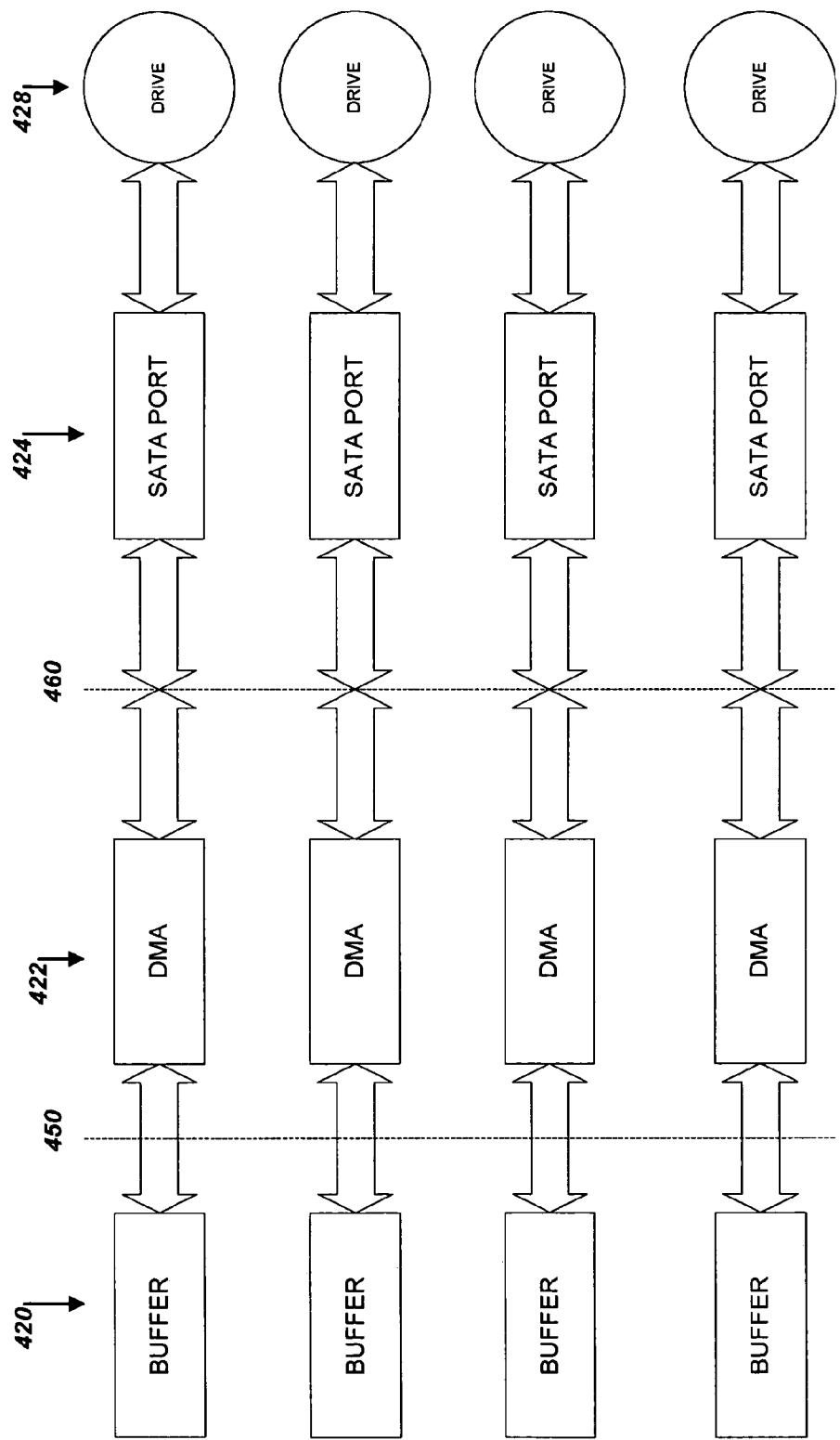
FIG. 33 is a simplified conceptual diagram of an embodiment of a disk array system employing a plurality of SATA ports and drives in accordance with the present invention.

FIG. 33 is a simplified conceptual diagram of an embodiment of a disk array controller employing a plurality of SATA ports and drives in accordance with the present invention. In FIG. 33, a series of buffers 420 are shown conceptually. In practice, these buffers could be anywhere in the available host system address space. This diagram illustrates a separate buffer 420, host interface 450, DMA channel 422, data path switch logic 460, and SATA port 424 for each of the disk drives 428. However, the actual relationships among the data channels, buffers, and drives depends upon the current configuration of the data path switch logic 460. As described earlier in detail, almost any data mapping scheme—redundancy, striping, etc., and any assignment of physical drives to logical drives, can be implemented by reconfiguring the data path switch logic 460. Further, as described above, mapping can be reconfigured dynamically (for example in the event of a drive failure), and it can be reconfigured under software control. In another, presently preferred embodiment, the data path switch supports data paths for multiple drives and for multiple arrays concurrently, i.e. without software involvement once the paths are set up.

FIG. 34A illustrates the host interface 450 of FIG. 33 in greater detail. In this embodiment, the host interface includes a system bridge 500 providing data transfer between system main memory and a PCI bus 502. The PCI bus is merely one example. The PCI bus is coupled via a PCI bus interface 504 to various logical DMA channels 510, under control of a bus arbiter 506. In operation, only one DMA channel at a time actually transfers data to or from the PCI bus. That said, multiple DMA channels can be concurrently "active" as further discussed later.

FIG. 34B shows a SATA port 520 in greater detail, indicating operation in the disk read direction. In accordance with published SATA specifications, the interface implements a physical layer 522 for physical connection to an attached drive 524; a link layer 526, and a transport layer 528. The transport layer includes a FIFO memory 530 which provides a data buffer between the physical drive and the controller.

The SATA interface specification provides a handshake mechanism for either end of the link 532 to throttle (pause) a data transfer from the other end. The SATA link is half duplex. The protocol uses the reverse channel to handshake the transfer of each FIS. Due to the much higher speed of the link 532, up to 80 additional bytes may be received after requesting a pause in the transfer. The transport layer FIFO 530, when receiving data from the drive, can generate an "almost full" indication (not shown) that will throttle the link using the back channel to prevent FIFO overflow and data loss. The other side of this FIFO, data path 540, can be accessed with locally generated timing. In the read case, the control flag "EMPTY" from the FIFO, and the control signal "POP" to the FIFO, are used to control accessing the data.

FIG. 34C shows the same SATA port 520 during a disk write operation. Here, control signals "FULL" and "PUSH" are used to write data to the port FIFO, for subsequent transfer to the attached drive. Again, the data transfer is decoupled from the actual link to the drive, thus the transfer from the controller can be synchronous, leveraging the advantages of "on-the-fly" redundancy operations, implemented in the switch logic 460 in a preferred embodiment.

In the embodiment illustrated in FIG. 33 for example, if the switch logic 460 is configured to employ three data drives and one parity drive, the transport layer FIFOs of three controller/adapters can be accessed synchronously with a common strobe for XOR computation. In that way, the advantages of the original synchronous PIO transfers are retained.

C. Data Path Switch Logic

The Data Path Switch Logic generally indicated by dashed line 460 in FIG. 33 is disposed between the SATA drive ports and DMA channels that access buffer memory. The data path switch logic in one embodiment was described in detail above with reference to FIGS. 24-32. For example, see data path switch 26. As noted, it provides dynamically configurable data paths between logical data ports or DMA channels and physical data ports. In one embodiment, the configuration is determined by mapping data stored in mapping registers. The mapping can be logical or physical as noted above.

Figure 40:
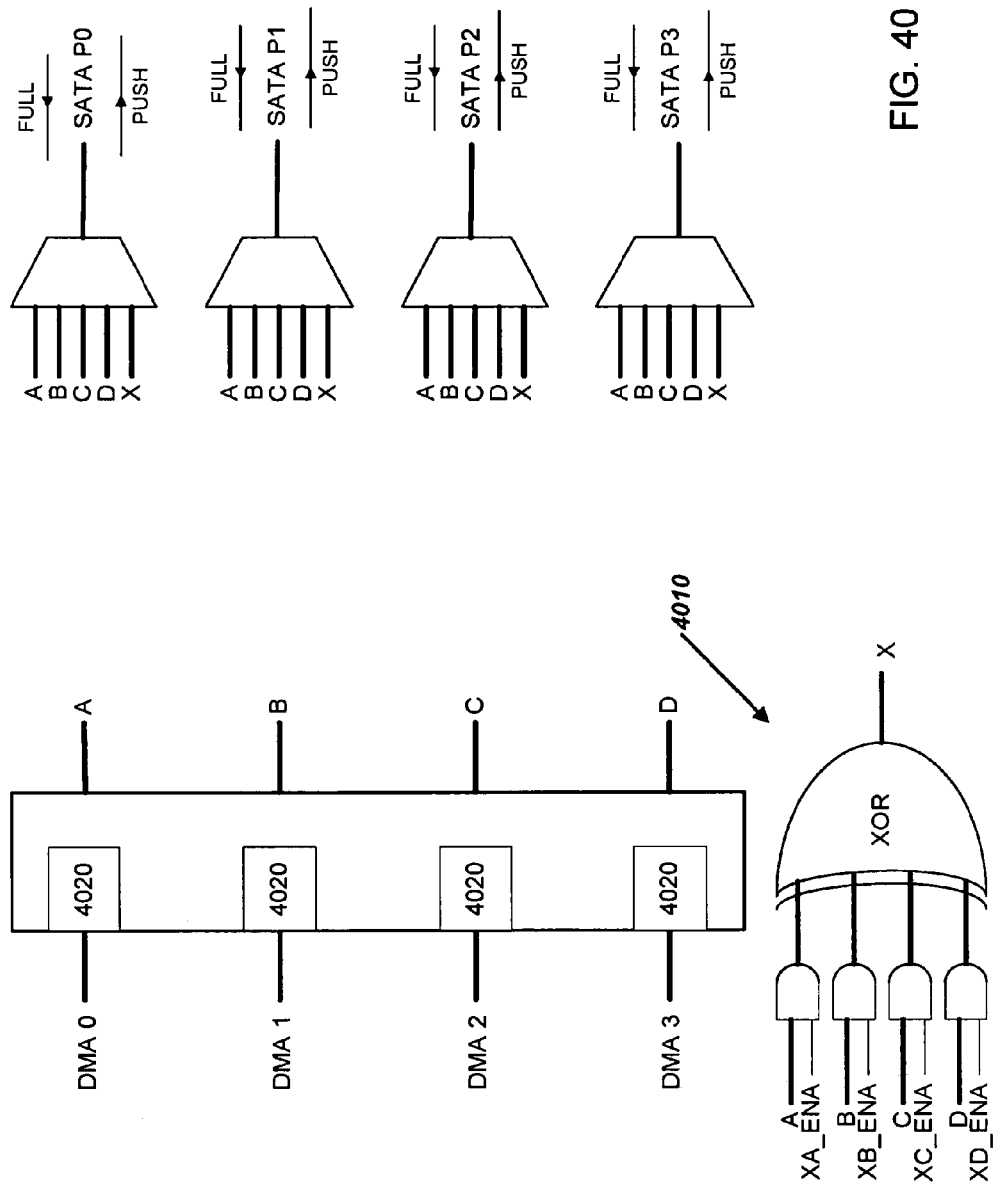
FIG. 40 illustrates one embodiment of a disk array switch configured in the disk write direction in accordance with the present invention.

FIG. 40 is a simplified diagram of a data path switch, illustrating configuration in the disk write direction, and showing four DMA channels (DMA0-DMA3) for data transfer with a host or buffer memory. The switch preferably includes hardware for implementing synchronous transfers as well as on-the-fly redundancy (XOR) operations. This block is inserted between the DMA channels and the SATA ports (SATA P0-SATA P3). The specific numbers of DMA channels and SATA ports is merely for illustration and not limiting. While some of the other drawings show specific connections between DMA channels, SATA ports, and the XOR logic (for example FIGS. 13, 14, 24, 25), these paths are in fact all configurable using logic as discussed earlier. All data paths preferably are 32-bit for SATA or 16-bit for PATA/UDMA applications.

Referring to FIG. 40, disk write data to any SATA port may come from any of the DMA sources A-D or from the XOR block 4010 output "X". Each SATA port has a FULL status flag output as indicated. In order to transfer data synchronously, the PUSH signals of all active status ports are asserted simultaneously, but only when the FULL flags of the active ports are all false.

The XOR block 4010 can compute the XOR of any combination of the DMA inputs by qualifying the appropriate combinations of the AND gates with enable logic signals, e.g. XB_ENA as needed for a particular disk drive array configuration or striping scheme.

The DMA channel data paths might be 32, 64, or 128 bits depending on the width of the data path to memory. The data path switch block will pack or unpack the 32-bit SATA elements as required to build up the data path width. For the narrow striping disk write case discussed below, only one DMA channel is used. The logic receives data words of the DMA width, and it outputs from 1 to 4 32-bit words at a time, synchronously to the array of drives and to the XOR logic. For the narrow striping disk read case, this block receives 1 to 4 32-bit words at a time, synchronously, taking advantage of the SATA port FIFOs as discussed above. For wide striped applications, there may be more than one DMA channel active. As shown in the "HOST INTERFACE DETAIL" drawing of FIG. 5A, the DMA channels may be running concurrently, but the Host bus will only transfer data for one at a time. In this case, this data path switch logic block (FIG. 40) must provide a small buffer or FIFO 4020 for each DMA channel, allowing them to be written one at a time, but also allowing data to be extracted on the drive side synchronously. For good system performance, these buffers/FIFOs must be of sufficient size to allow the Host bus to transfer one or more whole cache lines of data at a time.

D. Disk Write Accumulator

Figure 42:
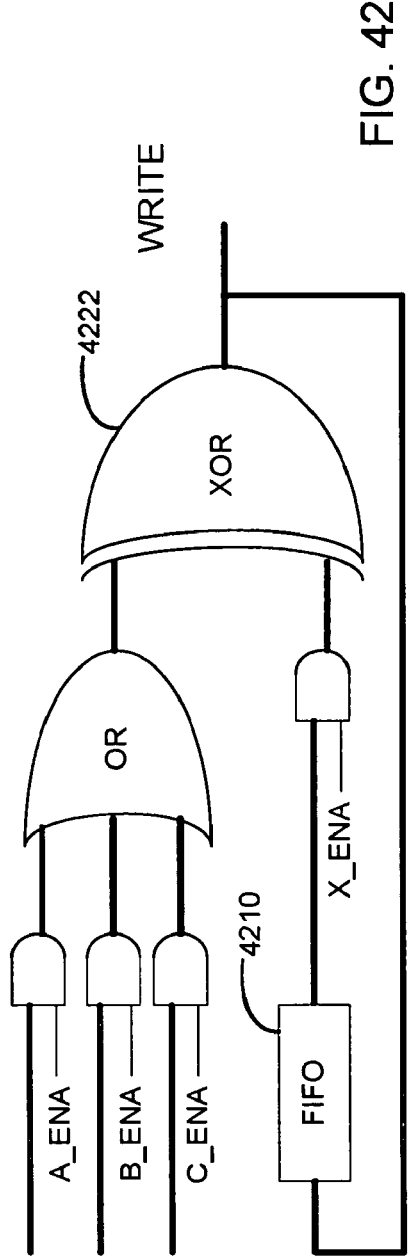
FIG. 42 illustrates one embodiment of disk write accumulator logic in accordance with the present invention.

FIG. 42 illustrates one embodiment of XOR accumulator circuitry for use in a data path switch. The accumulator is an alternative to providing additional buffering for each DMA that was required because the DMA channels do not transfer data synchronously. The shared Host bus interface (see FIG. 5A) ensures that the Host transfers from different buffers will not be overlapping. The FIFO 4210 in this illustration could be one sector in length. This apparatus might be used, for example, to write a full stripe of a three data drives plus redundant drive array using the following process:

1. The process would wait until all active drives were indicating NOT FULL which, in this case, would mean that they could accept one more sector of data. (See FULL flag in FIG. 40)

2. Next, one sector of data is transferred from Buffer 0 using DMA Channel 0 along the path "A" shown in FIG. 40 to SATA port 0. At the same time, referring now to FIG. 42, the data ("A") would also pass through the XOR 4222, enabled by A_ENA, into the FIFO 4210.

3. Next, one sector of data is transferred from Buffer 1 using DMA Channel 1 along the path "B" shown in FIG. 40 to SATA port 1. At the same time, referring again to FIG. 42, the data "B" would also pass through the XOR 4222, enabled by B_ENA. The current contents of the FIFO 4210 is enabled by X_ENA. Consequently "B" and "X" would be XORed with the result going into the FIFO 4210.

4. Next, one sector of data would be transferred from Buffer 2 using DMA Channel 2 along the path "C" to SATA port 2. At the same time, the data would also pass through the XOR, enabled by C_ENA. The current contents of the FIFO would be enabled by X_ENA. "C" and "X" would then be XORed with the result, the XOR of the sectors from Buffer 0, Buffer 1, and Buffer 2, going synchronously to SATA 3.

Rather than adding one or two cache lines of FIFO to each DMA path, the above scheme uses only one FIFO, a single sector in length. The process of moving one sector from each buffer would be repeated as required until all data had been transferred. A host bus rate of 450 MBPS, for example, would support the full 150 MBPS for four SATA drives.

The above description is for a full stripe write. This could be simply a parity drive update if the transfers from A, B, and C to the SATA drives are eliminated leaving only the parity transfer.

E. Data Path Switch Read Direction

Figure 41:
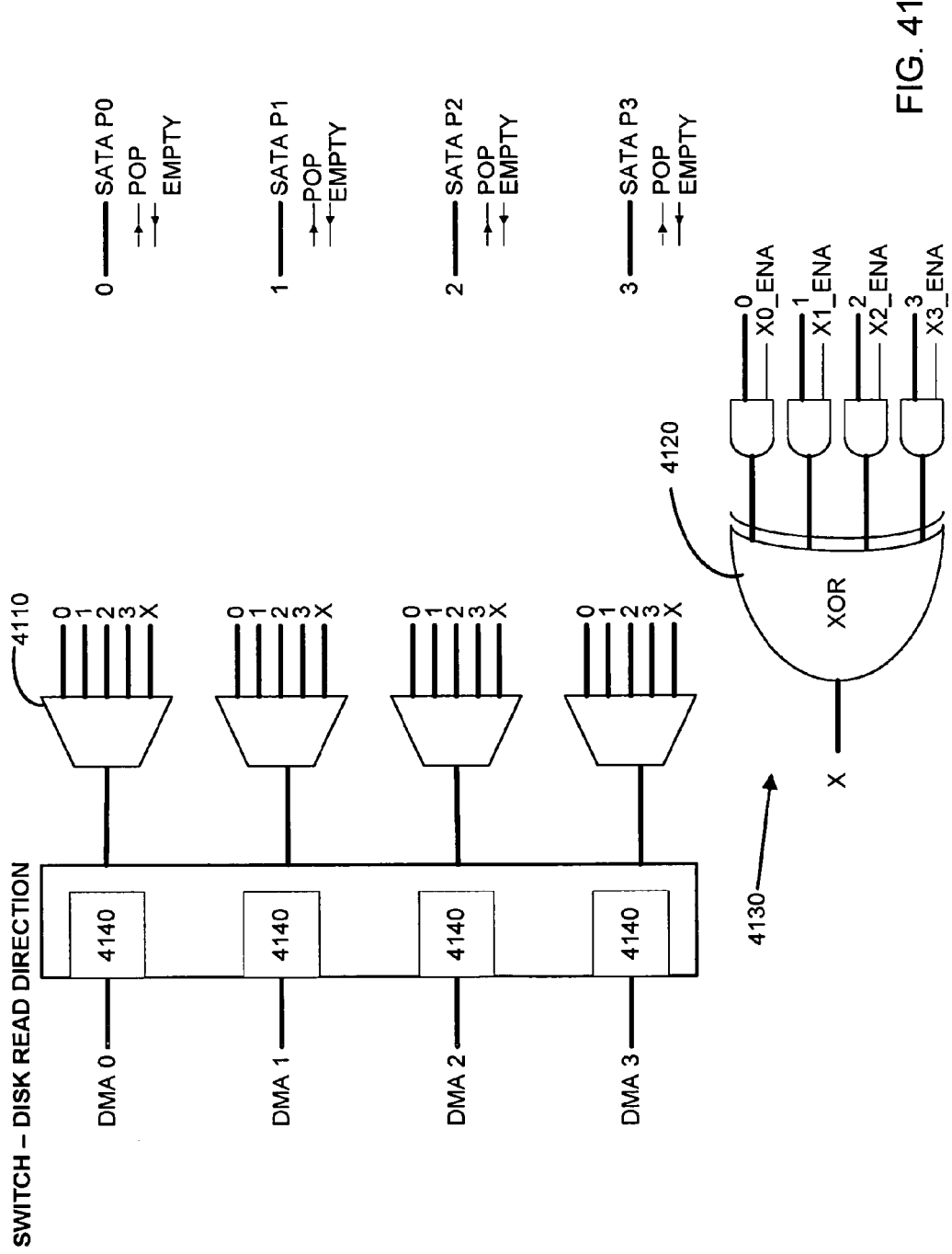
FIG. 41 illustrates one embodiment of a disk array switch configured in the disk read direction in accordance with the present invention.

The data path read direction is illustrated in FIG. 41. Again, this block is inserted between the DMA channels and the SATA ports. While the other drawings show specific connections between DMA channels, SATA ports, and the XOR logic, these paths are in fact all configurable using logic similar to the above. All data paths are 32-bit for SATA or 16-bit for PATA/UDMA.

Disk read data from any SATA port, SATA P0-SATA P3, can be steered to any of the DMA destinations A-D, as indicated conceptually by the multiplexers, e.g. mux 4110. Also, data from any of the SATA ports can be input to the XOR 4120, gated by the corresponding enable signal, e.g. X1_ENA. Each SATA port has a EMPTY status flag output. In order to transfer data synchronously, the POP signals of all active status ports are asserted simultaneously, but only when the EMPTY flags of the active ports are all false. The XOR block 4130 can compute the XOR of any combination of the SATA inputs by qualifying the appropriate combinations of the AND gates.

Figure 36:
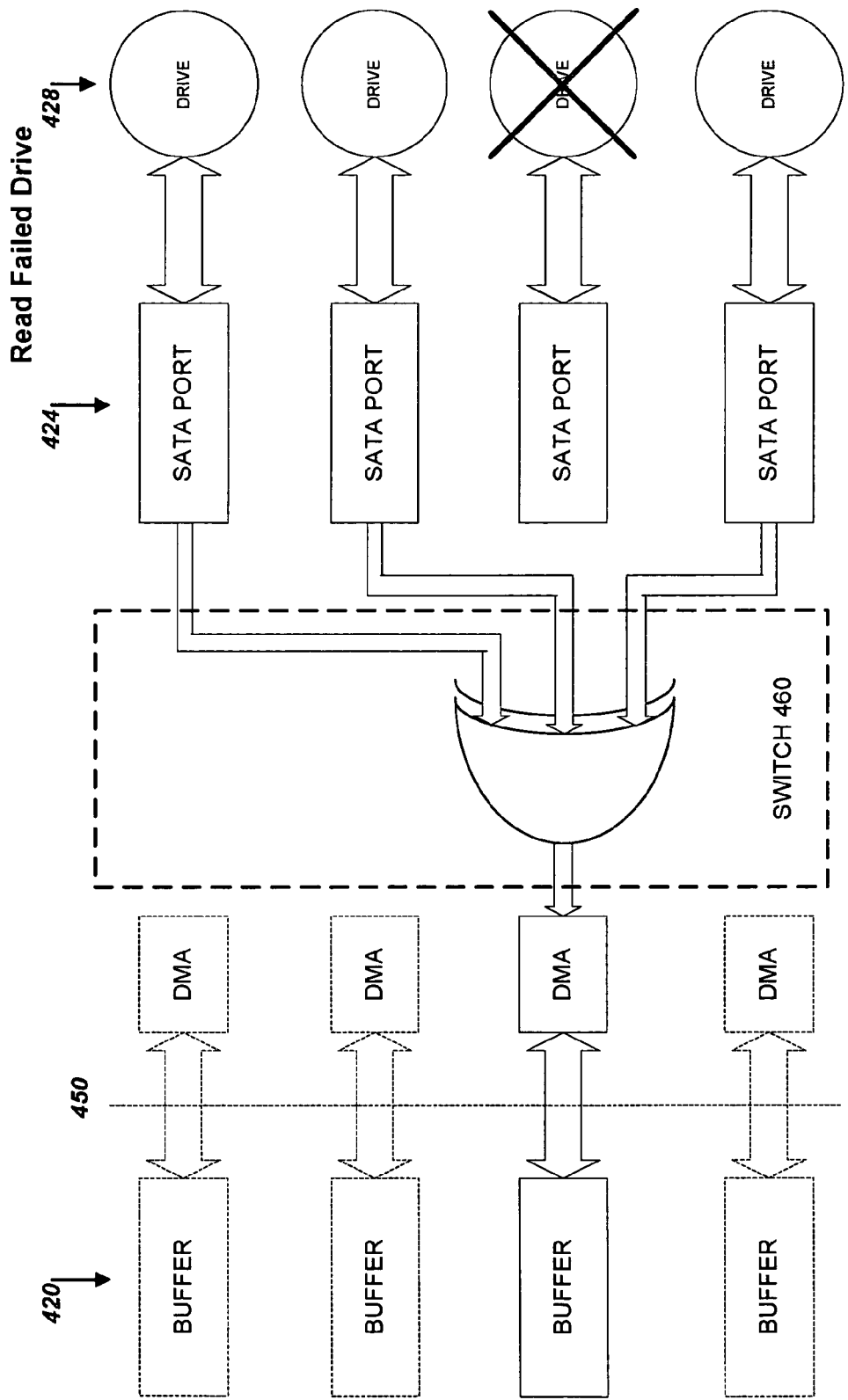
FIG. 36 illustrates a new read operation where a drive has failed in accordance with the present invention.

The DMA channel data paths might be 32, 64, or 128 bits depending on the width of the data path to memory. This block receives elements from the SATA ports and may receive elements from the XOR in place of the data from a failed drive. FIG. 36 illustrates this read failed drive situation. It will pack elements from 1 to 4 sources to build words for DMA transfers. For wide striped applications, there may be more than one DMA channel. As shown in the "HOST INTERFACE DETAIL" drawing of FIG. 5A, the DMA channels may be running concurrently, but the Host bus will only transfer data for one at a time. In this case, this block must provide a small buffer or FIFO for each DMA channel allowing them to transfer data to the Host one channel at a time, and to transfer data on the SATA port side synchronously. This is illustrated by FIFOs 4140. For good system performance, these buffers/FIFOs must be of sufficient size to allow the Host bus to transfer one or more complete cache lines of data at a time.

F. Disk Read Accumulator

Figure 43:
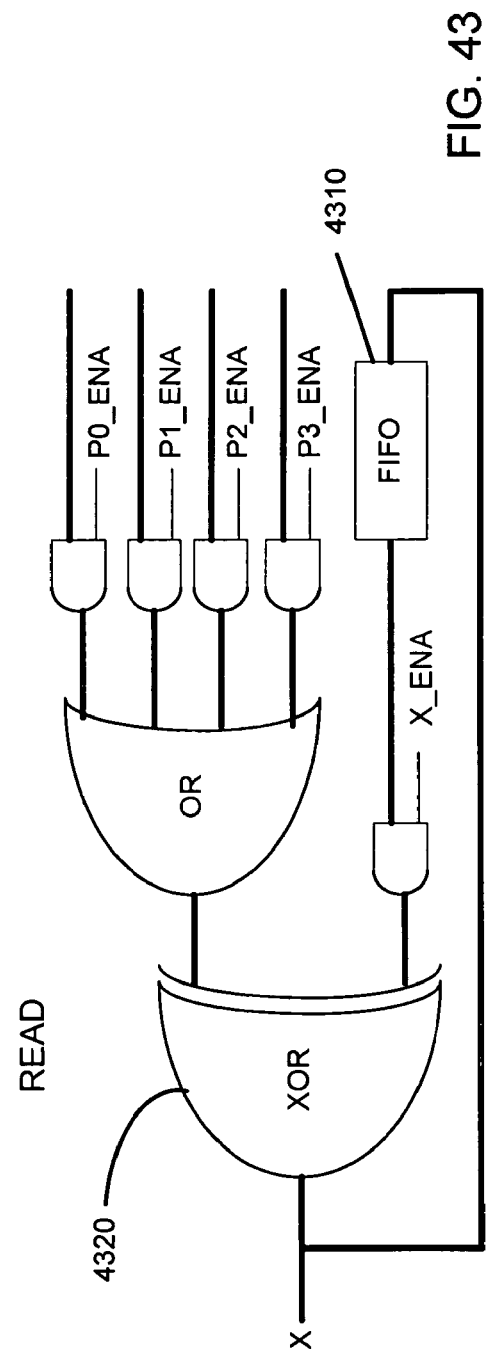
FIG. 43 illustrates one embodiment of disk read accumulator logic in accordance with the present invention.

FIG. 43 illustrates one embodiment of an XOR accumulator circuitry for use in a data path switch in the read direction. The accumulator is an alternative to providing additional buffering for each DMA that was required because the DMA channels do not transfer data synchronously. The shared Host bus interface (see FIG. 5A) ensures that the Host transfers from different buffers will not be overlapping. The FIFO 4310 in this illustration could be one sector in length.

This apparatus can be used in many ways. For example, it might be used to read a full stripe of a three data drive plus redundant drive array with the drive on SATA 2 failed, for example, using the following process:

1. The process would wait until all active drives were indicating Not EMPTY which in this case would mean that they could provide one more sector.

2. One sector of data is transferred from SATA 0 through DMA Channel 0 to a Buffer 0, see FIG. 41. At the same time, referring now to FIG. 43, the data from SATA 0, enabled by P0_ENA, would pass through the XOR 4320 into the FIFO 4310.

3. Next, one sector of data is transferred from SATA 1 through DMA Channel 1 to a Buffer 1. At the same time, the data from SATA 1, enabled by P1_ENA, would be XORed with the current contents of the FIFO 4310 enabled by X_ENA with the result going back into the FIFO.

4. Next, one sector of data is transferred from SATA 3, enabled by P3_ENA, and XORed with the current contents of the FIFO 4310 enabled by X_ENA once again. The result is sent through DMA Channel 2 to Buffer 2 thereby completing the full stripe read.

For the full stripe read with failed drive, all of the non-failed drives are transferred first followed by the parity drive data. For a single block read of the failed drive, the corresponding blocks of data from the three SATA ports would be transferred to the XOR in the same order, but only the final result would be transferred through a DMA channel to a buffer.

Rather than adding one or two cache lines of FIFO to each DMA path, the above scheme uses only a single FIFO, one sector in length. The process of moving one sector from each SATA port would be repeated as required until all data had been transferred. A host bus rate of 450 MBPS, for example, would support the full 150 MBPS from three SATA drives.

G. Synchronous Read Methods—General Case

By way of example only, we discussed earlier the case of data striped 4K wide over three data drives plus a redundant drive. The examples assumed a 4K read access that happened to correspond exactly to the 4K block boundary of a particular stripe on a particular drive. In general, however, there may be any number of data drives with a single redundant drive. The stripe width may be any multiple of a single sector. Moreover, a read request may start on any sector, and its length may range from a single sector up to the capacity of the array. A general method of synchronously reading data from a redundant disk drive array in accordance with the present invention proceeds as follows:

From the drive whose block contains the initial sector, data is read from the initial sector up to the end of the block, or the end of the read request, whichever comes first. If the initial sector happens to be on a failed drive, the corresponding range of sectors is read from the remaining drives, computing the XOR and transferring the result "on-the-fly" as described herein.

For additional whole data blocks requested, blocks are read from successive blocks across the stripe and from successive stripes. In order to achieve the data transfer performance enhancement available due to the striping, the read accesses must occur concurrently on each of the drives. When a block is required from a failed drive, the concurrency is not possible because data from all of the other drives are required to reconstruct the failed block.

Finally, a data read access is made from the drive on which the block including the final sector resides. Data is transferred from the start of the block or from the initial sector if it were in the same block, up to the final sector. If this block of data resided on a drive which had failed, the corresponding sector ranges of the blocks of the stripe on the other drives are read, the XOR is computed, and the result is returned. The foregoing methodologies are enabled by the various apparatus, especially the data path switch, disclosed herein.

H. Redundancy Hardware—Write Case—Partial Stripe Update

For a redundant array, it is well known that any data drive update will require a redundant drive update as well, in order to have the redundancy properly reflect the contents of the data drives at all times. For a full-stripe update, where the data block for each of the data drives of the array receives new data, a standard RAID XOR engine can be used to fetch write data elements from each of the data drive buffers, XOR these elements to produce an element of the redundant drive's new contents, and write this element to a buffer for a subsequent write transfer to the redundant drive. Again using our example of a 4 k wide stripe, in addition to transferring 12K of data to the drives, the same 12K of data is read from the buffers and used to compute the redundancy of 4K for a total of 16K of additional data transfers.

Figure 37:
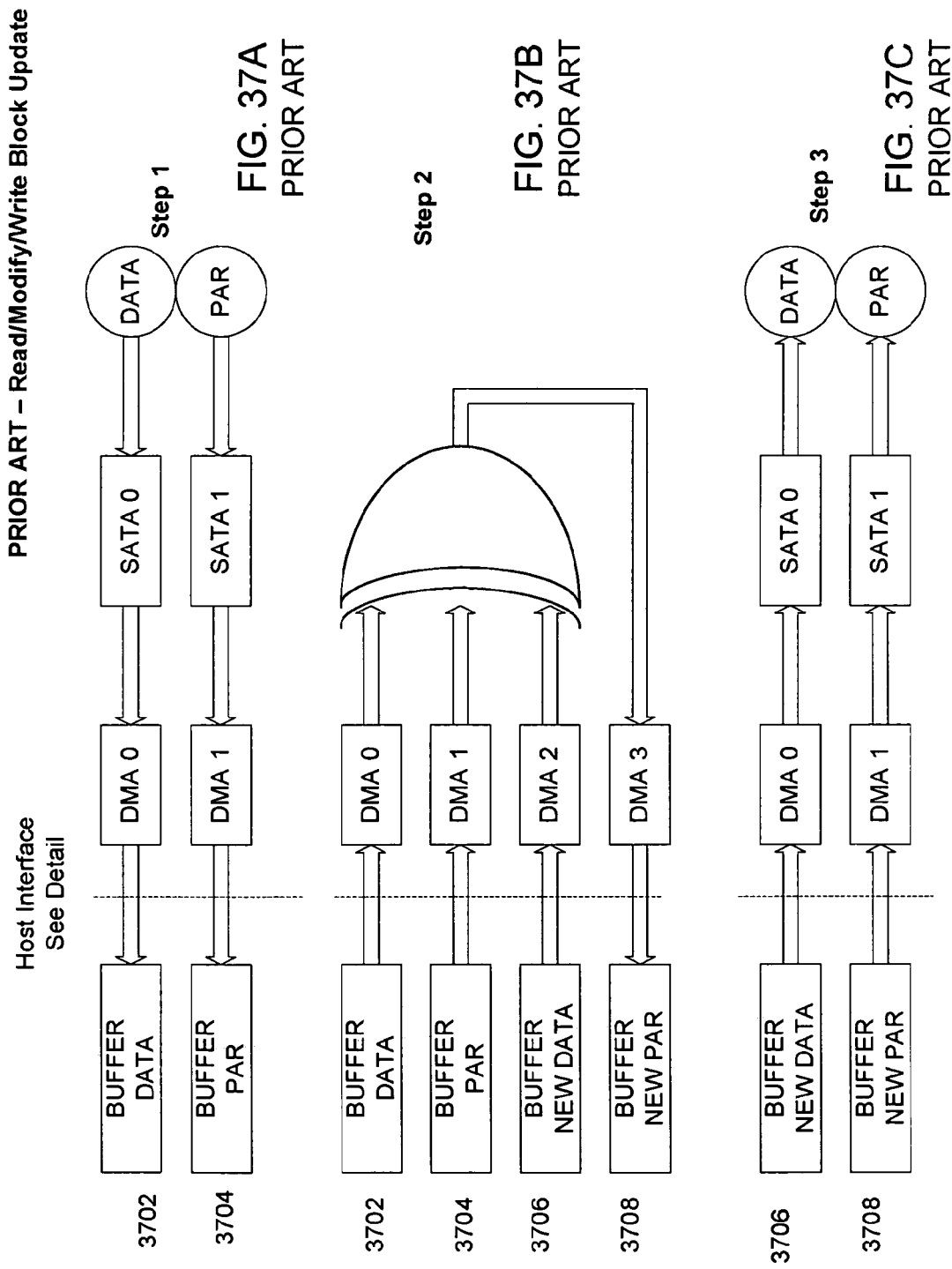
FIGS. 37A-37C illustrate a prior art read-modify-write (R/M/W) operation in a serial interface disk drive array.

An update may involve less than a full stripe. At the completion of the operation, nonetheless, the contents of the block on the redundant drive must reflect the XOR of all of the blocks of the stripe, both the new blocks and the previous blocks which are not being updated. FIGS. 37A-37C illustrate a prior art methodology for a partial stripe update, also called a Read/Modify/Write or R/M/R operation. FIG. 37A shows Step 1, reading the block to be changed from a data drive, and reading the corresponding block from a parity (PAR) drive. Both the data and the redundant data are stored in buffers 3702, 3704, respectively. In Step 2, FIG. 37B, an new XOR is formed by reading (and XOR-ing) buffers containing the old data 3702, the old parity 3704, and the new data 3706. The XOR result is stored in buffer 3708. Each buffer has a corresponding DMA channel as illustrated. Finally, in Step 3, FIG. 37C, the new data and the new parity data are stored on the respective drives.

Another known approach to this problem is to pre-read the blocks which are not being updated. At this point, all of the new and the unchanged blocks will be available in buffers which can be read for XOR computation. The pre-read creates the same starting state as a full stripe write. Using this approach, each data drive is either read or written, and the redundant drive is written.

Figure 38:
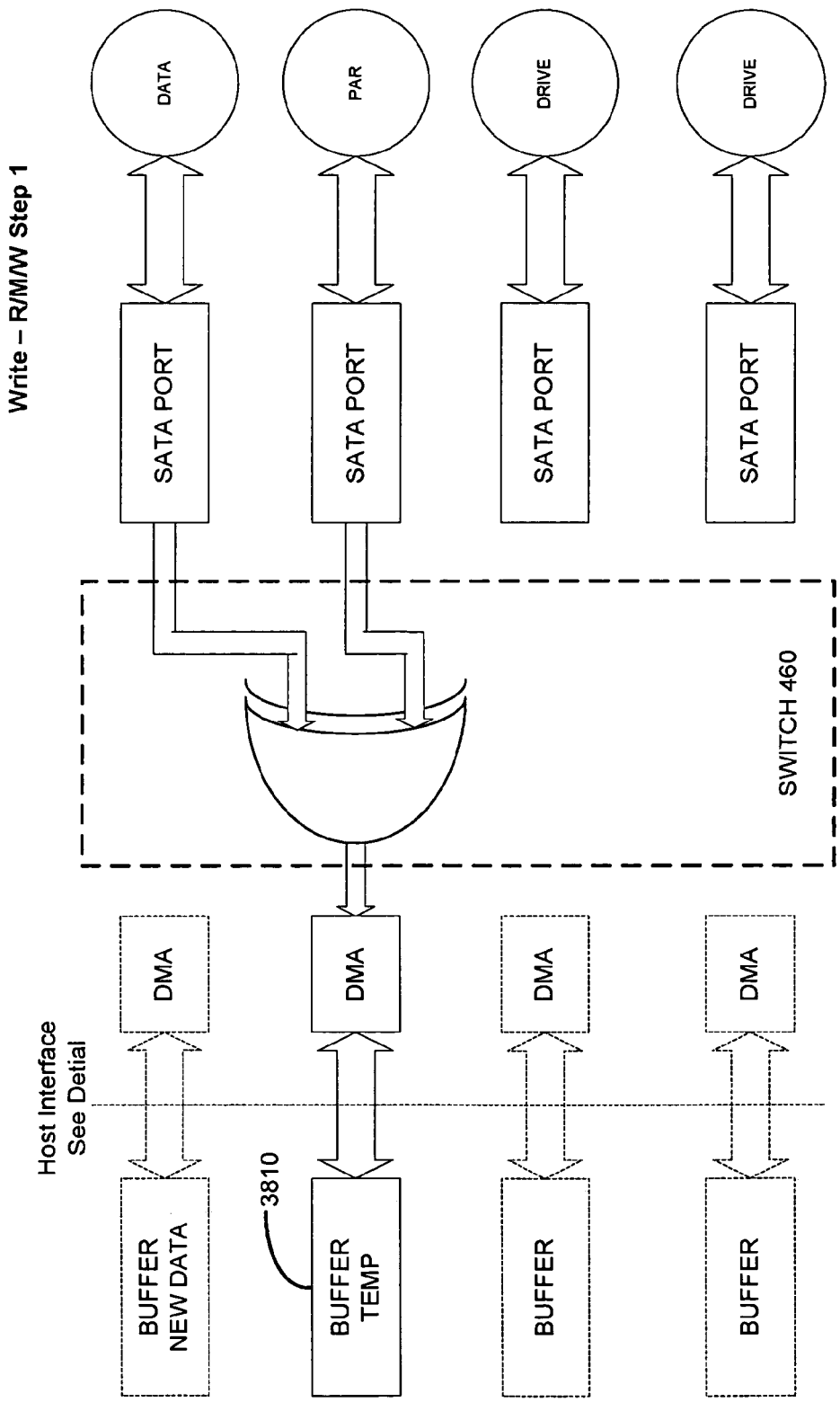
FIG. 38 illustrates a new read-modify-write operation in a serial interface disk drive array in accordance with the present invention, step 1.
Figure 39:
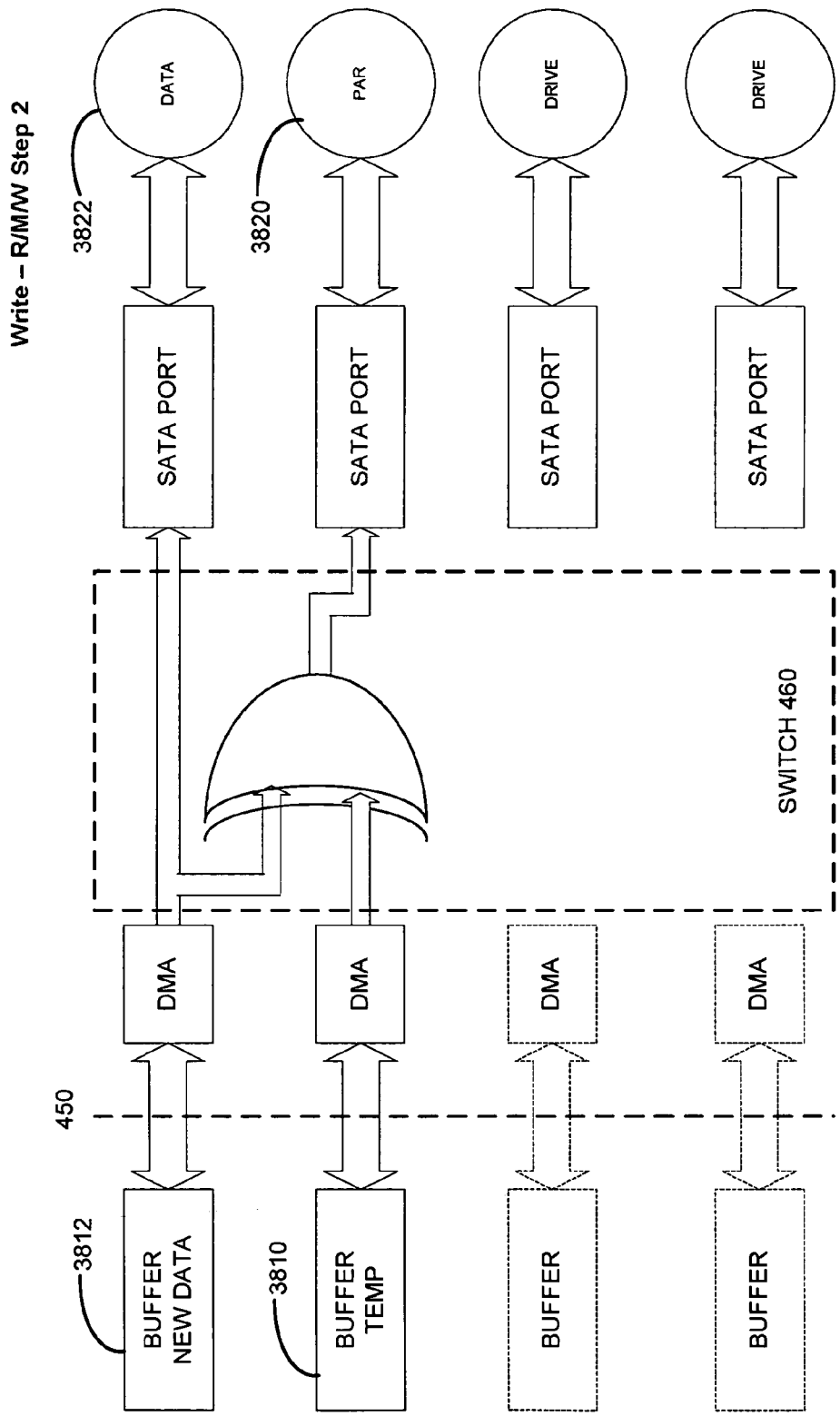
FIG. 39 illustrates a new read-modify-write operation in a serial interface disk drive array in accordance with the present invention, step 2.

FIGS. 38 and 39 illustrate an improved solution to perform the partial stripe update in one embodiment. First, in FIG. 38, is the step of reading the current redundancy and the current contents of the block which is to be updated. The XOR of these two blocks is then computed. (The XOR is implemented in the array switch logic 460 as discussed.) The result of this computation is equivalent to the XOR of all of the blocks which are not being updated. This XOR computation of the two blocks effectively "backs out" the effects of the current data in the block which is going to be updated. This intermediate result is stored in a temporary buffer 3810.

Referring now to FIG. 39, the intermediate result is then XORed with the new data 3812 to produce an updated redundancy for the entire stripe. The updated redundancy is written to the redundant (PAR) drive 3820 the new data is written and to the data drive 3822. In this process, there were two reads, two XORs and two writes.

I. Redundant Writes—Synchronous Data Transfers

The full stripe write operation can also be performed using a synchronous redundant data transfer previously described for a disk read operation, as follows:

Disk write commands are issued to each of the drives of the array.

When the disk drives are all ready to transfer data, the DMA engine fetches a first element from each of the buffers, computes the XOR of the elements and then writes the first elements to each of the data drives and the result of the XOR computation to the redundant drive, using a common DIOW for the parallel ATA/ATAPI interface.

As explained above, the introduction of a FIFO in the data paths of each of the drives allows the same methods to be used, albeit with a PUSH rather than a DIOW, for ATA/ATAPI drives using the UDMA protocol or SATA drives.

The advantages of this approach include the following:

The total amount of data transferred from the buffer is the 12K of new data which is written to the drives. The additional 12K of buffer reads and 4K of buffer writes are eliminated.

The generation of redundant data does not add any latency. Using the specialized DMA engine would involve writing the computed redundancy back to the buffer and reading it out again for transfer to the redundant drive.

As described above, a partial stripe update can be handled as a full stripe update by first pre-reading the contents of the blocks which are not changing. Similarly, the described approach of pre-reading only the redundant data and the block to be updated can use synchronous redundant data transfers to advantage, as follows.

1. Read commands are first issued to the redundant drive and the drive to be updated.
2. When both drives are ready to transfer data, first elements are read from each of the drives, the XOR of these elements is computed, and the result is stored in a buffer. This processor is repeated, element by element until the entire blocks have been read from the drives, the resulting block has been stored in a buffer. This buffer now holds the XOR of all of the blocks not being updated.
3. A write command is issued to the redundant drive and the data drive to be updated.
4. When both drives are ready to accept data, a first data element is fetched from the XOR buffer and a first data element is fetched from the update buffer. The XOR of the two elements is computed. Data is then transferred to the two drives synchronously using a common DIOW strobe. The data drive receives the element from the update buffer unaltered, while the redundant drive receives the computed XOR of the two elements. This process is repeated, element by element completing the partial stripe update.

Note that the two drives do not have to be written synchronously in the final step. The contents of the XOR and redundancy buffers could be XORed and written to the redundant drive independent of the transfer from the update buffer to the data drive, but doing so will require that the update buffer data be fetched twice.

J. Synchronous Read Methods—Narrow Striping

The synchronous data transfer discussion to this point has been based on a stripe width of at least one sector. This is the data structure which might also be supported by specialized DMA engines that run once the read data has been transferred into buffers. The synchronous data transfer hardware and methods described above function equally well with stripe widths of less than a sector.

Figure 5:
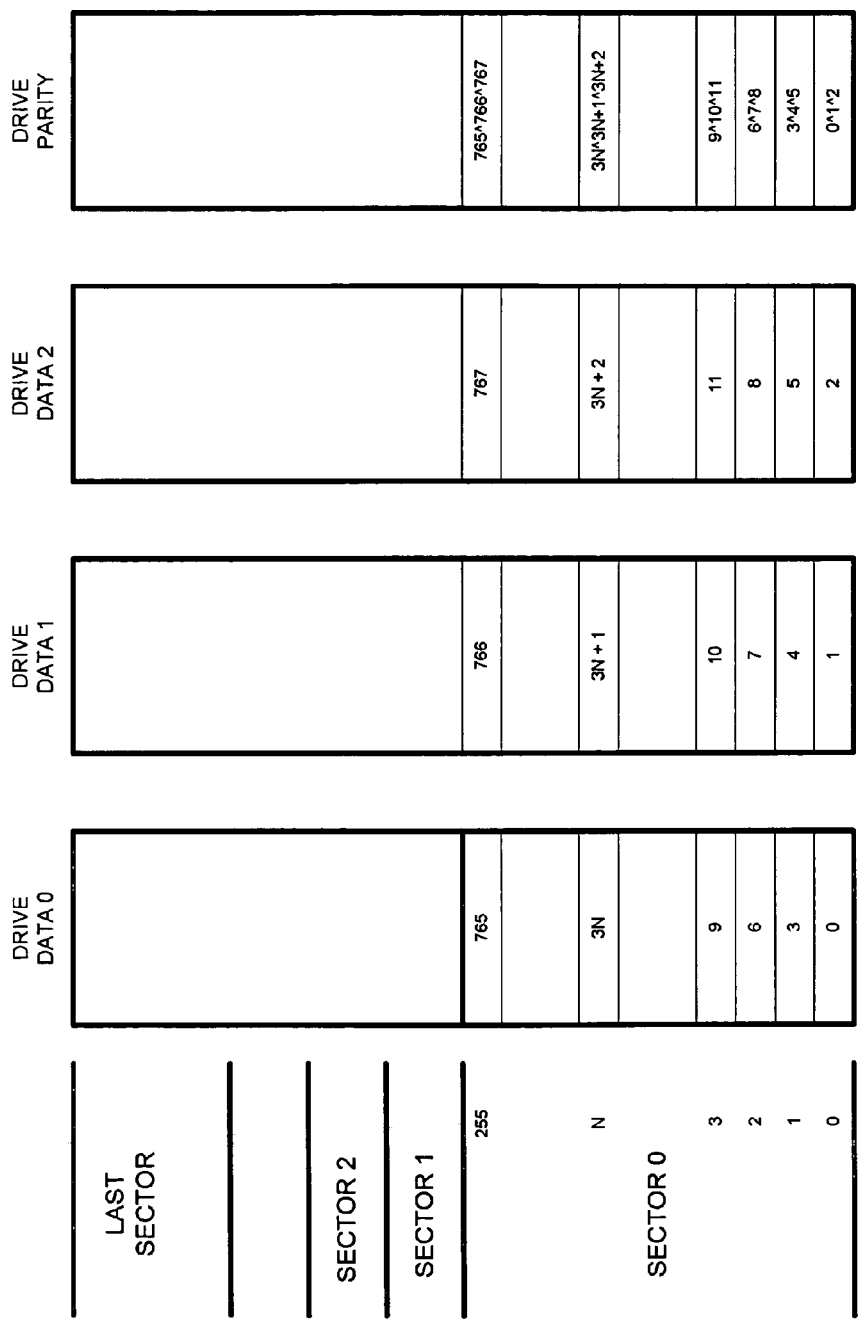
FIG. 5 illustrates narrow striping, one word wide.

Referring now to FIG. 5, it illustrates an array with data striped over three data drives plus a redundant drive. As before, a logical order is assigned to the three drives and a stripe width is selected. For a parallel ATA/ATAPI drive, the sixteen-bit width of the data path is a useful stripe width. The first word (0) of Sector 0 is stored on the first drive (Data 0 in FIG. 5), the second word (1) is stored on the second drive (Data 1) and the third word (2) on the third drive (Data 2). This process is then repeated, storing the fourth data word (3) in the second location of the first drive, the fifth (4) in the second location of the second drive and the sixth (word number 5) in the second location of the third drive. This process is repeated word after word and stripe after stripe to the end of the disk. The parity information is stored on the parity drive. For example, in Sector 0, stripe 2, the parity drive word is shown as 6^7^8 meaning the XOR of words 6, 7 and 8 stored on the data drives.

In the configuration of FIG. 5, an entire stripe consists of three words, one from each data drive. Reading user data will require an access from three drives even without a drive failure. Since entire stripes are consumed, the aggregate bandwidth of the data drives in the array is always achieved. The synchronously accessed word-wide elements are assembled into blocks of the buffer memory width, maintaining the striping order, and stored in the buffer.

Referring now to FIG. 38, a failed drive in the above narrow-stripe configuration, word-wide elements are fetched synchronously from each of the remaining data drives and from the redundant drive. The XOR of the three words fetched is computed on the fly, recreating the word of data from the failed data drive. The original stripe is recreated by merging the result of this computation with the data elements from the remaining two data drives. The results are transferred to the buffer.

A consequence of narrow striping in this configuration is that each sector of a drive in the array has data from three user sectors. If a user read request is not for a multiple of three sectors and aligned to a modulo three sector boundary, end conditions will require that a block of three sectors be read, one sector from each drive, and only one or two of these sectors will be returned to the host. The drives always require that entire sectors be transferred. The one or two sectors that were not requested by the host are discarded.

It will be obvious to those having skill in the art that many changes may be made to the details of the above-described embodiments without departing from the underlying principles of the invention. The scope of the present invention should, therefore, be determined only by the following claims.

The invention claimed is:

1. A method, comprising:
identifying a current data stripe that includes a data block to be updated;
identifying a first drive of a redundant disk drive array that stores current parity data for the current data stripe;
identifying a second drive of the redundant disk drive array that stores the data block to be updated;
reading the data block and reading a corresponding parity block from the first and second drives, respectively;
computing a first XOR of the read data block and the read parity block to form an intermediate block of data;
storing the first computed XOR in a temporary storage location, wherein said computing is done "on the fly" during said storing without storing the read data block and the read parity block in memory;
reading the temporary storage location and reading a new data block;
computing a second XOR of the intermediate block and the new data block; and
synchronously storing the second computed XOR in the first drive and storing the new data block into the second drive, wherein the first drive includes a parity drive;
wherein the second computed XOR is transmitted directly to the first drive in response to the computation thereof;
wherein the redundant disk drive array is coupled to a buffer by data path switch logic providing dynamically configurable data paths between logical data ports and physical data ports utilizing a mapping register which provides, for each of the logical data ports, an association with one of the physical data ports;
wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

2. The method according to claim 1, wherein the redundant disk drive array comprises drives connected via a serial port.

3. The method according to claim 2, wherein the redundant disk drive array comprises drives connected via a SATA port.

4. The method according to claim 3, wherein the data path switch logic is reconfigurable.

5. The method according to claim 3, wherein the data path switch logic includes boolean XOR hardware for computing an XOR with selected data input from any of the drives.

6. The method according to claim 1, wherein the reading of the data block and the corresponding parity block and the computing of the first XOR are accomplished in a single action.

7. A method, comprising:
reading a data block and reading a parity block from a redundant disk drive array;
computing a first XOR of the data block and the parity block;
storing the first computed XOR in a temporary storage location without storing either the data block or the parity block in memory;
reading the first computed XOR from the temporary storage location and reading an updated data block from memory;
computing a second XOR of the first computed XOR and the updated data block;
storing the updated data block in the redundant disk drive array; and
storing the second computed XOR in the parity drive of the redundant disk drive array to update the parity block;
wherein the second computed XOR is transmitted directly to the parity drive in response to the computation thereof;
wherein the redundant disk drive array is coupled to a buffer by data path switch logic providing dynamically configurable data paths between logical data ports and physical data ports utilizing a mapping register which provides, for each of the logical data ports, an association with one of the physical data ports;
wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

8. The method according to claim 7, wherein the redundant disk drive array comprises drives connected via a serial port.

9. The method according to claim 8, wherein the redundant disk drive array comprises drives connected via a SATA port.

10. The method according to claim 9, wherein the data path switch logic is inserted between the SATA drives and host buffer DMA to synchronize data movement and enable XOR calculations "on the fly."

11. A method, comprising:

identifying a current data stripe that includes a data block to be updated;

identifying a first drive of a redundant disk drive array that stores current parity data for the current data stripe;

identifying a second drive of the redundant disk drive array that stores the data block to be updated;

reading the data block and reading a corresponding parity block from the first and second drives, respectively;

computing a first XOR of the read data block and the read parity block to form an intermediate block of data;

storing the first computed XOR in a temporary storage location, wherein said computing is done "on the fly" during said storing without storing the read data block and the read parity block in memory;

reading the temporary storage location and reading a new data block;

computing a second XOR of the intermediate block and the new data block; and synchronously storing the second computed XOR in the first drive and storing the new data block into the second drive, wherein the first drive includes a parity drive;

wherein the second computed XOR is transmitted directly to the first drive in response to the computation thereof;

wherein synchronously storing the second computed XOR in the first drive and storing the new data block into the second drive leaves other drives available for concurrent read accesses;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

12. A method, comprising:

identifying a current data stripe that includes a data block to be updated;

identifying a first drive of a redundant disk drive array that stores current parity data for the current data stripe;

identifying a second drive of the redundant disk drive array that stores the data block to be updated;

reading the data block and reading a corresponding parity block from the first and second drives, respectively;

computing a first XOR of the read data block and the read parity block to form an intermediate block of data;

storing the first computed XOR in a temporary storage location, wherein said computing is done "on the fly" during said storing without storing the read data block and the read parity block in memory;

reading the temporary storage location and reading a new data block;

computing a second XOR of the intermediate block and the new data block; and synchronously storing the second computed XOR in the first drive and storing the new data block into the second drive, wherein the first drive includes a parity drive;

wherein the second computed XOR is transmitted directly to the first drive in response to the computation thereof;

wherein synchronously storing the second computed XOR in the first drive and storing the new data block into the second drive leaves another pair of drives available for a concurrent partial stripe update;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

13. A method, comprising:

identifying a current data stripe that includes a data block to be updated;

identifying a first drive of a redundant disk drive array that stores current parity data for the current data stripe;

identifying a second drive of the redundant disk drive array that stores the data block to be updated;

reading the data block and reading a corresponding parity block from the first and second drives, respectively;

computing a first XOR of the read data block and the read parity block to form an intermediate block of data;

storing the first computed XOR in a temporary storage location, wherein said computing is done "on the fly" during said storing without storing the read data block and the read parity block in memory;

reading the temporary storage location and reading a new data block;

computing a second XOR of the intermediate block and the new data block; and synchronously storing the second computed XOR in the first drive and storing the new data block into the second drive, wherein the first drive includes a parity drive;

wherein the second computed XOR is transmitted directly to the first drive in response to the computation thereof;

wherein the data block and the corresponding parity block are read in response to an array switch determining that both SATA ports of the first and second drives are ready to transfer data;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

14. The method according to claim 13, wherein the data block and the corresponding parity block are read synchronously.

15. A method, comprising:

reading a data block and reading a parity block from a redundant disk drive array;

computing a first XOR of the data block and the parity block;

storing the first computed XOR in a temporary storage location without storing either the data block or the parity block in memory;

reading the first computed XOR from the temporary storage location and reading an updated data block from memory;

computing a second XOR of the first computed XOR and the updated data block;

storing the updated data block in the redundant disk drive array; and storing the second computed XOR in the parity drive of the redundant disk drive array to update the parity block;

wherein the second computed XOR is transmitted directly to the parity drive in response to the computation thereof;

wherein storing the updated block in the redundant disk drive array and the second computed XOR in the parity drive of the redundant disk drive array leaves other drives available for concurrent read accesses;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

16. A method, comprising:

reading a data block and reading a parity block from a redundant disk drive array;

computing a first XOR of the data block and the parity block;

storing the first computed XOR in a temporary storage location without storing either the data block or the parity block in memory;

reading the first computed XOR from the temporary storage location and reading an updated data block from memory;

computing a second XOR of the first computed XOR and the updated data block;

storing the updated data block in the redundant disk drive array; and storing the second computed XOR in the parity drive of the redundant disk drive array to update the parity block;

wherein the second computed XOR is transmitted directly to the parity drive in response to the computation thereof;

wherein storing the updated block in the redundant disk drive array and the second computed XOR in the parity drive of the redundant disk drive array leaves other drives available for a concurrent partial stripe update;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

17. A method, comprising:

reading a data block and reading a parity block from a redundant disk drive array;

computing a first XOR of the data block and the parity block;

storing the first computed XOR in a temporary storage location without storing either the data block or the parity block in memory;

reading the first computed XOR from the temporary storage location and reading an updated data block from memory;

computing a second XOR of the first computed XOR and the updated data block;

storing the updated data block in the redundant disk drive array; and storing the second computed XOR in the parity drive of the redundant disk drive array to update the parity block;

wherein the second computed XOR is transmitted directly to the parity drive in response to the computation thereof;

wherein the data block and the parity block are read in response to an array switch determining that both SATA ports of the corresponding drives are ready to transfer data;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

18. The method according to claim 17, wherein the data block and the parity block are read synchronously.

19. An apparatus, comprising:

circuitry for identifying a current data stripe that includes a data block to be updated;

circuitry for identifying a first drive of a redundant disk drive array that stores current parity data for the current data stripe;

circuitry for identifying a second drive of the redundant disk drive array that stores the data block to be updated;

circuitry for reading the data block and reading a corresponding parity block from the first and second drives, respectively;

circuitry for computing a first XOR of the read data block and the read parity block to form an intermediate block of data;

circuitry for storing the first computed XOR in a temporary storage location, wherein said computing is done "on the fly" during said storing without storing the read data block and the read parity block in memory;

circuitry for reading the temporary storage location and reading a new data block;

circuitry for computing a second XOR of the intermediate block and the new data block; and circuitry for synchronously storing the second computed XOR in the first drive and storing the new data block into the second drive, wherein the first drive includes a parity drive;

wherein the apparatus is operable such that the second computed XOR is transmitted directly to the first drive in response to the computation thereof;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

20. The apparatus according to claim 19, wherein the redundant disk drive array comprises drives connected via a serial port.

21. The apparatus according to claim 20, wherein the redundant disk drive array comprises drives connected via a SATA port.

22. The apparatus according to claim 21, wherein the data path switch logic is reconfigurable.

23. The apparatus according to claim 21, wherein the data path switch logic includes boolean XOR hardware for computing an XOR with selected data input from any of the drives.

24. The apparatus according to claim 19, wherein the reading of the data block and the corresponding parity block and the computing of the first XOR are accomplished in a single action.

25. An apparatus, comprising:
circuitry for reading a data block and reading a parity block from a redundant disk drive array;
circuitry for computing a first XOR of the data block and the parity block;
circuitry for storing the first computed XOR in a temporary storage location without storing either the data block or the parity block in memory;
circuitry for reading the first computed XOR from the temporary storage location and reading an updated data block from memory;
circuitry for computing a second XOR of the first computed XOR and the updated data block;
circuitry for storing the updated data block in the redundant disk drive array; and
circuitry for storing the second computed XOR in the parity drive of the redundant disk drive array to update the parity block;
wherein the apparatus is operable such that the second computed XOR is transmitted directly to the parity drive in response to the computation thereof;
wherein the redundant disk drive array is coupled to a buffer by data path switch logic providing dynamically configurable data paths between logical data ports and physical data ports utilizing a mapping register which provides, for each of the logical data ports, an association with one of the physical data ports;
wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

26. The apparatus according to claim 25, wherein the redundant disk drive array comprises drives connected via a serial port.

27. The apparatus according to claim 26, wherein the redundant disk drive array comprises drives connected via a SATA port.

28. The apparatus according to claim 27, wherein the data path switch logic is inserted between the SATA drives and host buffer DMA to synchronize data movement and enable XOR calculations "on the fly."

29. An apparatus, comprising:
circuitry for identifying a current data stripe that includes a data block to be updated;
circuitry for identifying a first drive of a redundant disk drive array that stores current parity data for the current data stripe;
circuitry for identifying a second drive of the redundant disk drive array that stores the data block to be updated;
circuitry for reading the data block and reading a corresponding parity block from the first and second drives, respectively;
circuitry for computing a first XOR of the read data block and the read parity block to form an intermediate block of data;
circuitry for storing the first computed XOR in a temporary storage location, wherein said computing is done "on the fly" during said storing without storing the read data block and the read parity block in memory;
circuitry for reading the temporary storage location and reading a new data block;
circuitry for computing a second XOR of the intermediate block and the new data block; and
circuitry for synchronously storing the second computed XOR in the first drive and storing the new data block into the second drive, wherein the first drive includes a parity drive;
wherein the apparatus is operable such that the second computed XOR is transmitted directly to the first drive in response to the computation thereof;
wherein the apparatus is operable such that synchronously storing the second computed XOR in the first drive and storing the new data block into the second drive leaves other drives available for concurrent read accesses;
wherein the redundant disk drive array is coupled to a buffer by data path switch logic providing dynamically configurable data paths between logical data ports and physical data ports utilizing a mapping register which provides, for each of the logical data ports, an association with one of the physical data ports;
wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

30. An apparatus, comprising:
circuitry for identifying a current data stripe that includes a data block to be updated;
circuitry for identifying a first drive of a redundant disk drive array that stores current parity data for the current data stripe;
circuitry for identifying a second drive of the redundant disk drive array that stores the data block to be updated;
circuitry for reading the data block and reading a corresponding parity block from the first and second drives, respectively;
circuitry for computing a first XOR of the read data block and the read parity block to form an intermediate block of data;

circuitry for storing the first computed XOR in a temporary storage location, wherein said computing is done "on the fly" during said storing without storing the read data block and the read parity block in memory;

circuitry for reading the temporary storage location and reading a new data block;

circuitry for computing a second XOR of the intermediate block and the new data block; and circuitry for synchronously storing the second computed XOR in the first drive and storing the new data block into the second drive, wherein the first drive includes a parity drive;

wherein the apparatus is operable such that the second computed XOR is transmitted directly to the first drive in response to the computation thereof;

wherein the apparatus is operable such that synchronously storing the second computed XOR in the first drive and storing the new data block into the second drive leaves another pair of drives available for a concurrent partial stripe update;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

31. An apparatus, comprising:

circuitry for identifying a current data stripe that includes a data block to be updated;

circuitry for identifying a first drive of a redundant disk drive array that stores current parity data for the current data stripe;

circuitry for identifying a second drive of the redundant disk drive array that stores the data block to be updated;

circuitry for reading the data block and reading a corresponding parity block from the first and second drives, respectively;

circuitry for computing a first XOR of the read data block and the read parity block to form an intermediate block of data;

circuitry for storing the first computed XOR in a temporary storage location, wherein said computing is done "on the fly" during said storing without storing the read data block and the read parity block in memory;

circuitry for reading the temporary storage location and reading a new data block;

circuitry for computing a second XOR of the intermediate block and the new data block; and circuitry for synchronously storing the second computed XOR in the first drive and storing the new data block into the second drive, wherein the first drive includes a parity drive;

wherein the apparatus is operable such that the second computed XOR is transmitted directly to the first drive in response to the computation thereof;

wherein the apparatus is operable such that the data block and the corresponding parity block are read in response to an array switch determining that both SATA ports of the first and second drives are ready to transfer data;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

32. The apparatus according to claim 31, wherein the data block and the corresponding parity block are read synchronously.

33. An apparatus, comprising:

circuitry for reading a data block and reading a parity block from a redundant disk drive array;

circuitry for computing a first XOR of the data block and the parity block;

circuitry for storing the first computed XOR in a temporary storage location without storing either the data block or the parity block in memory;

circuitry for reading the first computed XOR from the temporary storage location and reading an updated data block from memory;

circuitry for computing a second XOR of the first computed XOR and the updated data block;

circuitry for storing the updated data block in the redundant disk drive array; and circuitry for storing the second computed XOR in the parity drive of the redundant disk drive array to update the parity block;

wherein the apparatus is operable such that the second computed XOR is transmitted directly to the parity drive in response to the computation thereof;

wherein the apparatus is operable such that storing the updated block in the redundant disk drive array and the second computed XOR in the parity drive of the redundant disk drive array leaves other drives available for concurrent read accesses;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

34. An apparatus, comprising:

circuitry for reading a data block and reading a parity block from a redundant disk drive array;

circuitry for computing a first XOR of the data block and the parity block;

circuitry for storing the first computed XOR in a temporary storage location without storing either the data block or the parity block in memory;

circuitry for reading the first computed XOR from the temporary storage location and reading an updated data block from memory;

circuitry for computing a second XOR of the first computed XOR and the updated data block;

circuitry for storing the updated data block in the redundant disk drive array; and circuitry for storing the second computed XOR in the parity drive of the redundant disk drive array to update the parity block;

wherein the apparatus is operable such that the second computed XOR is transmitted directly to the parity drive in response to the computation thereof;

wherein the apparatus is operable such that storing the updated block in the redundant disk drive array and the second computed XOR in the parity drive of the redundant disk drive array leaves other drives available for a concurrent partial stripe update;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

35. An apparatus, comprising:

circuitry for reading a data block and reading a parity block from a redundant disk drive array;

circuitry for computing a first XOR of the data block and the parity block;

circuitry for storing the first computed XOR in a temporary storage location without storing either the data block or the parity block in memory;

circuitry for reading the first computed XOR from the temporary storage location and reading an updated data block from memory;

circuitry for computing a second XOR of the first computed XOR and the updated data block;

circuitry for storing the updated data block in the redundant disk drive array; and circuitry for storing the second computed XOR in the parity drive of the redundant disk drive array to update the parity block;

wherein the apparatus is operable such that the second computed XOR is transmitted directly to the parity drive in response to the computation thereof;

wherein the apparatus is operable such that the data block and the parity block are read in response to an array switch determining that both SATA ports of the corresponding drives are ready to transfer data;

wherein the redundant disk drive array is coupled to a buffer by data path switch logic providing dynamically configurable data paths between logical data ports and physical data ports utilizing a mapping register which provides, for each of the logical data ports, an association with one of the physical data ports;

wherein in response to a failure of one of the drives in the redundant disk drive array, the mapping register identifies the association between one of the logical data ports and one of the physical data ports attached to the failed one of the drives, and modifies the association by associating the one of the logical data ports with a predefined value indicating the failure of the one of the drives.

36. The apparatus according to claim 35, wherein the data block and the parity block are read synchronously.

* * * * *